(12) United States Patent
Feldman et al.

(10) Patent No.: US 10,768,729 B2
(45) Date of Patent: Sep. 8, 2020

(54) MULTIMEDIA, MULTIUSER SYSTEM AND ASSOCIATED METHODS

(71) Applicant: T1V, INC., Charlotte, NC (US)

(72) Inventors: Michael R. Feldman, Huntersville, NC (US); James E. Morris, Lake Wylie, SC (US)

(73) Assignee: T1V, INC., Charlotte, NC (US)

(*) Notice: Subject to any disclaimer, the term of this patent is extended or adjusted under 35 U.S.C. 154(b) by 0 days.

(21) Appl. No.: 15/973,065

(22) Filed: May 7, 2018

(65) Prior Publication Data

US 2018/0329551 A1 Nov. 15, 2018

Related U.S. Application Data

(63) Continuation of application No. 14/049,929, filed on Oct. 9, 2013, now Pat. No. 9,965,067, which is a
(Continued)

(51) Int. Cl.
*G06F 3/041* (2006.01)
*G06F 3/0482* (2013.01)
(Continued)

(52) U.S. Cl.
CPC ............ *G06F 3/0412* (2013.01); *G06F 3/041* (2013.01); *G06F 3/0482* (2013.01); *G06F 3/0488* (2013.01); *G06F 3/04842* (2013.01)

(58) Field of Classification Search
CPC .. G06F 17/00; G06F 17/3206; G06F 17/3211; G06F 3/045; G06F 3/04883;
(Continued)

(56) References Cited

U.S. PATENT DOCUMENTS 5,412,564 A 5/1995 Ecer
5,589,856 A 12/1996 Stein et al.
(Continued)

FOREIGN PATENT DOCUMENTS

CN 1904823 A 1/2007
GB 2444852 A 6/2008
(Continued)

OTHER PUBLICATIONS

Steelecase: Media:scape brochure, © 2010.
(Continued)

*Primary Examiner* — Olusegun Goyea
(74) *Attorney, Agent, or Firm* — Xsensus LLP

(57) ABSTRACT

A multiuser, multi-interface computing system includes a computer system, and a continuous substrate including a first surface and a second surface. The substrate includes at least two touch sensitive regions, each touch sensitive region including a continuous touch sensitive surface that covers at least a portion of at least one display and an individual interface for selecting applications. The touch sensitive surface is configured to serve as the primary input to the computer system. The continuous substrate is transparent within the touch sensitive regions. The multiuser, multi-interface computing system is configured so that the at least two users can use the touch sensitive regions simultaneously.

8 Claims, 55 Drawing Sheets

Related U.S. Application Data continuation-in-part of application No. 13/974,458, filed on Aug. 23, 2013, which is a continuation of application No. 13/764,593, filed on Feb. 11, 2013, now Pat. No. 8,522,153, which is a continuation of application No. 12/588,774, filed on Oct. 27, 2009, now abandoned, said application No. 14/049,929 is a continuation-in-part of application No. 12/650,684, filed on Dec. 31, 2009, now Pat. No. 8,600,816, which is a continuation-in-part of application No. 12/588,774, filed on Oct. 27, 2009, now abandoned, which is a continuation-in-part of application No. 12/222,670, filed on Aug. 13, 2008, now Pat. No. 8,583,491.

(60) Provisional application No. 61/272,591, filed on Oct. 9, 2009, provisional application No. 60/994,458, filed on Sep. 19, 2007.

(51) Int. Cl.
  *G06F 3/0484* (2013.01)
  *G06F 3/0488* (2013.01)

(58) Field of Classification Search
  CPC ........ H04N 7/025; H04N 7/173; H04N 5/445; H04H 60/33; H04H 60/65
  USPC ....... 705/15; 345/173, 744; 725/34, 60, 109; 463/13, 19, 20, 27, 40, 42; 455/414.1, 455/466
  See application file for complete search history.

(56) References Cited

U.S. PATENT DOCUMENTS

| | | |
|---|---|---|
| 5,694,150 A * | 12/1997 | Sigona .................... G06F 3/038 715/856 |
| 5,825,352 A | 10/1998 | Bisset et al. |
| 5,825,353 A | 10/1998 | Will |
| 5,896,126 A | 4/1999 | Shieh |
| 5,943,043 A | 8/1999 | Furuhata et al. |
| 6,128,649 A | 10/2000 | Smith |
| 6,301,564 B1 | 10/2001 | Halverson |
| 6,331,840 B1 | 12/2001 | Nielson et al. |
| 6,362,842 B1 | 3/2002 | Tahara et al. |
| 6,396,506 B1 | 5/2002 | Hoshino et al. |
| 6,424,248 B1 | 7/2002 | Toms et al. |
| 6,498,590 B1 | 12/2002 | Dietz et al. |
| 6,517,437 B1 | 2/2003 | Wells et al. |
| 6,529,786 B1 | 3/2003 | Sim |
| 6,545,669 B1 | 4/2003 | Kinawi et al. |
| 6,731,731 B1 | 5/2004 | Ueshima |
| 6,844,893 B1 | 1/2005 | Miller et al. |
| 6,856,259 B1 | 2/2005 | Sharp |
| 6,876,973 B1 | 4/2005 | Visconti |
| 6,920,431 B2 | 7/2005 | Showghi et al. |
| 6,940,394 B2 | 9/2005 | Gagnon |
| 6,973,437 B1 | 12/2005 | Olewicz et al. |
| 6,975,910 B1 | 12/2005 | Brown et al. |
| 6,980,999 B1 | 12/2005 | Grana |
| 6,982,733 B1 | 1/2006 | McNally et al. |
| 7,069,228 B1 | 6/2006 | Rose et al. |
| 7,115,031 B2 | 10/2006 | Miyamoto et al. |
| 7,163,311 B2 | 1/2007 | Kramer |
| 7,242,389 B1 | 7/2007 | Stern |
| 7,254,775 B2 | 8/2007 | Geaghan et al. |
| 7,266,099 B2 | 9/2007 | Roy et al. |
| 7,385,479 B1 | 6/2008 | Green et al. |
| 7,487,461 B2 | 2/2009 | Zhai et al. |
| 7,535,481 B2 | 5/2009 | Dehlin |
| 7,549,921 B2 | 6/2009 | Storm |
| 7,572,223 B2 | 8/2009 | Donaldson |
| 7,620,901 B2 | 11/2009 | Carpenter et al. |
| 7,656,393 B2 | 2/2010 | King et al. |
| 7,874,923 B2 | 1/2011 | Mattice et al. |
| 7,880,728 B2 | 2/2011 | de los Reyes et al. |
| 7,920,159 B2 | 4/2011 | Ueno et al. |
| 7,925,996 B2 | 4/2011 | Hofmeister et al. |
| 7,976,372 B2 | 7/2011 | Baerlocher et al. |
| 7,980,858 B2 | 7/2011 | Valoe et al. |
| 8,046,701 B2 | 10/2011 | Chiu et al. |
| 8,147,316 B2 * | 4/2012 | Arezina .............. G07F 17/3206 463/20 |
| 8,326,115 B2 | 12/2012 | Murakoshi et al. |
| 8,350,814 B2 | 1/2013 | Kim et al. |
| 8,368,616 B1 | 2/2013 | Harris |
| 8,403,740 B2 | 3/2013 | Kovacs et al. |
| 8,439,756 B2 | 5/2013 | Baerlocher et al. |
| 8,493,339 B1 | 7/2013 | Feehan |
| 8,525,799 B1 | 9/2013 | Grivna |
| 2002/0112237 A1 | 8/2002 | Kelts |
| 2002/0185981 A1 | 12/2002 | Dietz |
| 2002/0191029 A1 | 12/2002 | Gillespie |
| 2003/0016844 A1 | 1/2003 | Chisato |
| 2003/0020671 A1 | 1/2003 | Santoro |
| 2003/0025678 A1 | 2/2003 | Lee |
| 2003/0058214 A1 | 3/2003 | Abboud |
| 2003/0063073 A1 | 4/2003 | Geaghan |
| 2003/0078793 A1 | 4/2003 | Toth |
| 2003/0182209 A1 | 9/2003 | Ge et al. |
| 2003/0210277 A1 | 11/2003 | Harada |
| 2004/0001048 A1 | 1/2004 | Kraus et al. |
| 2004/0046784 A1 | 3/2004 | Shen |
| 2005/0030255 A1 | 2/2005 | Chiu |
| 2005/0091302 A1 | 4/2005 | Soin et al. |
| 2005/0183023 A1 | 8/2005 | Maruyama et al. |
| 2005/0215303 A1 | 9/2005 | Inoue |
| 2005/0257160 A1 | 11/2005 | Debellis et al. |
| 2005/0259378 A1 | 11/2005 | Hill |
| 2006/0028398 A1 * | 2/2006 | Willmore ............... G06Q 30/02 345/2.3 |
| 2006/0101354 A1 | 5/2006 | Hashimoto et al. |
| 2006/0117197 A1 | 6/2006 | Nurmi |
| 2006/0125799 A1 | 6/2006 | Hillis et al. |
| 2006/0181519 A1 | 8/2006 | Vernier |
| 2006/0238724 A1 | 10/2006 | Trivedi |
| 2006/0267952 A1 | 11/2006 | Alcorn |
| 2006/0294247 A1 | 12/2006 | Hinckley |
| 2007/0097092 A1 | 5/2007 | Jung |
| 2007/0129150 A1 | 6/2007 | Crowder et al. |
| 2007/0171273 A1 | 7/2007 | Saleh et al. |
| 2007/0220444 A1 | 9/2007 | Sunday |
| 2007/0236478 A1 | 10/2007 | Geaghan et al. |
| 2007/0247435 A1 | 10/2007 | Benko et al. |
| 2007/0257891 A1 | 11/2007 | Esenther et al. |
| 2007/0273670 A1 | 11/2007 | Nordahl |
| 2007/0279227 A1 | 12/2007 | Juels |
| 2007/0291710 A1 | 12/2007 | Fadell |
| 2008/0022328 A1 | 1/2008 | Miller |
| 2008/0036743 A1 | 2/2008 | Westerman et al. |
| 2008/0088593 A1 | 4/2008 | Smoot |
| 2008/0113767 A1 | 5/2008 | Nguyen et al. |
| 2008/0119237 A1 * | 5/2008 | Kim ..................... G06F 3/0486 455/566 |
| 2008/0122796 A1 | 5/2008 | Jobs et al. |
| 2008/0143685 A1 | 6/2008 | Lee et al. |
| 2008/0148152 A1 | 6/2008 | Blinnikka et al. |
| 2008/0165132 A1 | 7/2008 | Weiss |
| 2008/0171602 A1 * | 7/2008 | Patel .................... G06Q 20/04 463/42 |
| 2008/0192059 A1 * | 8/2008 | Kennedy ............... G06F 3/0488 345/537 |
| 2008/0198138 A1 | 8/2008 | McFarlane et al. |
| 2008/0214273 A1 * | 9/2008 | Snoddy ................. A63F 13/327 463/19 |
| 2008/0215852 A1 | 9/2008 | Largman et al. |
| 2008/0282286 A1 * | 11/2008 | Or ......................... H04H 60/33 725/34 |
| 2009/0076920 A1 | 3/2009 | Feldman et al. |
| 2009/0084612 A1 | 4/2009 | Mattice et al. |
| 2009/0085894 A1 | 4/2009 | Gandhi et al. |
| 2009/0088203 A1 | 4/2009 | Havens et al. |
| 2009/0094561 A1 | 4/2009 | Do |

(56) References Cited

U.S. PATENT DOCUMENTS

| | | |
|---|---|---|
| 2009/0100129 A1 | 4/2009 | Vigil et al. |
| 2009/0104965 A1* | 4/2009 | House .................. G06Q 20/3674 463/20 |
| 2009/0106667 A1* | 4/2009 | Lyle ........................ G06F 3/147 715/750 |
| 2009/0118005 A1* | 5/2009 | Kelly ..................... G07F 17/32 463/31 |
| 2009/0122022 A1 | 5/2009 | Park et al. |
| 2009/0140986 A1 | 6/2009 | Karkkainen et al. |
| 2009/0143141 A1 | 6/2009 | Wells et al. |
| 2009/0144556 A1 | 6/2009 | Plet et al. |
| 2009/0150824 A1* | 6/2009 | Furuichi ................. G06F 21/84 715/803 |
| 2009/0156179 A1* | 6/2009 | Hahn ................... G06Q 10/101 455/414.1 |
| 2009/0183098 A1 | 7/2009 | Casparian et al. |
| 2009/0193366 A1* | 7/2009 | Davidson ............. G06F 3/0482 715/863 |
| 2009/0213091 A1 | 8/2009 | Davidovici |
| 2009/0231281 A1* | 9/2009 | Whytock ............ G06F 3/04886 345/168 |
| 2009/0244015 A1 | 10/2009 | Sengupta et al. |
| 2009/0249235 A1 | 10/2009 | Kim |
| 2010/0001967 A1 | 1/2010 | Yoo |
| 2010/0031202 A1 | 2/2010 | Morris et al. |
| 2010/0083109 A1* | 4/2010 | Tse .......................... G09B 5/00 715/702 |
| 2010/0083110 A1 | 4/2010 | Scott et al. |
| 2010/0085323 A1 | 4/2010 | Bogue |
| 2010/0097342 A1 | 4/2010 | Simmons et al. |
| 2010/0106607 A1* | 4/2010 | Riddiford .......... G06Q 30/0603 705/15 |
| 2010/0113140 A1 | 5/2010 | Kelly et al. |
| 2010/0118112 A1 | 5/2010 | Nimri et al. |
| 2010/0127992 A1* | 5/2010 | Schmid ............... G06F 3/04886 345/173 |
| 2010/0130280 A1* | 5/2010 | Arezina .............. G07F 17/3206 463/20 |
| 2010/0138780 A1 | 6/2010 | Marano |
| 2010/0179864 A1 | 7/2010 | Feldman et al. |
| 2010/0185681 A1 | 7/2010 | Han |
| 2010/0193258 A1* | 8/2010 | Simmons .............. G06F 3/0416 178/18.06 |
| 2010/0194703 A1 | 8/2010 | Fedor et al. |
| 2010/0283747 A1 | 11/2010 | Kukulski |
| 2011/0055729 A1 | 3/2011 | Mason |
| 2011/0138284 A1 | 6/2011 | Wigdor |
| 2011/0216064 A1 | 9/2011 | Dahl |
| 2011/0293094 A1 | 12/2011 | Os et al. |
| 2011/0296508 A1 | 12/2011 | Os et al. |
| 2012/0162351 A1 | 6/2012 | Feldman et al. |
| 2013/0055113 A1 | 2/2013 | Chazin et al. |
| 2013/0127688 A1 | 5/2013 | Amiya et al. |
| 2013/0132885 A1 | 5/2013 | Maynard et al. |

FOREIGN PATENT DOCUMENTS

| | | |
|---|---|---|
| JP | 3086974 U | 10/2002 |
| JP | 2005-339006 A | 12/2005 |
| JP | 2006-065558 A | 3/2006 |
| WO | WO 97/035248 A1 | 9/1997 |
| WO | WO 00 16863 A1 | 3/2000 |
| WO | WO 01 37163 A1 | 5/2001 |
| WO | WO 2006/043255 A2 | 4/2006 |

OTHER PUBLICATIONS

Shen, et al., DiamondSpin: An Extensible Toolkit for Around-the-Table Interaction, Proceedings of the 2004 Conference on Human Factors in Computing Systems, CHI '04, Jan. 1, 2004 (Jan. 1, 2004), pp. 167-174, XP055121855, New York, New York, USA.

PCT Search Report in PCT/US2010/52308, dated Nov. 23, 2010 (Feldman, et al.).

Extended European Search Report; EP 08832576.6 dated Feb. 29, 2012.

EP 1st Examination Report; EP 08832576.6 dated May 17, 2013.

International Search Report for PCT/US2012/021777, dated Aug. 1, 2013 (Feldman, et al.).

Extended European Search Report; EP 10 82 2836 dated Jun. 13, 2014.

Japanese Office action for JP 2012-533388 dated Aug. 5, 2014.

Chinese Office action for CN 201080055793.7 dated Aug. 4, 2014.

International Search Report for PCT/US2014/030206, dated Oct. 31, 2014 (Feldman, et al.).

USPTO Office action dated Dec. 18, 2015 for U.S. Appl. No. 14/090,785; Fedor, et al.

USPTO Office action dated May 9, 2016 for U.S. Appl. No. 14/049,929; Feldman, et al.

USPTO Office action dated May 26, 2016 for U.S. Appl. No. 14/014,913; Feldman, et al.

USPTO Office action dated Sep. 16, 2016 for U.S. Appl. No. 14/014,913; Feldman, et al.

USPTO Final Rejection dated Nov. 23, 2016 for U.S. Appl. No. 14/049,929.

USPTO Final Rejection dated Nov. 2, 2016 for U.S. Appl. No. 13/974,458.

USPTO Office action dated Apr. 22, 2016 for U.S. Appl. No. 13/974,458; Feldman, et al.

USPTO Interview Summary dated Oct. 30, 2018 for U.S. Appl. No. 13/974,458; Feldman, et al.

USPTO Final Rejection dated Dec. 19, 2018 for U.S. Appl. No. 13/974,458; Feldman, et al.

* cited by examiner

Type - light, amber, hoppy wheat, dark
Most Ordered
Highest Ranked
Expert Opinion

FIG. 9E

Ordered Quantity:
by me: 1
Dish 2
Drink3 1
Ordered by Table:
Dish 2 1
Drink 4 2

FIG. 9F

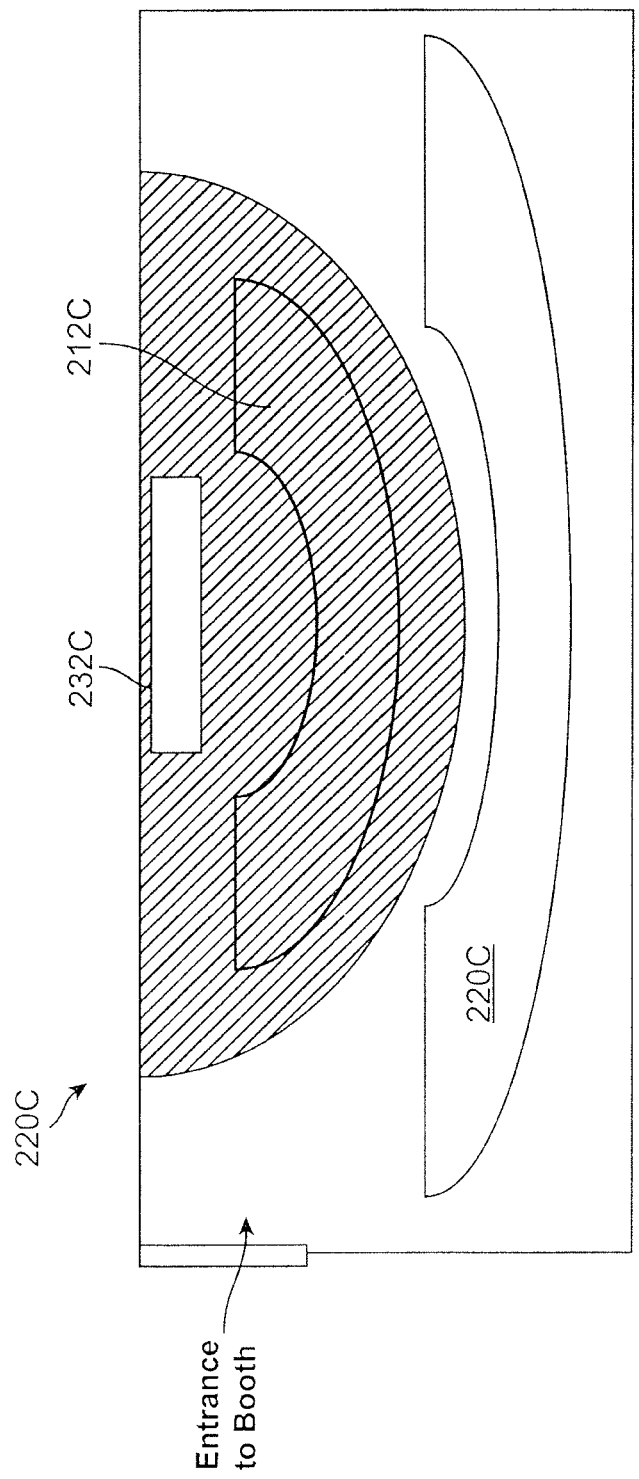

MULTIMEDIA, MULTIUSER SYSTEM AND ASSOCIATED METHODS

CROSS-REFERENCE TO RELATED APPLICATIONS

This application is a continuation of U.S. Ser. No. 14/049,929 filed Oct. 9, 2013, which is a continuation-in-part of U.S. patent application Ser. No. 13/974,458 filed Aug. 23, 2013, which is a continuation of application Ser. No. 13/764,593, filed Feb. 11, 2013, now U.S. Pat. No. 8,522,153 issued on Aug. 27, 2013, which in turn is a continuation of U.S. patent application Ser. No. 12/588,774 filed on Oct. 27, 2009, now abandoned, and entitled "Multimedia, Multiuser System and Associated Methods," which is a continuation-in-part of U.S. patent application Ser. No. 12/222,670, filed on Aug. 13, 2008, now U.S. Pat. No. 8,583,491 issued Nov. 12, 2013, entitled "Multimedia Restaurant System, Booth and Associated Methods," and claims priority under 35 U.S.C. § 119(e) to U.S. Provisional Application Ser. No. 60/994,458, entitled "Multimedia Restaurant and Booth", filed on Sep. 20, 2007, and to U.S. Provisional Application Ser. No. 61/272,591, entitled "Multimedia, Multiuser System and Associated Methods", filed on Oct. 9, 2009, all of which are hereby incorporated by reference in their entirety for all purposes. Said U.S. Ser. No. 14/049,929 is also a continuation-in-part of U.S. patent application Ser. No. 12/650,684, filed on Dec. 31, 2009, now U.S. Pat. No. 8,600,816 issued on Dec. 3, 2013, and entitled "Multimedia, Multiuser System and Associated Methods," which is a continuation-in-part of said U.S. patent application Ser. No. 12/588,774, which is a continuation-in-part of said U.S. patent application Ser. No. 12/222,670, all of which are hereby incorporated by reference in their entirety for all purposes.

BACKGROUND OF THE INVENTION

1. Field of the Invention

Embodiments may be directed to a multimedia, multiuser system and a table therefore, in which at least some of the stations in a setting include the table, which controls video and audio inputs for at least two displays.

2. Description of the Related Art

Current systems use an integrated touch screen/display device, i.e., the same display surface is used to control media filed and to display media files. However, such a system involves numerous compromises in performance for both the touch screen interface and the display itself.

SUMMARY OF THE INVENTION

One or more embodiment is directed to a multiuser, multi-interface computing system, including a computer system; and a continuous substrate including a first surface and a second surface. The substrate may include at least two touch sensitive regions, each touch sensitive region including a continuous touch sensitive surface that covers at least a portion of at least one display and an individual interface for selecting applications, the touch sensitive surface is configured to serve as the primary input to the computer system, the continuous substrate is transparent within the touch sensitive regions, and the multiuser, multi-interface computing system is configured so that the at least two users can use the touch sensitive regions simultaneously.

The computer system may be a single computer.

The first surface of the continuous substrate is a top surface that forms a top surface of a table.

The display may include at least two different displays and each of the at least two touch sensitive regions covers a different display.

The multiuser, multi-interface computing system may include opaque material between a top surface of the substrate and elements of the system other than a display region of the at least two displays.

The opaque material may be patterned on to a bottom surface of the substrate in order to block the view of elements of the system other than a display region of the at least two displays.

The continuous substrate may include a touch sensitive sensor between a bottom surface of the transparent substrate and a corresponding display of the at least two separate displays, the touch sensitive sensor being in communication with the computer and the sensor configured to detect gestures made on or near the top surface of the substrate.

The touch sensitive regions may be clearly marked with pre-determined boundaries and may further include at least one region between the at least two touch sensitive regions which is not sensitive to touch or gestures.

Each touch sensitive surface may cover a larger region than that occupied on the substrate by a display region of the corresponding display.

Each touch sensitive region may have a separate controller, with both controllers connected to the computer, the computer configured to operate in extended desktop mode to drive the at least two displays, so that different images can be displayed on the at least two displays and the computer and controllers further configured so that the computer is able to distinguish touches in a first touch sensitive region from those in a second touch sensitive region.

At least one display may include at least one region, each region configured to enter a sleep mode after a predetermined period of time and to bring up a navigational menu in response to a touch in that region.

The at least two touch sensitive regions form a single continuous touch sensitive region.

The multiuser, multi-interface computing system as may include a secondary screen, separate from the substrate.

The computer system may be configured to detect touches by users on at least two touch sensitive regions, combine the information associated with touches, and to display information on the secondary screen.

The touches may represent votes.

The votes may be for particular media files, the secondary screen displaying a most voted for media file on the secondary screen.

The touches may be associated with user designed elements that are simultaneously displayed on the secondary screen.

BRIEF DESCRIPTION OF THE DRAWINGS

FIG. 9A to 9F illustrate examples of a generic item menu of the drink lower level menu in accordance with an embodiment;

FIGS. 14A-14C illustrate variations on the booth of FIG. 2 in accordance with embodiments;

FIGS. 17A to 17I illustrate screen shots for different stages of use of the connection table in accordance with embodiments;

DETAILED DESCRIPTION OF EMBODIMENTS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

As used herein, the term "user" may refer to either a customer at a venue or a venue employee.

Multimedia Restaurant System Overview

Figure 1:
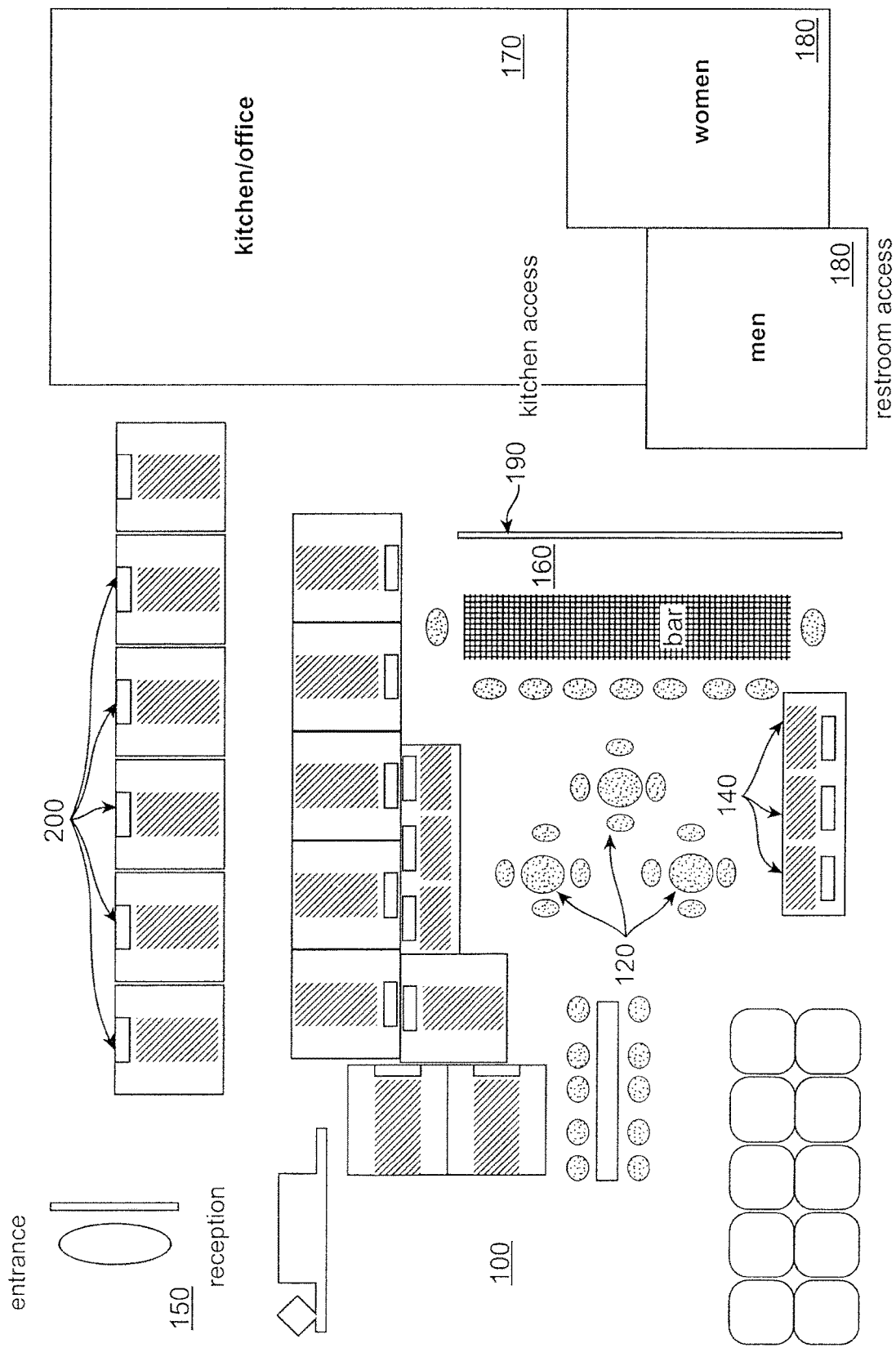
FIG. 1 illustrates a floor plan of a restaurant system, including a plurality of booths, in accordance with an embodiment.

As illustrated in FIG. 1, a multimedia restaurant system 100 may include multimedia booths 200, conventional tables 120, and individual computer stations 140 arranged in a floor plan. The multimedia restaurant system 100 may also include other conventional amenities, e.g., a reception area 150, a bar 160, a kitchen/office 170, restrooms 180, and a separator 190 obscuring a view of the kitchen/office 170 and the restrooms 180 from the remainder of the restaurant.

Multimedia Booths

Figure 2A:
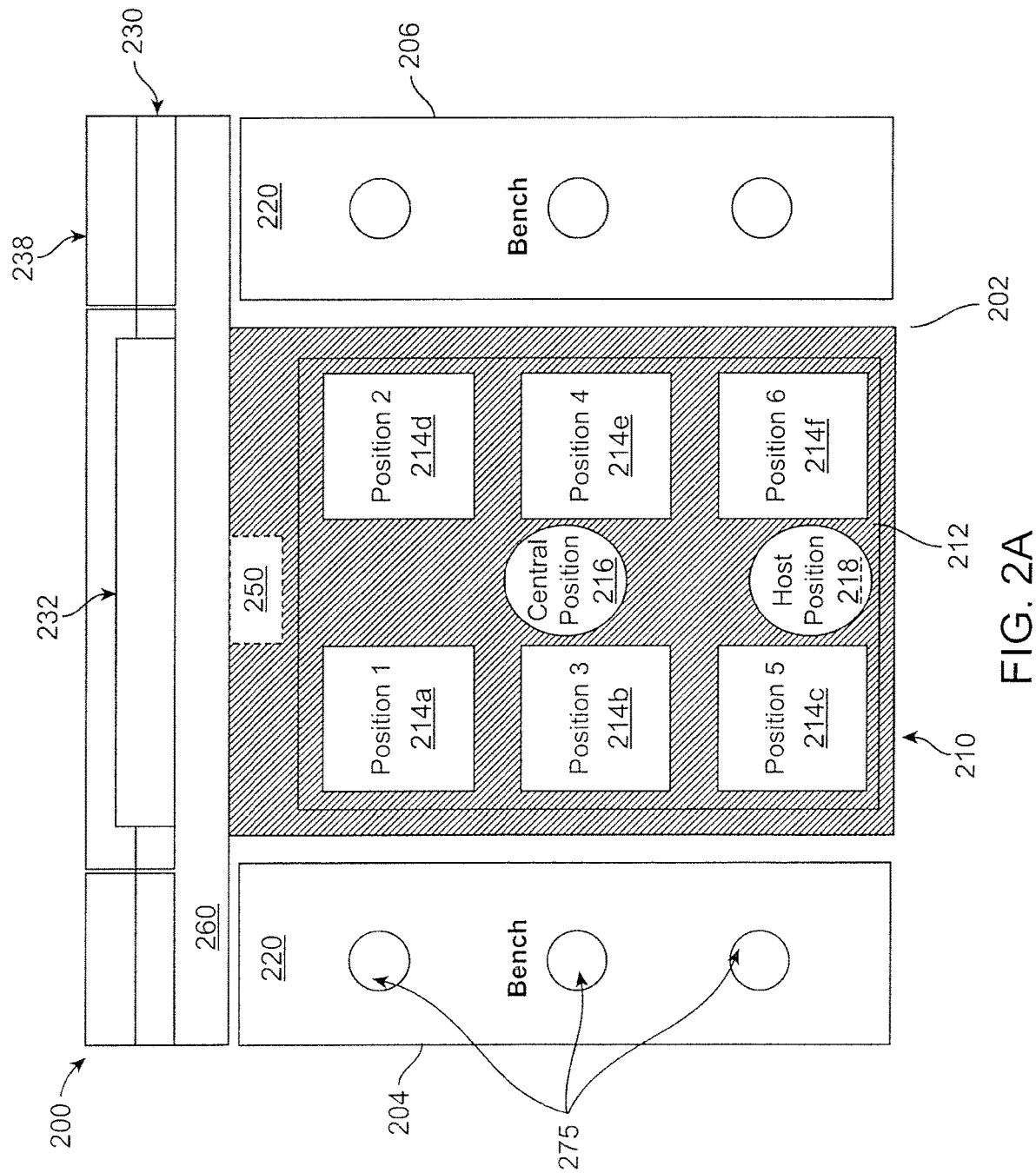
FIG. 2A illustrates a plan view of a booth in accordance with an embodiment.
Figure 2B:
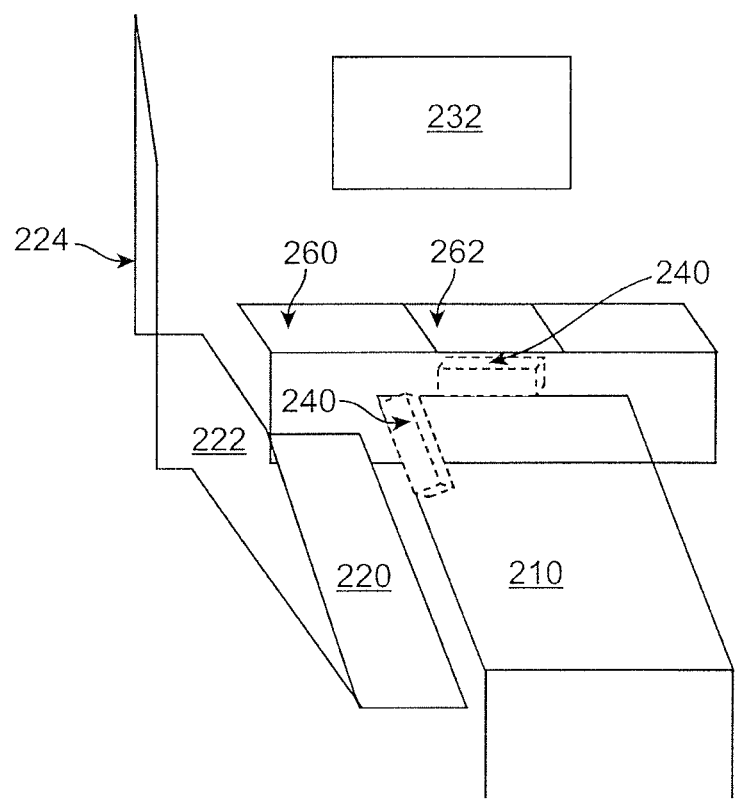
FIG. 2B illustrates a partial perspective view of a booth in accordance with an embodiment.

As illustrated in FIGS. 2A and 2B, each multimedia booth 200 may include a table 210, seating 220, and at least one wall 230. One side 202 or a portion thereof may be open and may serve as an entrance to the booth 200. At least one side 204, 206 of the booth 200 may have seating 220, e.g., chairs or benches. Another side 208 of the booth 220 may include the wall 230 that has a wall display 232 thereon. The wall display 232 may be viewable from all positions in the seating 220.

All closed sides, e.g., 204, 206, 208, may be built so that they are higher than normal restaurant booths and/or have less open space to reduce the sound coming from any locations in the restaurant outside of the booth 200, and may be treated with additional known sound proofing and/or audio enhancing techniques. For example, typical heights of backs of the seating stations are between 36-42 inches, while embodiments envision increased privacy without being too enclosed and may include having heights of backs 222 of the seating 220 greater than about 50 inches, e.g., 54 inches. These backs 222 may include the cushioning for the seating 220. Additionally, a partition 224, e.g., a transparent partition, may extend upwards from the back 222, e.g., up to the ceiling.

Further, closed sides adjacent seating 220, e.g., sides 204, 206, may include speakers 275 associated with each seating therein. These speakers may be designed so that the sound emanating from the speakers may be louder inside the booth 200 and quieter outside the booth 200, including neighboring booths. Alternatively, the speakers 275 may be incorporated into the seat backs of the seating 220. Alternatively or additionally, speakers 275 may be above the seating 220, in the ceiling, in the side walls 204, 206, and/or in the wall display 232. The speakers 275 may be directional speakers with the sound directed toward locations near ears of those seated in seating 220 in the booth 200.

Alternatively, the closed sides, e.g., 204, 206, 209, may have conventional restaurant heights. The displays in these booths may be solely for visual purposes, e.g., no audio may be output.

The table 210 may be suitable both for eating and interacting with electronic media, and may include a table display 212, e.g., a touch screen. Interacting with electronic media may include any of the following: viewing photos on an electronic display, editing photos, viewing videos, editing videos, listening to personal music, ordering food, obtaining information about food, searching the web, telephone conferencing, paying for food or other services, video conferencing, playing video games, and so forth. The table display 212 may cover most of the table 210, as indicated by the outline on the table 210, and/or may be divided into a plurality of regions, individual positions 214a to 214f, e.g., corresponding to seating positions, a central position 216 and a host position 218.

As illustrated in FIG. 2A, each booth 200 may include two displays, i.e., the table display 212 and the wall display 232. Both displays may be connected to a booth computer 250. The table display 212 may serve as an input device for the wall display 232. As discussed in detail below, the wall display 232 may display customizable environments. The booth computer 250 may include a box containing a processor and other components, e.g., storage devices, graphics cards and I/O ports, such as in typical computers, e.g., a Mac mini® or Mac pro® made by Apple, Inc. The booth computer 250 may include two graphics cards and two video cards for respectively driving the table display 212 and the wall display 232. The booth computer 250 may include an amplifier to allow further control of audio/video outputs to the wall display 232. Alternatively, the amplifier may be external to the booth computer 250, as discussed below in FIG. 2J. The booth computer 250 may be built into the wall display 232.

The booth 200 may further include a storage area 260 for a user's device and connection jacks to enable direct hard wired connection of the user's device to the booth computer 250 or the wall display 232. The storage area 260 may be a shelf between the end of the table 210 and the wall display 232. For example, the storage area 260 may be a shelf so the user's device may be stored horizontally or vertically. In the case of horizontal storage, the shelf may be arranged so the user may use the keyboard or other input mechanism of the user's device. For example the storage area 260 may be between 6 inches and 14 inches wide, may be a same height as or higher than the table 210. This makes the storage area 260t wide enough to place a user's device up to the size of a typical laptop on the storage area 260 to the side of the wall display 232. Additionally or alternatively, as illustrated in FIG. 2B, the storage area 260 may include an access door 262, e.g., a hinged or sliding door, providing access to cables via an I/O port box 240 allowing connection to the booth computer 250 and/or the wall display 232.

An infrared (IR) transmitter may be connected to the booth computer 250, as discussed below with reference to FIG. 12J. The IR transmitter may be hidden from view from the user. The IR transmitter may be stored underneath the seating stations 220 and located near the booth computer 250 so that the IR transmitter may be directly connected to the booth computer. The IR transmitter may be controlled by the booth computer 250 to send IR signals to the wall display 232 in a manner that emulates the remote control for the wall display 232. The IR transmitter may also be configured to send IR signals to the amplifier or the amplifier can be connected directly to the booth computer. In this manner a user can control functions normally provided by conventional remote controls by tapping the table display. Inputs to the display may be routed to the booth computer 250 that may operate the IR transmitter to effectively operate as a remote control.

The user I/O port box 240 may be on at least one of a side of the table 210, under the table 210, on the wall 200, in the wall 200, on the storage area 260, or under the storage area 260. As illustrated in FIG. 2B, the booth 200 may include more than one I/O port box, e.g., the I/O port box 240 under the table 210 and the I/O port box 240 under the storage area 260.

Figure 2C:
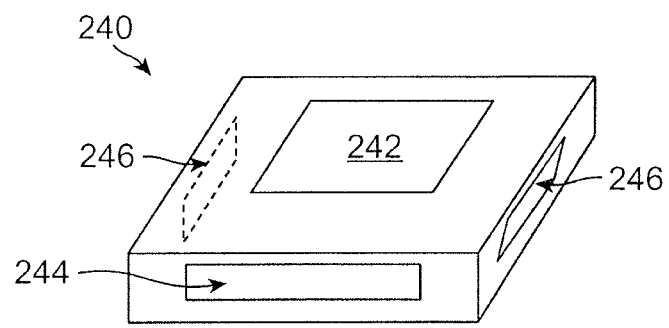
FIG. 2C illustrates a schematic perspective view of an I/O port in accordance with an embodiment.
Figure 2D:
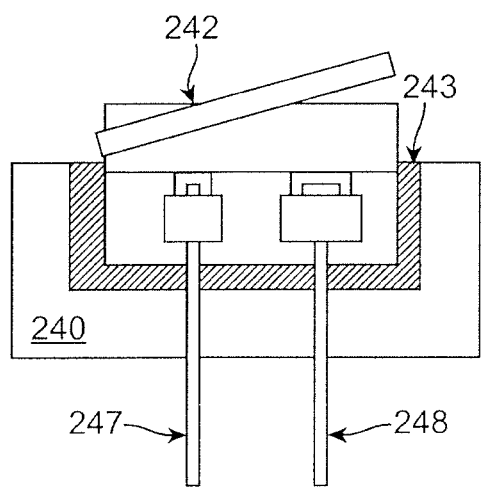
FIG. 2D illustrates a schematic sectional view of an I/O port in accordance with an embodiment.

As illustrated in FIGS. 2C and 2D, each user I/O port may include a USB port 244, power outlets 246, and multiple cables, e.g., a VGA cable 247 and an Ipod®/Iphone® cable 248, a door 242 covering the multiple cables, and a removable section 243 through which the cables may extend. Additionally or alternatively, each user I/O port box 240 may include external ports for various types memory cards or other storage devices, a digital video interface (DVI) cable, an audio cable, a docking station for a laptop, a wireless connection, an Ethernet connection, blue tooth or wife, and so forth. When a user's device is connected, this connection may allow the laptop to use the wall display 232 as a display, but may not connect to the booth computer 250 itself.

Alternatively or additionally, a USB card reader may be an external device that is connected to the booth computer 250. This external USB card reader may be mounted on the wall near the wall display 232 (e.g., under the wall display 232 and above the table). This external USB card reader may be connected to a USB port on the booth computer 250 and may allow any flash memory, camera memory, thumb drive, and so forth, to be connected to the booth computer 250.

As illustrated in FIG. 2A, the table display 212 may include first through sixth individual positions 214a-214f. Initially, the table display 212 and/or the wall display 242 may be in a logo mode, in which a still logo, a moving logo, nothing (blank screen), video animation of the logo, or other still image or video may be displayed. Initially, the table display 212 may display a single screen over an entire surface thereof.

Once the table display 212 has been touched in any of the individual positions 214a-214f, that individual position may display an initial menu mode (IMM). Other individual positions that have not been touched may continue to display individual images present in the logo mode, or may also display the IMM. Additionally or alternatively, touching the host position 216 may display the IMM in all individual positions.

Alternatively, an entirety of the table display 212 may be centered on the location of the touch that activates the screen. As a further alternative, display of the table display 212 may be re-positioned or re-sized by dragging the window within the table display 212.

The table display 212 may be set in to any of several "functional modes." Functional mode examples include single person mode, two person mode, four person mode, six person mode, full mode, and so forth. The examples described above assumed six person seating. In the four person mode, the table display 212 may be divided into quadrants. In two person mode, the table display 212 may be divided into halves, e.g., one region may be oriented towards the person on the left side of the table 210 and the other region to the person on the right side, and so forth. In the full mode and in the two person mode, a button may be provided to allow rotation of the display. Tapping this rotate button may cause the display to be rotated so that if the person viewing the display is on the other side, the display can be rotated to the correct orientation, or, if two people are sitting on opposite sides of the table, one person may rotate their display to show to the other person.

When a region is in IMM, if the table display 212 is not touched within a particular individual region after a short period of time (the IMM timeout period), then the corresponding region may revert back to the logo mode. If all regions are in logo mode, then an image or video covering a large portion or substantially all of the table display 212 may be displayed. Otherwise, if at least one region is activated, then the regions that are not activated may display the logo mode.

The automatic abandonment of IMM may allow the following operations to be realized. First, if a user accidentally touches the table display 212, the IMM menu may disappear after the IMM timeout period. Second, if a glass or plate is placed on a region in Logo mode, the corresponding region may be placed in IMM mode, but after a short period of time revert back to the logo mode. Third, if a user decides not to enter anything electronically, then their menu will disappear.

The regions not being used may remain in the logo mode. Then, any time a region in the logo mode is accidentally activated, the region may only be activated for the IMM Timeout Period and then revert back to the logo mode. This may not the case for lower level menus. For example, if a region in the IMM is accidentally touched in a position corresponding to a lower level menu, that region of the table display 212 may display that lower level menu and the corresponding timeout period may be significantly longer or non-existent. Every time the screen is "tapped" the computer may interpret such as tap as receiving a mouse click, i.e., each tap is a click. When a section goes past the timeout period with no clicks it goes in to logo mode. If the table display 212 is in the logo mode, the table display 212 may return to a previous section displayed, before going to sleep. Then, if there are no clicks registered for a short timeout period, the table display 212 may go back to sleep. The long timeout period may only be used if the table display 212 wakes up and then there is a click registered that triggers an action. That is, if the click happens outside of any positions corresponding to an action, the click may be ignored. A click on a position that causes the menu to move or change the table display 212 in some manner may be considered an action.

All of the above may assist in providing a user interface that is easy to use and intuitive to understand. Displaying multiple screens at one time may be confusing to users. Therefore, display of minimal information needed to prompt a user for input may be provided.

The table display 212 in the table 210 may allow glasses and dishes to be placed on it and may be easily cleaned. One such touch screen may sense vibrations in the glass when the glass is tapped. Such a vibration table may be thinner than other types of touch screens. However, such a touch screen may have difficulty in distinguishing between a finger tap and a tap that occurs when an object is placed on the screen. However, an object that is placed on the glass and remains on the touch screen will not continuously trigger the touch screen sensor.

The table 210 may have a hole therein to receive the table display 212, which may be flush with an upper surface of the table 210. Alternatively, the table 210 may be made of a transparent material, e.g., glass. A projector may be placed underneath the table 210 to from the table display 212 on the underside of the table 210. The table 210 may be a touch screen display, e.g., either single touch or multi-touch. Alternatively, the table display 212 may be mounted in one section of the table 210, or a top of the table 210 may be transparent in one section of the table 210. If the table 210 or a section of the table 210 is transparent, then the table display 212 may be projected on to the underside of the table 210, or a display, e.g., an LCD display may be mounted underneath the table 210 and viewed through the transparent table 210 or portion thereof.

Any of the above configurations of the table display 212 may allow conventional dining table, e.g., having an upper surface height of about 30 to 36 inches, and seating heights to be realized. In other words, a seated user typically will be able to fit their knees under the table. In particular, in accordance with embodiments, a touch screen may be integrated into a table top or other mount mechanism, and the touch screen may control media, may allow interaction with others on a table, and may allow objects to be placed thereon, without affecting operation of the touch screen in areas adjacent to the object. For this application, a touch screen with the following characteristics are desired: thin screen, large area, robust surface, ability to place objects on screen and have the screen still function, high display resolution, high detection resolution, ability to withstand hot and cold temperature objects, ability to withstand spillage of liquids on surface, and ability to be used by multiple users simultaneously.

The desire for a large surface area limits many options for the technology to be used for the touch screen. For small touch screens (less than about 10 inch diagonal), capacitive technology, e.g., technology used in the Iphone®, may be employed.

For larger touch screens, the most popular technology employed is based on disruption of a field between transmitters and receivers placed around the edges of the touch screen (e.g., LEDs and detectors). The problem with this approach is that if an object is placed on such a touch screen, the object blocks the transmit and detect mechanism for the entire row and column in which the object is located, i.e., the object disrupts the field and that portion of the touch screen may no longer be employed. This limits use in an environment where objects, e.g., glasses, cups, plates, etc., are to be placed on the touch table.

Another approach for large touch screens is to use cameras to view objects on the table, either from under the table or above. If placed above the table, then the touch table is not self-contained. This means that the table can not be moved without also moving and aligning the camera. Also, the view from the camera to the table cannot be obstructed. This makes this solution impractical for use in the environments described herein. Typically a single camera is used. If a single camera is used the camera is typically placed a distance from the screen, further away than the largest dimension of the touch surface. This results in a thickness of the table larger than the thickness of the largest dimension of the touch screen active area. Microsoft® Surface® uses multiple cameras and IR transmitters to alleviate this problem, resulting in a table thickness of 21 inches or approximately 0.7 times the 30 inch diagonal of the touch screen.

One alternative for a touch screen that overcomes one or more of the disadvantages noted above for previous touch screen/display limitations is a touch screen using a surface detection scheme rather than the use of a camera. Such a touch screen may be usable in settings where people gather to interact, e.g., work, learn, have fun, etc. A touch screen for such settings may have one or more of the following features: thin screen, large area, robust surface, ability to place objects on screen and have the screen still function, high display resolution, high detection resolution, ability to withstand hot and cold temperature objects, ability to withstand spillage of liquids on surface, ability to be used by multiple users simultaneously, etc.

A thin screen may be desirable for many applications in which the touch screen is to be integrated into a table top where people can sit and place their legs underneath. This requires a thickness of table of less than 12 inches and preferably less than 8 inches thick.

For example, an ordinary flat panel display may be attached to a flat thin piece of glass (cover glass) to the surface. The electronics for the touch screen may be in a periphery of the display. The display/cover may be dropped into a table having a corresponding section removed or may be used with any mechanism to place the touch screen at a desired height. "Surface detection" scheme as used herein is to mean a scheme that detects touch location with components located on or near the cover glass. "Sub-surface detection" scheme as used herein is to mean a scheme in which the detection mechanism occurs below the top surface of the glass. Examples include acoustic waves, vibration waves, bending waves, etc., that travel within the solid body, e.g., 3M® MicroTouch® system using dispersive signal technology (DST). These sub-surface detection schemes have the advantages of robustness, since conventional high quality glass can be used with electronic detection mechanisms incorporated around the edges underneath. This makes the top surface very robust and easily cleaned.

In one embodiment, a surface detection scheme may be used in conjunction with a conventional LCD flat panel display, e.g., an NEC MultiSync LCD3210 having a 32 inch diagonal display with a thickness of 5.5 inches. The thickness of the cover glass may be 1.5 inches, making the total thickness of the LCD and cover glass sandwich about 7 inches thick. This unit may be mounted to be flush with the top of the table, so the table thickness is also about 7 inches. In another embodiment, a Samsung 40 inch LCD display is used which is back lit by LEDs and is only 1.2 inches thick. With this technique the total thickness of the touch screen table top is only 2.7 inches thick for a 40 inch diagonal display or a ratio of table thickness to touch screen diagonal of 0.07.

In yet another embodiment, the touch screen may be integrated into a coffee table. For example, an NEC 42 inch LCD flat panel display may be used. The total thickness of the touch screen (including the LCD and touch electronics) was 6.7 inches. The total thickness of the table was 19 inches. The ratio of the touch screen thickness to diagonal was 0.16 and the ratio of the table thickness to the touch screen diagonal was 0.45.

As an alternative to a flat panel display, other displays may be used, e.g., front projection, rear projection, dlp, OLED, other similar technologies that will form an image from the computer on the touch screen In each of the above examples the area of the screen that is displayed is approximately the same as the area that is able to detect touches. That is, the surface detection screen area covers the entire area or nearly the entire area of the image displayed on the touch screen by the LCD display or related projection display.

When the computer used in the table is sufficiently small, e.g., a Macintosh mini, which is only 2 inches in height, the computer may be mounted to the bottom of the table without increasing the table thickness so as to interfere with seating.

These sub-surface detection schemes provide numerous advantages. However, these sub-surface detection schemes are not inherently multi-touch. This makes it difficult to use these technologies for multiple users. In other words, taps on the touch screen generate signals sequentially. Typically, signals generated may be touch initiated (or a mouse down click), location of the touch, and touch removed (or mouse up). In single touch technologies, only one signal is generated at a time, as opposed to a true multi-touch screen, in which many signals may be transmitted by the touch screen simultaneously to the computer. With other single touch technologies, for example resistive technology, two simultaneous taps produce a tap at a location midway between the two points. With sub-surface detection schemes, a tap will be detected at the correct location, but only either the first or second location, i.e., not both.

For this reason, if two touches on the screen occur in quick succession in a sub-surface detection scheme, it is difficult to determine whether one person has tapped the screen with his finger and moved his finger to another position, or if two people have tapped the screen. In the first case, one action should be performed by the computer, while, in the second case, two actions should be preformed.

However, in accordance with embodiment, enhanced single touch operations may be realized with a sub-surface detection scheme, such that when two users touch simultaneously in different sub-screens, only a single signal is provided to the computer. One solution may divide the screen into multiple regions or sub-screens, e.g., four quadrants as shown in FIG. 12J or six sextants as shown in FIG. 2A. If the two taps are performed in one sub-screen, then the computer may interpret the two taps as coming from one user. This could be a click and drag or a change in the button that is tapped. In either case one action would be performed. If the taps occur in two different sub-screens, then the computer may interpret these two taps as coming from two different users and two actions may be performed simultaneously, each within the corresponding sub-screen.

This becomes especially difficult to manage when two or more users are tapping the screen in different sub-screens and one or more users is performing a gesture or continuous action, e.g., a click and drag operation, such as drawing a line in a picture. As used herein, a gesture is an action that includes movement in addition to a tap, e.g., a swipe, drawing of a line, or using two fingers to expand a picture or box, and so forth. In this case, the touch screen using sub-screen detection will oscillate back and forth between the sub-screens and give multiple "false" mouse up and mouse down signals. The false signals are due only to the oscillation of the virtual mouse between the various sub-screens. To operate in an enhanced single user mode, e.g., that allows gestures such as drawing to be performed, the software needs to recognize these false mouse up and mouse down signals and reject them. In addition, there will be gaps in a continuous drawing of a line on screen that occurs when the signals are transferred to the computer from other sub-screens. However, the software may be designed to recognize this as a continuous action, by noting that a tap in a different sub-screen is from a different user. For example, if a click and drag occurs within a first sub-screen, followed by a click (mouse down) in a second sub-screen, and then a click and drag in the first sub-screen, the software may interpolate between the two click and drags in the first sub-screen. Thus, continuous touch may be performed uninterrupted by a first user while still allowing other users to control the computer to perform additional actions.

For example, if a first user performs a first touch in a first sub-screen and a second user performs a second touch in a second sub-screen while the first touch is still being performed, the second touch may cause a "gap" in the performance of the first touch. In other words, the second touch in the second sub-screen may interrupt the first touch. If continuity of the first touch is important, e.g., the first touch is drawing; such an interrupt may cause gaps, odd lines, or other errors. However, by recognizing that the second sub-screen is different from the first sub-screen, the first touch will not be interrupted, even though the second touch was performed during the first touch. Thus, the computer may be configured to perform an action in response to the second touch while not interrupting the first touch.

Additionally, a number of sub-screens may be chosen and changed by the user. Buttons are placed as in FIG. 2A to change the number of users at the table. If the 2 user mode is chosen then the screen is divided in to two sub-screens. It may be advantageous to have a different number of sub-screens for different scenarios. For example, if six people sit at a table and each wants to order their own food, the screen may be placed in 6 person mode. Then, if they want to view a long list, for example of music videos to play, they can switch to 2 person mode. Some games may be better suited to 2 person, 4 person or 6 person mode or to a single screen mode.

The table display 212 may serve as a control screen for the wall display 232. A user may use the table display 212 to determine the images to be shown on the wall display 232. That is, the table display 212 may be used for typing, editing and finding files, moving files, various control functions, and so forth. The wall display 232 may be used for viewing and displaying images, videos, text, and so forth. Alternatively, multiple users may use the table display 212. Touch screen controls may be built into both the table display 212 and the wall display 232.

As a further alternative, the table display 212 may be mounted on top of the table 210, such that the table 210 does not need to be transparent. Thus, the table display 212 may be mounted vertically, may be a pop-up display, or may be built into the top of the table 210.

The table display 212 and the wall display 232 may be electronic displays, e.g., LCDs, plasma screens, projection displays or DLPs, i.e., any display technologies that may be used for flat panel TV's or computer monitors.

Booth States

The booth 200 may have a plurality of states associated therewith to aid in the restaurant flow. The states may only be viewable by restaurant staff, e.g., at a point of service (POS) station. States may be indicated by a number and/or a color: Examples of states may include:

0: Booth ready, no one seated;
 1: Customers seated, orders not yet placed
 2: Order placed, customers waiting for food;
 3: Food delivered, customer not yet paid (at this point, customers may order more food, sending state of table back to state 2);
 4: Bill delivered, customer not yet paid;
 5: Bill paid, customers have yet left; and
 6: Customers have left, table not yet cleaned.

If a booth 200 stays in one state for too long, notification may be sent to the responsible server and/or manager, e.g., to their cell phone, pager or personal digital assistant. For example, as long as all states of the booth 200 have been in a given state for a time duration less that a specified practical time, which may vary in accordance with how busy restaurant is, the particular state the booth is in, etc., the booth will be OK, e.g., may be "green". Once a booth has been in a state for longer than this specified time, the booth may switch to a warning state, e.g., may be "yellow" state. The yellow state may result in notification to the server. After another specified period in a warning state, the booth may switch to a critical state, e.g., may be "red". The red state may result in notification to the manager. These stat discussed in detail below with reference to FIGS. 18A to 18E.

When customers are ready to place an order, they may hit a button, e.g., submit order or call server. This button may be on the table 210 separate from the table display 212 or on the wall 208 separate from the wall display 232. Additionally or alternatively, a submit order option may be placed on one or more of the menus discussed below, e.g., on the menu in FIG. 4A. Once a server comes by and verifies the order with the customers and enters it into the POS, the server may lock the order, as discussed with reference to FIG. 4E below. At this point, all the selected items so far would be become part of order 1 for the booth 200 and would become uneditable. Selecting an item after this point would become part of order 2 for the booth 200. Choosing selected items may then display two lists: order 1 and order 2, with only order 2 being alterable by the customers. Alternatively, just order 2 may be displayed, with an option to view previous order lists.

Mode Overview

Figure 3:
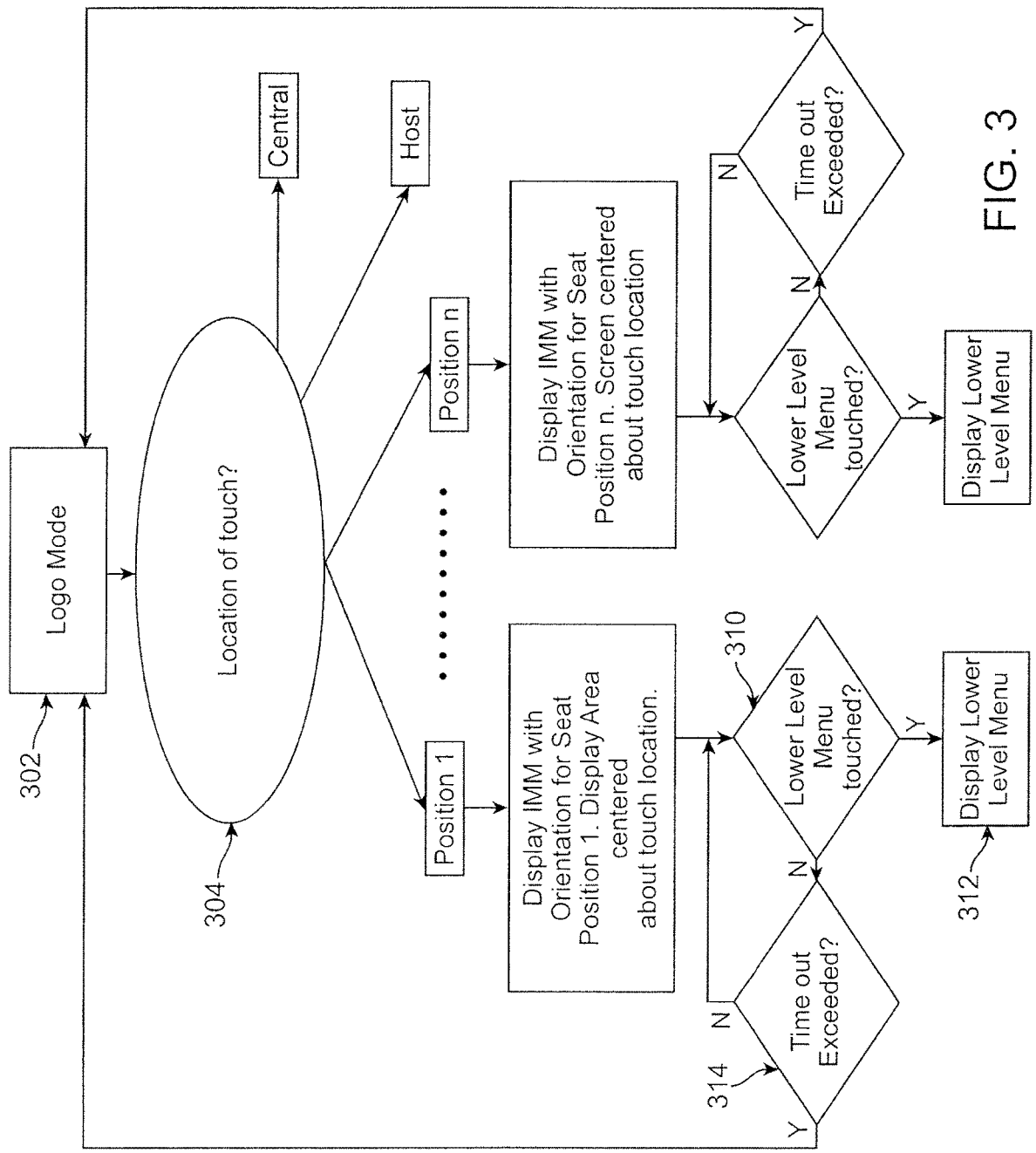
FIG. 3 illustrates a flow diagram of ordering using the table touch screen of the booth of FIG. 2 in accordance with an embodiment.

The use of the booth 200 generally will be discussed with reference to FIGS. 3-4F. FIG. 3 illustrates a flowchart of general ordering operations and FIGS. 4A to 4F illustrate examples of menus to be displayed.

As illustrated in FIG. 3, the table display 212 may default to the logo mode in operation 302. When the table display 212 is touched in operation 304, a corresponding location of the touch is determined. If the touch is in a position corresponding to a seating, the IMM may be appropriately displayed. If the touch is in a location other than a position, e.g., host or central, other menus may be displayed as discussed below. Then, in operation 310, occurrence of another touch is monitored. If another touch corresponds to selection of a lower level menu, the operation proceeds to the appropriate lower level in operation 312. If no touch is sensed, then the operation may proceed to operation 314 to determine whether a time out period has expired. If not, the operation may return to operation 310 to determine if another touch is sensed. If the time out period has expired, the operation may return to the logo mode of operation 302.

Figure 4A:
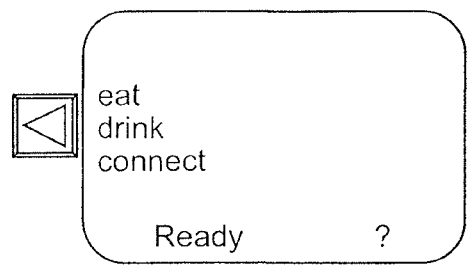
FIGS. 4A to 4F illustrate examples of menus to be displayed in accordance with an embodiment.
Figure 7:
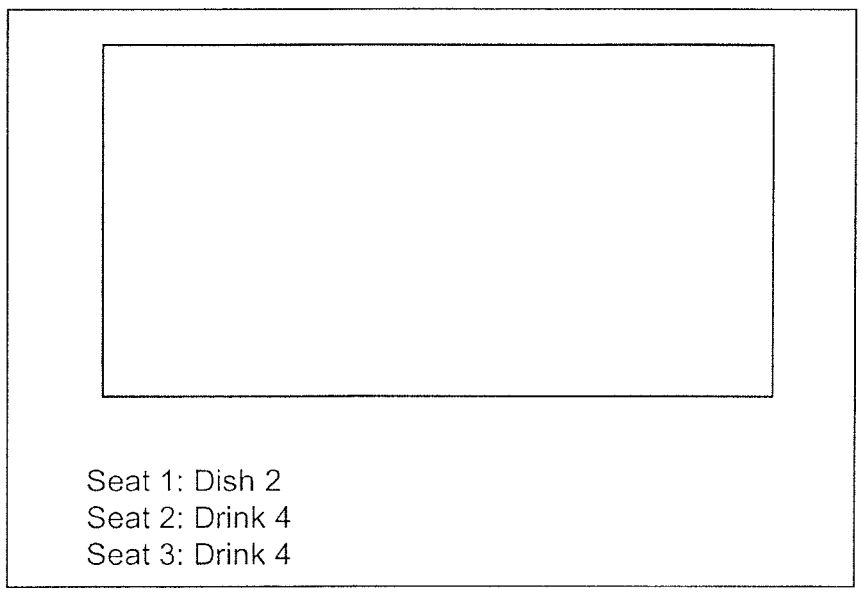
FIG. 7 illustrates a wall display after ordering in accordance with an embodiment.

FIG. 4A illustrates an example of an IMM. In the IMM of FIG. 4A, the options "eat", "drink" and "connect" may be presented. Further, "ready" and "?" may be provided in a separate portion of the menu from the three main options. When users have a question, they may hit the "?", which may remotely indicate to the assigned server that the booth 200 has a question or may visually indicated on the wall display 232 that the booth 200 has a question. For example, the wall display 232 may display, in a bottom portion thereof, a seat indicator for each position in the booth 200, as illustrated in FIG. 7. For example, these seat # may initially all be red, indicating there is no need to bother the customers in the booth 200. When "?" is selected by a customer, that seat # or all seat # may change to yellow, indicating assistance is requested. When "ready" is selected by a customer, that seat # or all seat # may change to green, indicating readiness to order. Use of visual cues on the wall display may allow any restaurant worker to attend to that booth 200.

Figure 4B:
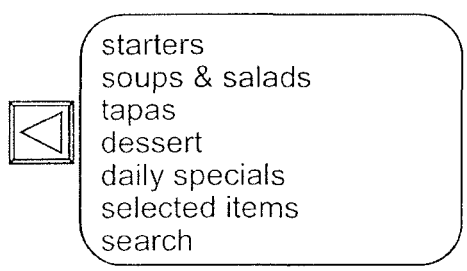
Figure 4C:
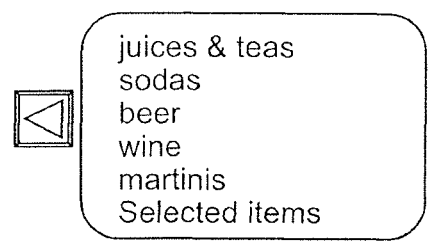
Figure 4D:
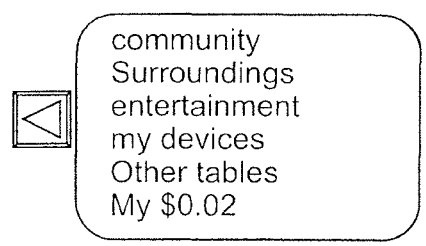

FIG. 4B illustrates an example of an eat lower level menu. FIG. 4C illustrates an example of a drink lower level menu. FIG. 4D illustrates an example of a connect lower level menu. In all FIGS. 4A to 4D, the back arrow will return the display to a previous page, e.g., IMM for the lower level menus and the logo mode from the IMM. These lower level menus will be described in detail below.

Figure 4E:
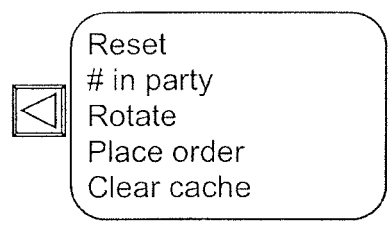
Figure 4F:

FIG. 4E illustrates an example of a host menu appearing when the host position 218 is touched. The host menu may be protected to only allow restaurant workers access. When the host touches this location various buttons may be displayed near the edge of the table 210, as illustrated in FIG. 4E, such as reset, # persons functional mode, rotate, place order and clear cache. The rotate button may allow rotation of the orientation of the menus to either side or to the end of the table 210. The reset button may erase any files that were copied onto a hard drive of the booth computer 250 during the session, sets the screen mode to logo mode, erases any food items selected and prepares the table 210 for the next customers. The place order button may allow the server to send the order to the kitchen for processing. The clear cache button may only erase all files copied onto the hard drive of the booth computer 250.

FIG. 4F illustrates an example of a central position menu, indicating how items may be displayed using the central position. In the particular example shown in FIG. 4F, images displayed in various seating positions may be dragged to the central position 216 to be displayed there and may be clicked again to display this image on the wall display 232.

Eat Mode

Figure 5A:
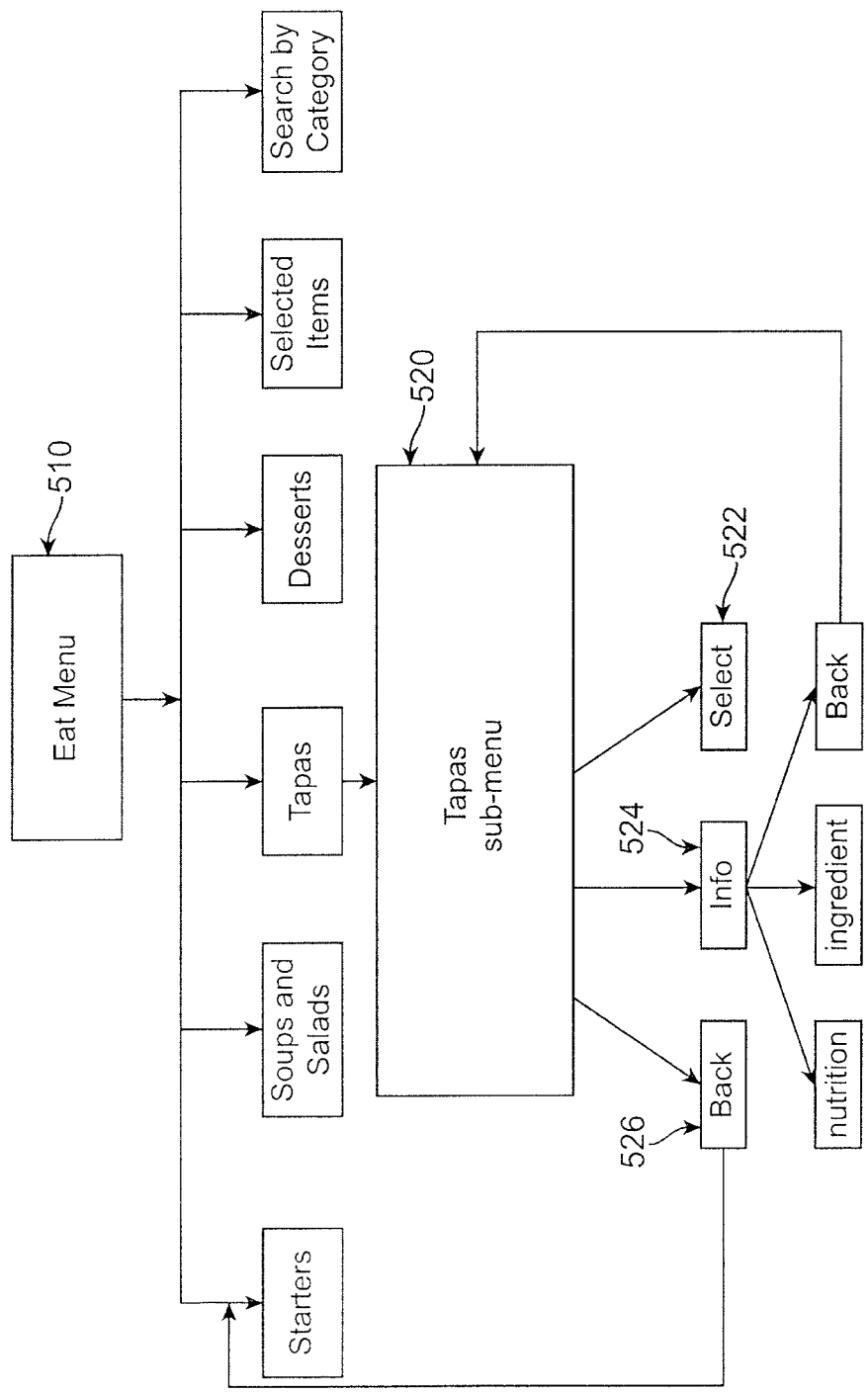
FIGS. 5A and 5B illustrate flowcharts for eat lower level menus in accordance with an embodiment.

Once a corresponding category of the eat lower level menu of FIG. 4B has been touched, a sub-menu corresponding to that category may appear, as illustrated in FIGS. 5A to 7. FIGS. 5A and 5B illustrate flowcharts for the eat lower level menu. FIGS. 6A to 6F illustrates examples of eat sub-menus to be displayed. FIG. 7 illustrates the wall display 232 after completion of the operation in FIG. 5A.

As illustrated in FIG. 5A, in operation 510, a category in the eat lower level is selected in operation 520. This may result in the sub-menu of FIG. 6A being displayed. As can be seen therein, "select" and "info" buttons may be next to each item Dish1 to Dishm, allowing each item to be selected or more information about each dish may be retrieved. Also, the ordered items may be listed on a bottom portion of the table display 212. Further, the ordered items may be displayed on the wall display 232, as illustrated in FIG. 7. If there are too many items to display at once, only some of these items may be displayed and up/down scroll button may be provided adjacent the list.

Figure 6A:
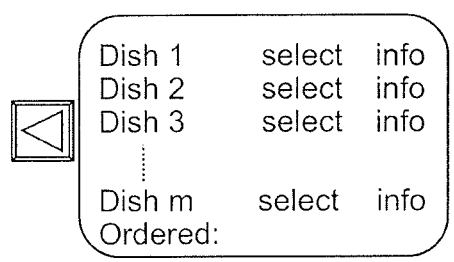
FIG. 6A to 6D illustrate an example of a generic item menu of the eat lower level menu in accordance with an embodiment.
Figure 6B:
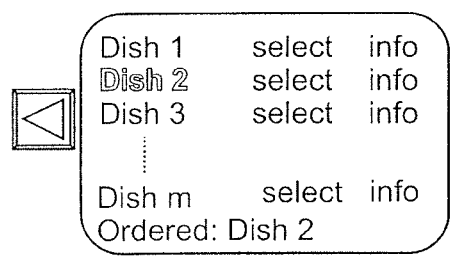
Figure 6C:
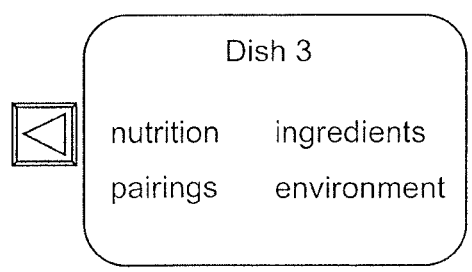

When an item is selected in operation 522, that item may be highlighted and added to the ordered items, as illustrated in FIG. 6B. When information about an item is selected in operation 524, the individual information for that item, here Dish3, may be displayed as shown in FIG. 6C. An image of that item may also be displayed. The individual information may include nutrition and ingredients, which, when touched, will display the corresponding detailed information. In addition, quantity ordered may be displayed on this screen along with buttons to increase or decrease the quantity ordered.

Alternatively, selecting a single item may cause that particular item to be highlighted, and select and info buttons, not originally displayed, to appear adjacent that item, e.g., next to the item or below it, thereby simplifying the initial sub-menu display. In addition, a short description for each item may be displayed. This may cause other items on the screen to shift position in order for all of this additional information to be displayed for the selected item. Then, if the select button is tapped, the item would be added to the selected items list and the screen may revert back to a list of the items, i.e., removal of the select and info buttons. When the info button is tapped, then a screen similar to that of FIG. 6C could be displayed as described below.

When the back button is touched in operation 526, the previous sub-menu/menu may be displayed. For example, when the back button is touched in the display may switch from the display of FIG. 6C back to the tapas sub-menu in FIG. 6B. When the back button is touched when the tapas sub-menu in FIG. 6A or 6B, the display may return to the eat lower level menu of FIG. 4B. Alternatively or additionally, a home button may be provided to return the display to the IMM of FIG. 4A.

Figure 6D:
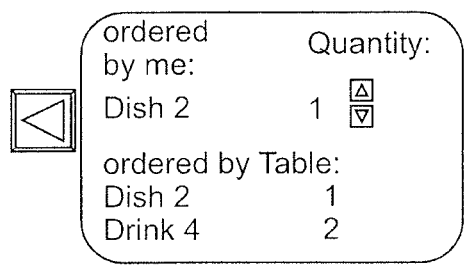

The other menu category displays may function in a similar manner. When selected items is touched, all items ordered from that position and/or all items ordered by the table and corresponding quantity ordered may be displayed, as illustrated in FIG. 6D. The quantity may be altered on this display by touching the up/down buttons therein.

Figure 5B:
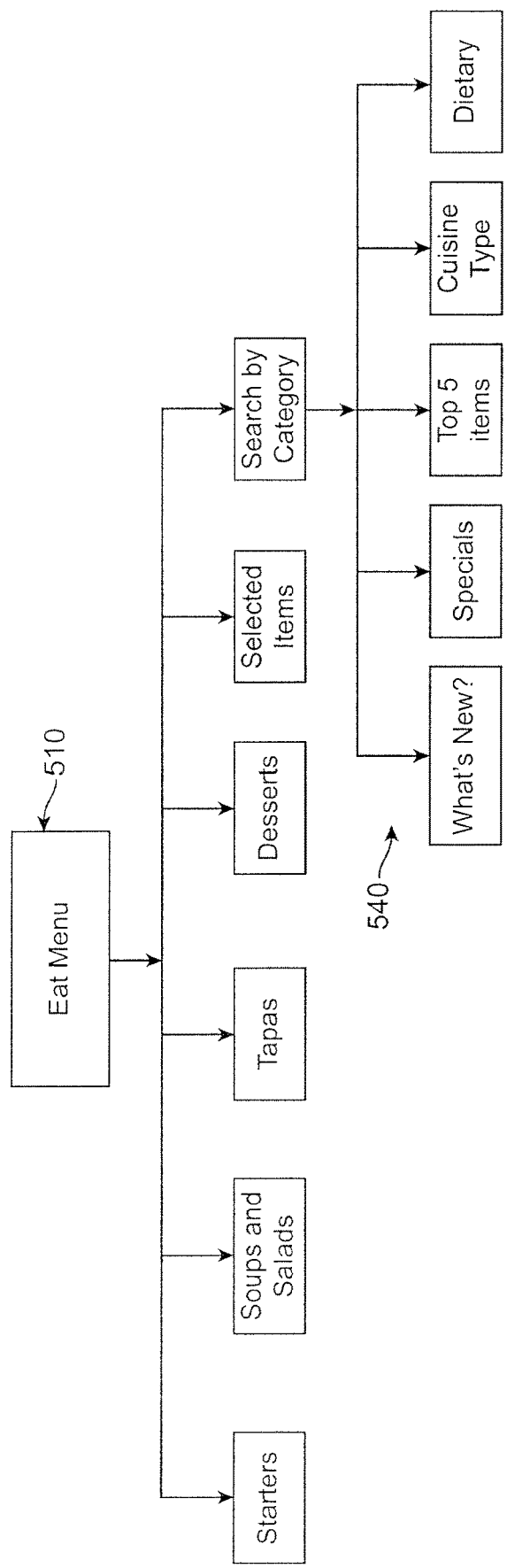
Figure 6E:
FIGS. 6E and 6F illustrate an example of a search categories generic item menu of the eat lower level menu in accordance with an embodiment.
Figure 6F:
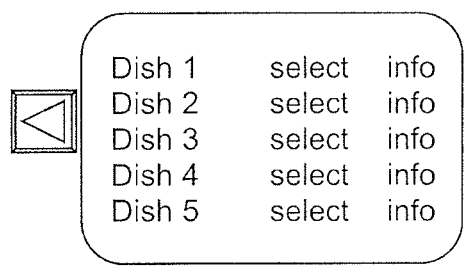

As illustrated in FIG. 5B, when the search by category is touched, another sub-menu of available searches may appear, as illustrated in FIG. 6E. Such available search options may include New, Specials, Top 5, cuisine, Dietary, and so forth. Touching one of these may display a list, as illustrated in FIG. 6F when Top 5 is selected, which may allow the corresponding dishes to be selected or for more information to be obtained. The Top 5 may include the top 5 highest rated, top 5 most frequently ordered, etc., and may be updated in real time. Alternatively, when a more detailed search category, e.g., cuisine or dietary, is selected, an intermediate display of the various sub-categories may be displayed before a corresponding display of items. For example, touching cuisine may display vegetarian, seafood, spicy, Italian, Caribbean, Spanish, South American, Asian, fusion, and so forth. Touching dietary may display vegetarian, vegan, low fat, low carbohydrate, low calorie, and so forth.

Drink Mode

Figure 8:
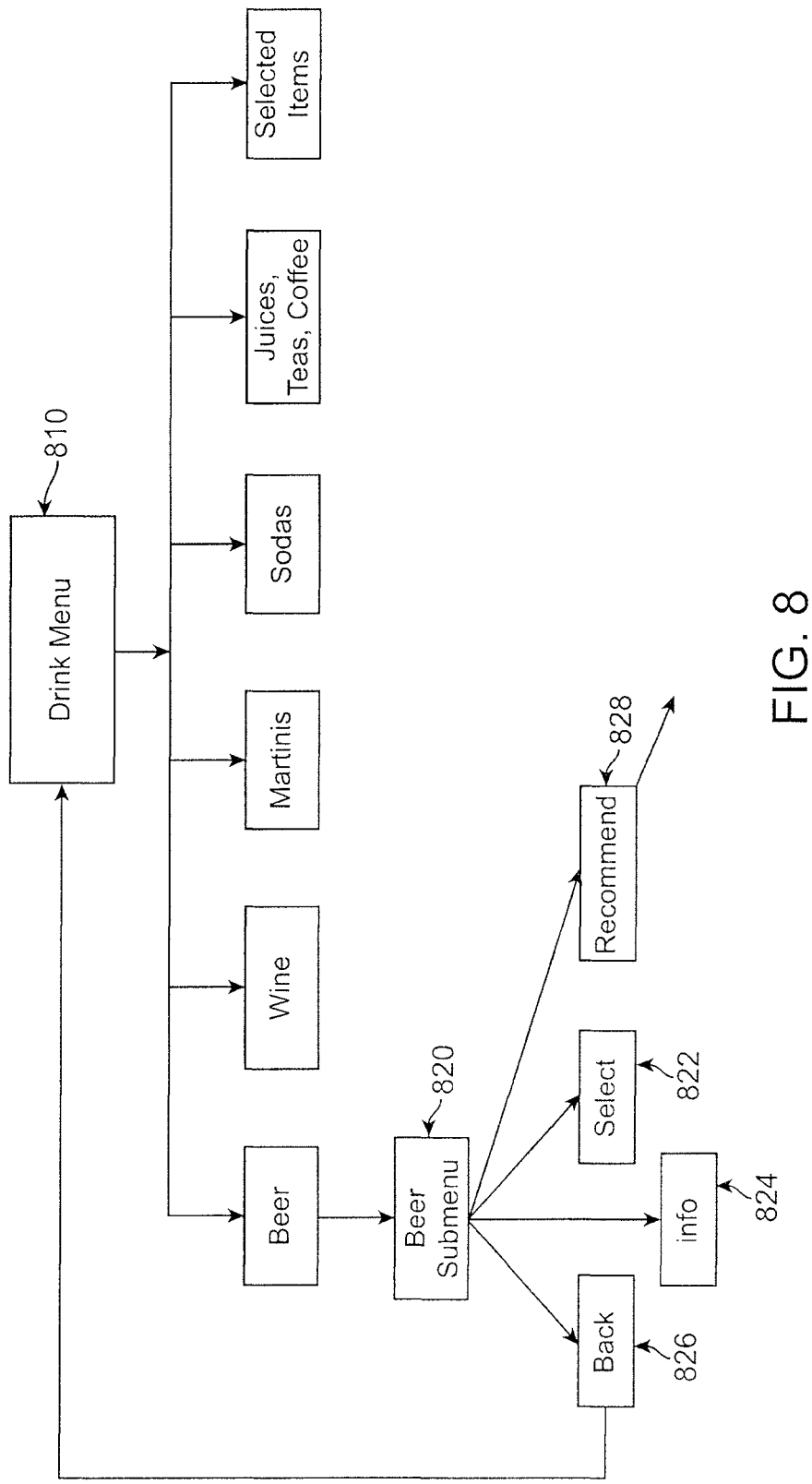
FIG. 8 illustrates a flowchart for the drink lower level menu in accordance with an embodiment.
Figure 9A:
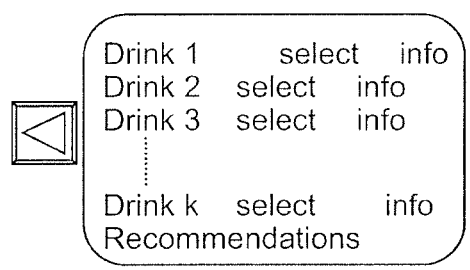
Figure 9B:
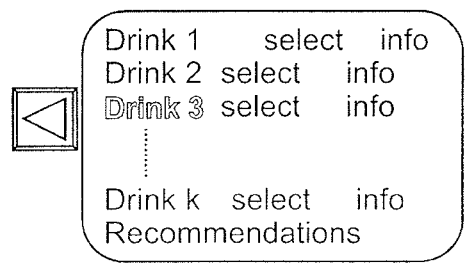
Figure 9C:
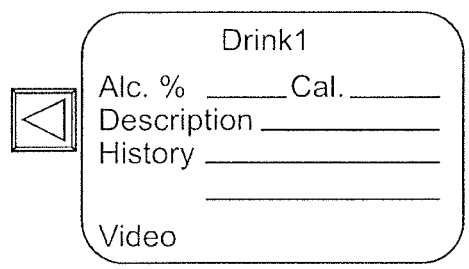
Figure 9D:
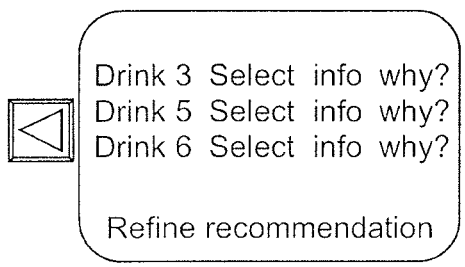
Figure 10:
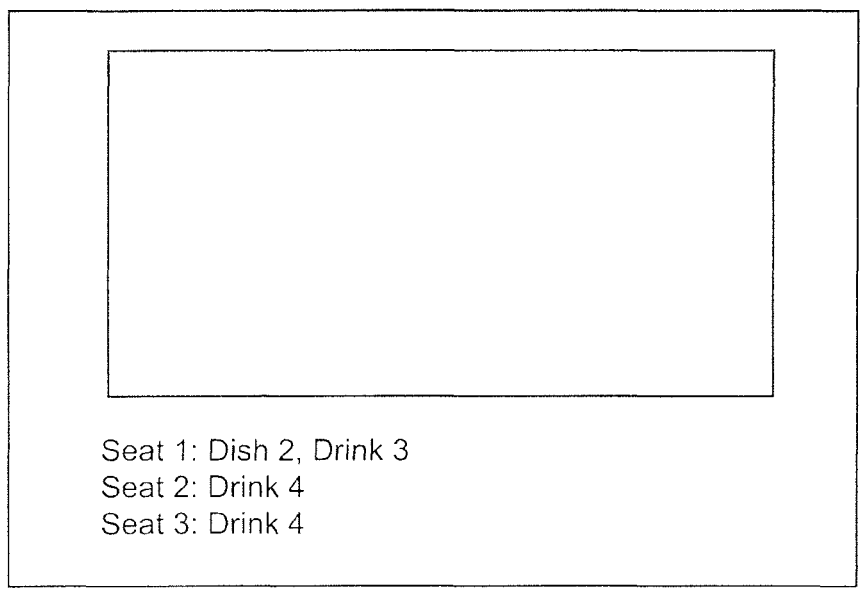
FIG. 10 illustrates a wall display after ordering in accordance with an embodiment.

Once a corresponding category of the drink lower level menu of FIG. 4C has been touched, a sub-menu corresponding to that category may appear, as illustrated in FIGS. 8 to 10. FIG. 8 illustrates a flowchart for the drink lower level menu. FIGS. 9A to 9F illustrates examples of drink sub-menus to be displayed. FIG. 10 illustrates the wall display 232 after completion of the operation in FIG. 8.

In operation 810, a category in the drink lower level may be selected in operation 820. This may result in a generic drink sub-menu of FIG. 9A being displayed. As can be seen therein, "select" and "info" buttons may be next to each item Drink1 to Drinkk, allowing each item to be selected or more information about each dish may be retrieved. Also, the ordered items may be listed on a bottom portion of the table display 212 (not shown). Further, the ordered items may be displayed on the wall display 232, as illustrated in FIG. 10. If there are too many items to display at once, only some of these items may be displayed and up/down scroll button may be provided adjacent the list.

When an item is selected in operation 822, that item may be highlighted and added to the ordered items, as illustrated in FIG. 9B. When information about an item is selected in operation 824, individual information for that item, here Drink 1, may be displayed as shown in FIG. 9C. An image of that item may also be displayed. The individual information include alcohol percentage, calories, a description of beverage, may give history of the beverage. A "video" button may be provided on this menu for a video, e.g., a video supplied by the beverage manufacturer.

The drink sub-menu may include "recommend". When a user touches recommend in operation 826, the recommend page may be displayed. This page may recommend a drink according to dish(es) ordered. For example the recommend page may display more than one drink; here three drinks as illustrated in FIG. 9D, within that category. A "select", "info" and "why" button may be provided next to each drink. The "why" button may explain why that drink was recommended. For example, any time a particular dish is ordered, several beverages may be recommended. Data for orders may be tracked at the restaurant. Any time a gazpacho is ordered, the most drink in that category also ordered by the same person or table at the same sitting may be stored and displayed, drinks based on expert opinions may be displayed, surveys may be performed to ask customers how well they like particular beverages with particular food items, and so forth.

In any of the above cases, for each food item ordered, several beverages may be identified or a beverage suitable for all food items ordered may be displayed. Each beverage may be given a "score." The score may be +1 or 0. When all food items are ordered, the Eat menu may display a button for wine recommendations. If this button is pressed, the menu may list the wine recommendations as described above in order from highest to lowest score.

Alternatively, several of the above methods may be used to determine the recommended beverages. For example, the recommend page may list drinks as recommended by the chef, most ordered, highest ranked, by other experts, type, and so forth, as illustrated in FIG. 9E. In addition, the recommendation page may also include a "refine recommendation" button to narrow or change choices or options. For example, if several drinks are displayed on the recommendation page, the "refine recommendations" button may be touched to limit the drinks to particular preferences, e.g., wines may be limited to red, white, sweet, dry, French, Australian, etc., beers may be limited to hoppy, less hoppy, dark, wheat, German, British, etc.

When the back button is touched in operation 826, the previous sub-menu/menu may be displayed. For example, when the back button is touched in the display may switch from the display of FIG. 9C back to the beer sub-menu in FIG. 9B. When the back button is touched when the beer sub-menu in FIG. 9A or 9B, the display may return to the drink lower level menu of FIG. 4C. Alternatively or additionally, a home button may be provided to return the display to the IMM of FIG. 4A.

The other menu category displays may function in a similar manner. When selected items is touched, all items ordered from that position and/or all items ordered by the table and corresponding quantity ordered may be displayed on the table display, as illustrated in FIG. 9F and/or on the wall display 232, as illustrated in FIG. 10. The quantity may be altered on this display by touching the up/down buttons therein.

Order Processing

When customers order food or drinks, the order may go directly to the kitchen, i.e. the table serves as the point of service (POS). Alternatively, the order may be displayed on a computer and manually entered into the POS by the server and then sent to the kitchen. Alternatively, the table computer may send the order directly to the POS. Then, the server may view the order and send the order to the kitchen through the POS. This final option provides an advantage in that the server has ability to send only a portion of the items ordered at a time and check to make sure the items are correct. Alternatively, a separate computer that receives inputs whenever anyone places an order at a table may be used, as will be discussed in detail below with reference to FIGS. 18A to 18E.

Connect Mode

Figure 11:
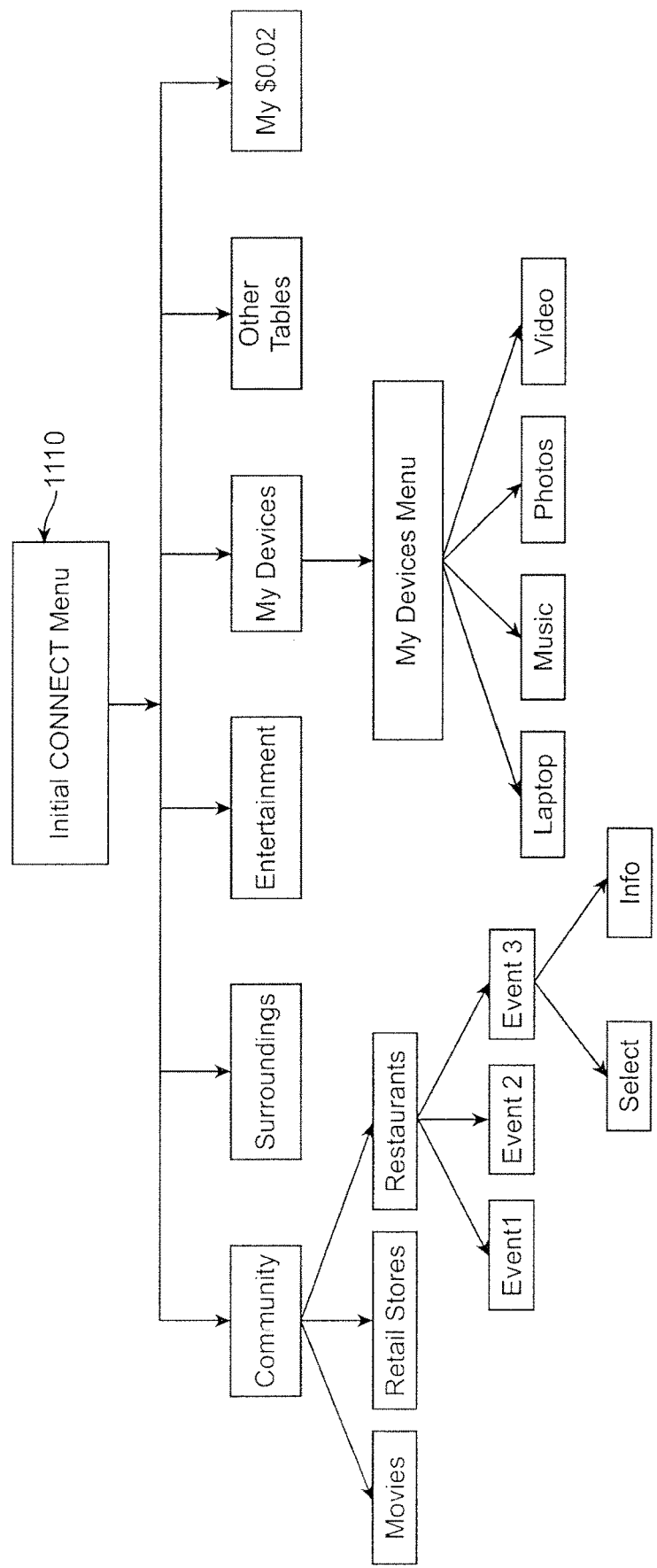
FIG. 11 illustrates a flowchart for the connect lower level menu in accordance with an embodiment.
Figure 12A:
FIG. 12A to 12I illustrate an example of a generic item menu of the connect lower level menu in accordance with an embodiment.
Figure 12B:
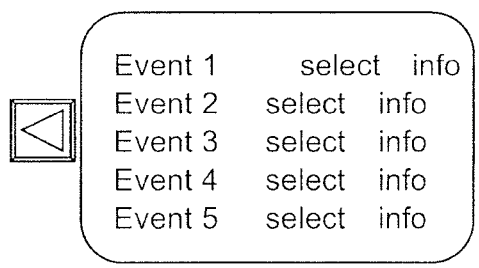
Figure 12C:
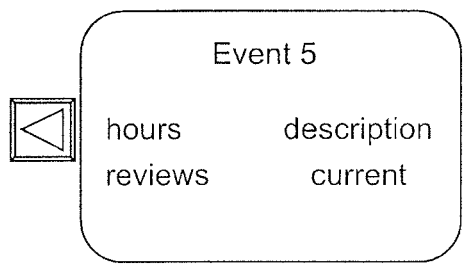
Figure 12D:
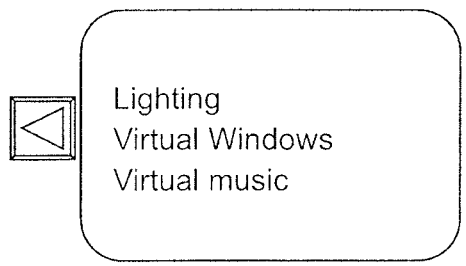
Figure 12E:
Figure 12F:
Figure 12G:
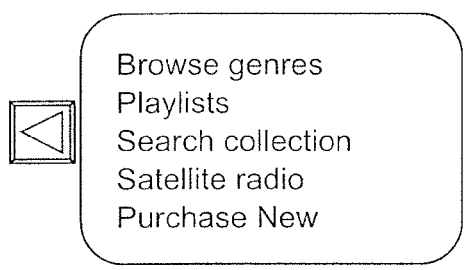
Figure 12H:
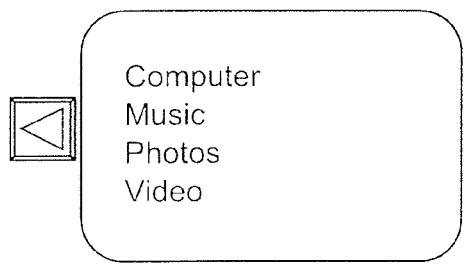
Figure 12I:
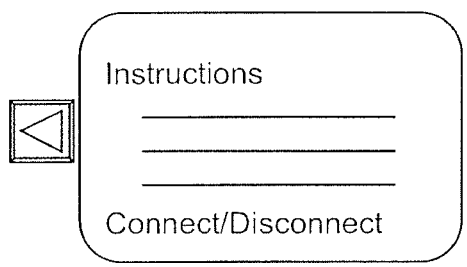
Figure 12J:
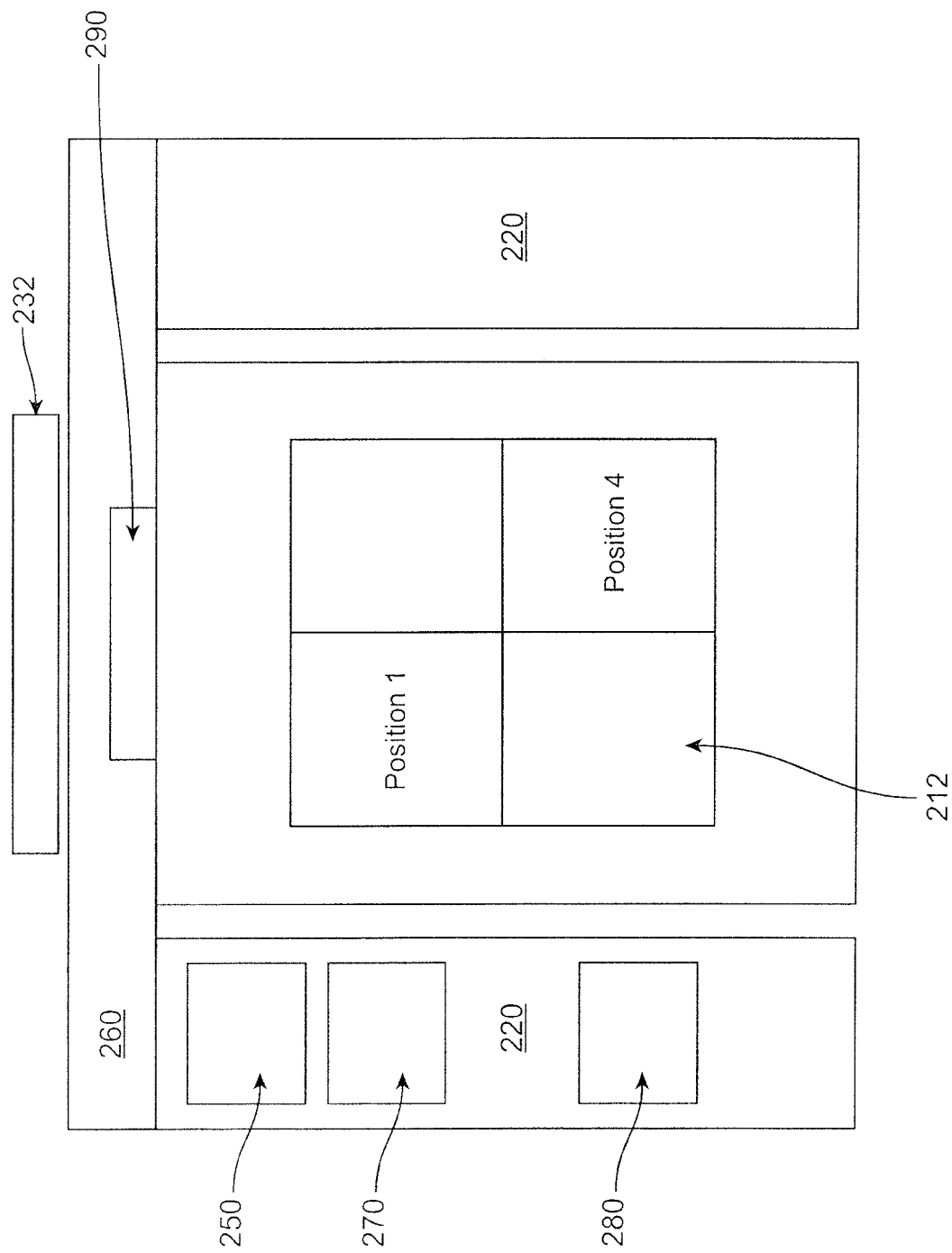
FIG. 12J illustrates a schematic plan view of a configuration for connecting user devices to the booth.
Figure 12K:
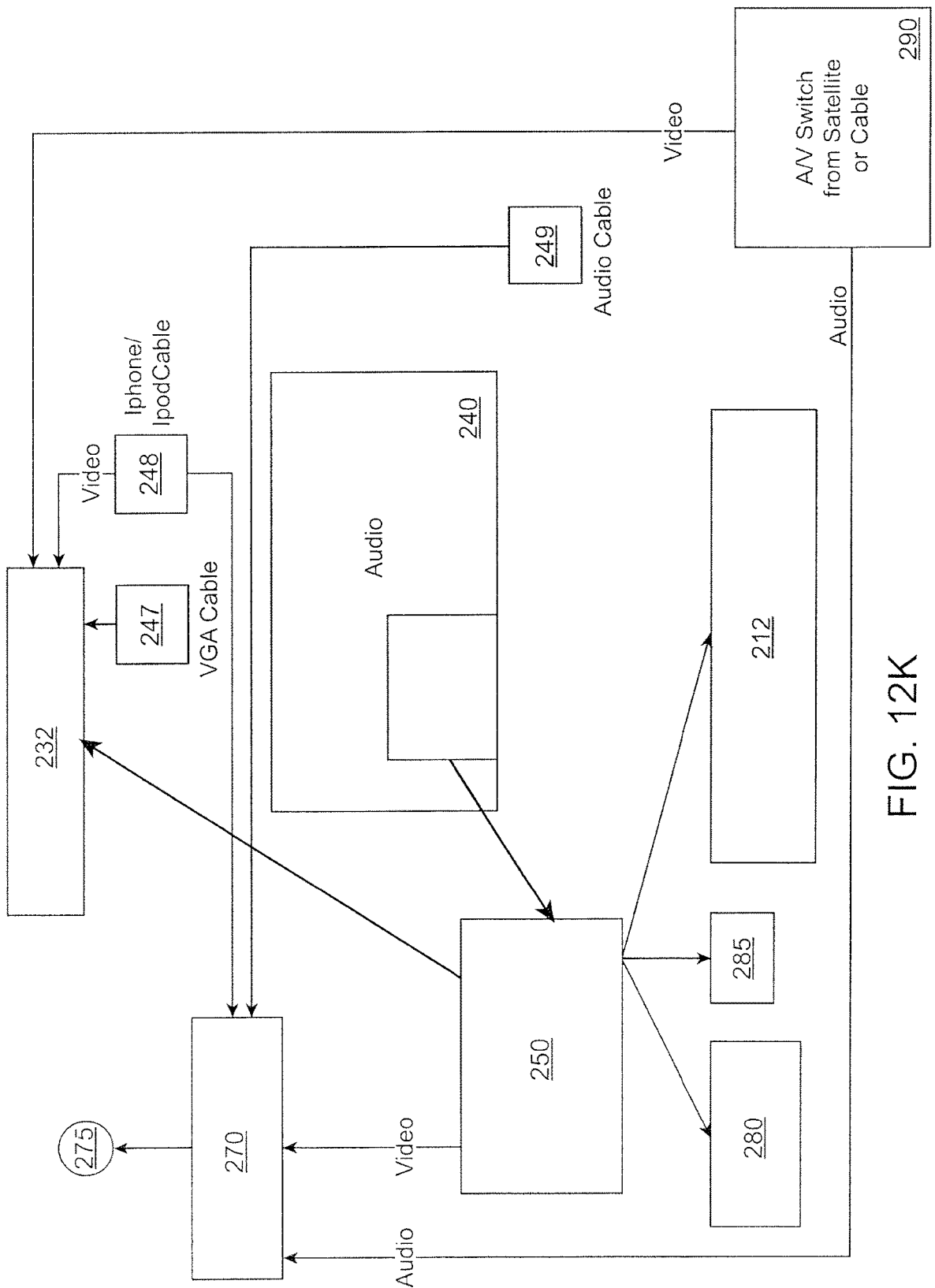
FIG. 12K illustrates a schematic relational view of the configuration of FIG. 12J.
Figure 12L:
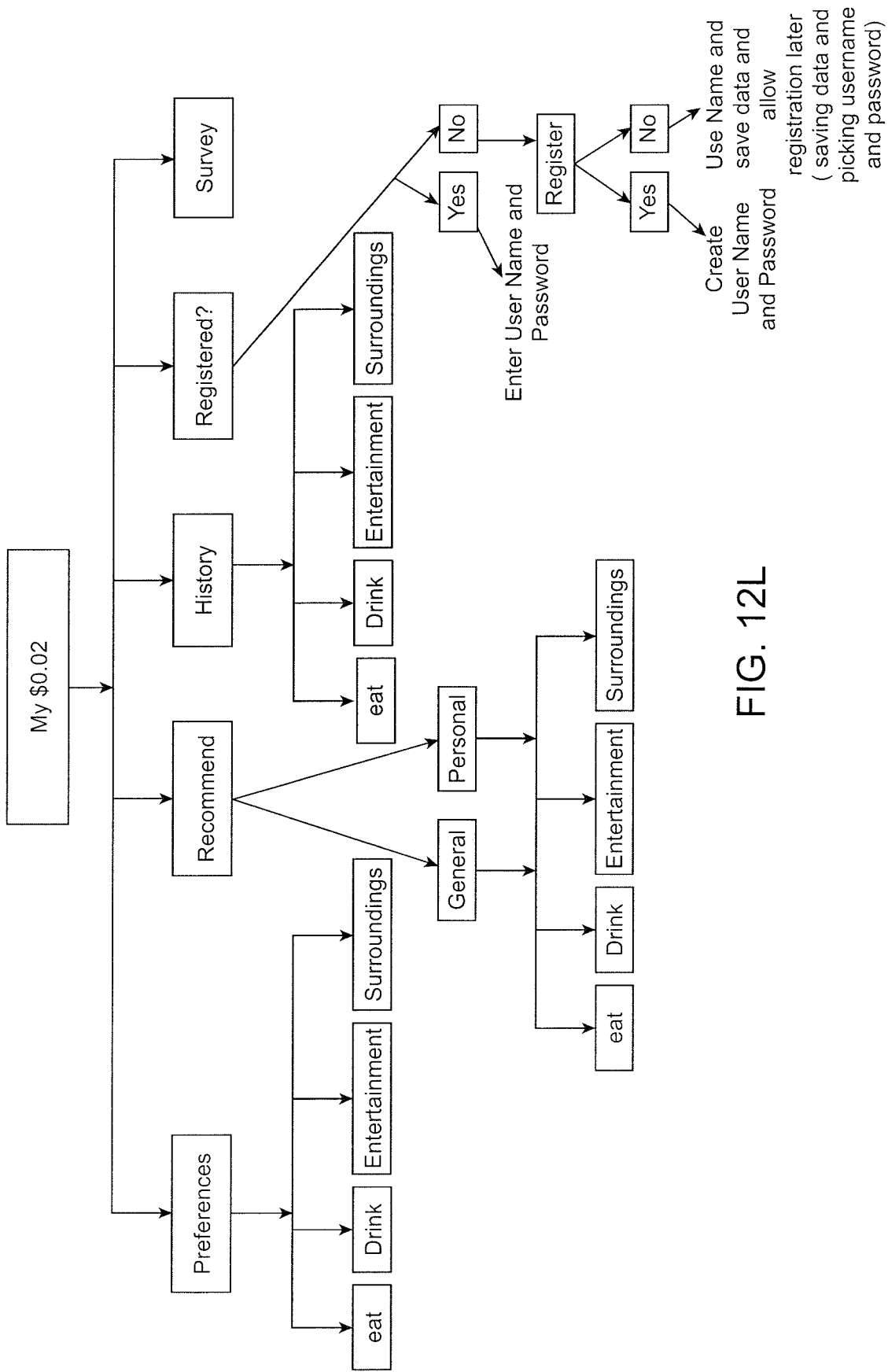
FIG. 12L illustrates a flowchart for a sub-menu of the connect lower level menu.

Once a corresponding category of the connect lower level menu of FIG. 4D has been touched, a sub-menu corresponding to that category may appear, as illustrated in FIGS. 11 to 12L. FIG. 11 illustrates a flowchart for the connect lower level menu. FIGS. 12A to 12I illustrate examples of drink sub-menus to be displayed. FIGS. 12J and 12K illustrate an example of a layout for realizing connection of user devices with the booth 200. FIG. 12L illustrates a flowchart for one of the sub-menus.

Selecting "community" in operation 1110, may bring up a number of local, e.g., within walking distance, options for additional activities, as illustrated in FIG. 12A. Such activities may include movies, retail stores, other restaurants, theaters, museums, and other events. Selecting any one of these activities may display available associated events, as illustrated in FIG. 12B. "Select" may allow a corresponding purchase of that event to be transacted, where appropriate, e.g., movie, theater or museum tickets, may allow a reservation or addition to a wait list to be entered, e.g., in another restaurant, and/or may display a map providing location of that activity. "Info" may display the information as illustrated in FIG. 12C. Such information may include hours, description, which may include location, menus, reviews, and current information. Such current information may include any special offers, daily specials, current wait time, current availability, etc.

As a particular example, selecting movies may provide a selection of movies playing at nearby theaters. Selecting info and then description may play a trailer and selecting hours may show times at each theater. Selecting select may provide options to order or purchase tickets for specific show times.

As another example, selecting restaurants may bring up a list of nearby restaurants. Selecting "info" and then description may display the menu. Selecting "info" and then "current" may indicate availability/current wait time. Selecting "select" may allow for ordering food items for pick up, delivery or for eating in at the nearby restaurant, for making a reservation at the nearby restaurant.

Selecting retail stores may display a list of nearby retail stores. Touching "info" connected with an individual store may display information about the store.

Touching "surroundings" in FIG. 4D may display the menu indicated in FIG. 12D, which may include "lighting", "virtual windows" and "music for virtual windows." Touching "lighting" may allow control of brightness and/or color of ambient lighting in the booth. Touching "virtual windows" may result in display of FIG. 12E, in which an ambient environment may be selected for the booth to be displayed on the wall display, e.g., moon, ocean, Paris, Half Dome, Venice, and so forth. These may be still images or video. Touching "virtual music" may allow music appropriate for the selected "virtual window" to be played, and may default to the general restaurant music if no "virtual window" has been selected.

Touching "entertainment" may produce a display as illustrated in FIG. 12F. Entertainment options for the booth may include, e.g., "television," "music," "social network," "games," and "video." Touching one of these options may display more detailed options. For example, touching "music," may allow provide a display as illustrated in FIG. 12G and may include browse genres, playlists, search collection, satellite radio, purchase new, and so forth.

Selecting "My Devices" may bring up a menu as illustrated in FIG. 12H, e.g., displaying computer, music, photos, video, and so forth. If a user plugs in any devices into the USB port or the SIM card port or firewire port (for example cameras, flash thumb drives, SIM cards or other memory devices) any recognizable files may be immediately copied onto the booth computer 250. Recognizable files may include photos with standard formats (e.g. jpeg or tiff), videos with standard formats (e.g. mpeg, mov), and music with standard formats (e.g. wav or mp3). After copying these files, the booth computer 250 may immediately eject the USB storage device, allowing users to unplug their devices soon after they insert them, without causing damage to their devices or interrupting operation of the booth computer 250.

Selecting any of music, video, photos or presentation may bring up a list of the corresponding media files. For example, selecting photos may bring up a list of the photos that have been copied on to the booth hard drive. The list may be displayed in a "flow" mode so that large versions of each photo may be displayed in the front and smaller versions on either side. Two quick touches on a large photo in the center may cause the photo to be displayed on the wall display 232. A single touch and drag may allow other photos to be placed in the center large photo position. Once in the center large photo position, a single touch may display on the wall display 232. Alternatively, photos dragged off of the table display 212 in the direction of the wall display 232 could be displayed on the wall display 232. Additionally, a print option may be provided for the photos. This printing may be occur remotely, so that the restaurant may control and charge for the printing.

Users may connect their own devices to the wall display 232 and/or the booth computer 250. This may be done through a docking station, cables, and so forth, or the user may select "my devices" and then select the particular device to be connected from the "my devices" menu, as illustrated in FIG. 12H. If the device is not connected at this point, then table display 212 may list instructions for connecting a cable to the user's device, as illustrated in FIG. 12I. This cable may be located on the storage portion 260 next to the wall display 232 or in a cabinet 262 in the wall behind a sliding door. For example, when the user's device is a laptop, one of end of this cable may be connected to the wall display 232, while the other end would be available to attach to the user's laptop, as illustrated above in connection with FIGS. 2C and 2D.

For example, if the wall display 232 is an LCD flat screen TV, the cable may be an RGB video cable. One end of the RGB video cable may be attached before hand to one of the video inputs of the wall display 232, e.g., Video 2 input. Another video input may be attached to the computer, e.g., Video 1 input.

An example of a layout for the interconnection of my devices with the booth 200 is illustrated in FIGS. 12J and 12K. As shown therein, the booth 200 may include the booth computer 250 under one of the seating stations 220, here a bench. An amplifier 270 and an IR transmitter 280 may also under this seating station. The I/O port box 240 may be located in the wall, e.g., under the storage portion 260, and cables extending therefrom may be accessible via the door 262.

As illustrated in FIG. 12K, the wall display 232 may receive outputs from the amplifier 270, the booth computer 250, and the I/O port box 240. The I/O port box 240 may include, e.g., a VGA cable, an Iphone®/Ipod® cable, an audio cable, and so forth, for connecting the user's devices to the booth 200. The I/O port box may also include a USB multi-device box that may be connected to the booth computer 250. The table display 212 may be in communication with the booth computer 250. The amplifier 270 may receive outputs from the booth computer 250 and the I/O port box 240. Additionally, an A/V switch 290 from an external source, e.g., satellite or cable, may further provide outputs, e.g., a video output to the wall display 232 and an audio output to the amplifier 270. The A/V switch 290 may be at a central location and may be used for multiple booths. The IR transmitter 280 may be used by the booth computer 250 to enable a user to send signals to control any inputs for the wall display 232 or the amplifier 270.

Once the cable is connected to the user's device, the user may tap a button on the table display 212, e.g., the toggle button in FIG. 12I, to indicate that their device is connected. For example, when the user's device is a laptop, the booth computer 250 may be signaled to change the view on the wall display 232 to the Video 1 input. The IR transmitter 280 may be controlled by the booth computer 250 to act as a remote control and switch the input on the wall display 232 to the video 1 input connected through a cable provided in the booth 200, e.g., a VGA cable shown in FIG. 12K, thereby displaying the contents on the user's laptop on the wall display 232. The toggle button may be tapped again to change the video input to the wall display 232 back to the video output coming from the booth computer 250.

This method allows users to connect laptops to the multimedia booth, without actually connecting their laptop to the booth computer 250. This may reduce security issues associated with direct computer to computer communication. Also, it allows displaying of information on personal laptops of specialized programs that may not be available on the booth computer 250.

Additionally, user's devices other than a laptop, e.g., USB fobs, mp3 players, and so forth, may also be directly connected to the booth computer 250. For some devices, e.g., those that may play readily without delay from the device itself, the files may not be copied onto the booth computer 250.

Further, when the audio signal runs through the amplifier 270, the audio and video may be totally separate. In other words, various video signals may be layered with various audio signals.

Selecting "other tables" may allow sending messages to other tables in the restaurant. Further, cameras may be placed at each table 210 to allow sending or viewing images at other tables.

Selecting "my $0.02" may continue to a flowchart as illustrated in FIG. 12H. This display, for example, "preferences," "recommend," "history," "registered," "survey," and so forth. Touching preferences may allow a user to enter personal preferences regarding, for example, "eat", "drink" "entertainment", "surroundings." If the user is not registered, these may only be stored for this dining session. "recommend" may allow either "general" or "personal" recommendations, either of which may then display for example, "eat", "drink" "entertainment", "surroundings." When "general" is selected, most popular items in the respective categories may be listed. When "personal" is selected, items in the respective categories may be listed in accordance with currently entered preferences or stored preferences, if the user is registered. Alternatively or additionally, when "personal" is selected, a user may enter a comparative mode and may enter a favorite item in this or another restaurant and get recommendations for this or another restaurant based on that information. Alternatively or additionally, when "personal" is selected, either an individual mode or a "friends" mode may be selected, allowing recommendations based on input from friends. These "friends" may be automatically associated with a registered user whenever another registered user dines with them, or may be actively allowed by an individual user.

Thus, such recommendations may include personalized recommendations, i.e., based on the individual's past behavior, social recommendations, i.e., based on the past behavior of similar users, and/or item recommendation, i.e., based on the thing selected.

When "history" is selected, similar categories, for example, "eat", "drink" "entertainment", "surroundings"

may be displayed. These categories may display current session history, or, if the user is registered, may display overall history.

When "registered" is selected, a user may touch "yes" or "no." If "yes," the user will be prompted to enter a user name and password. If "no", the user may select whether to register or not. If "no", the user may still enter a user name for use in the current session to personalize the experience. If "yes", the user will be prompted to create a user name and password. Alternatively or additionally, the booth 200 may include a card reader, e.g., magnetic or radio frequency, a 1D or 2D barcode scanner, or an ID camera may be positioned under the table to allow a user's identity to be determined from a source, e.g., a credit card, driver's license, passport, frequent diner card, and so forth. These identification mechanisms may also be used for payments. The use of cards may allow the "registered" option to disappear from the my $0.02 sub-menu.

When "survey" is selected, a number of available surveys may be presented. The user may select for the survey to be anonymous, or, if registered, may link their user information. Such surveys may include this restaurant's food, drink, atmosphere, etc., local restaurants' food, drink, atmosphere, etc., or any of the community or entertainment options available.

Restaurant Wide Connectivity

Figure 13:
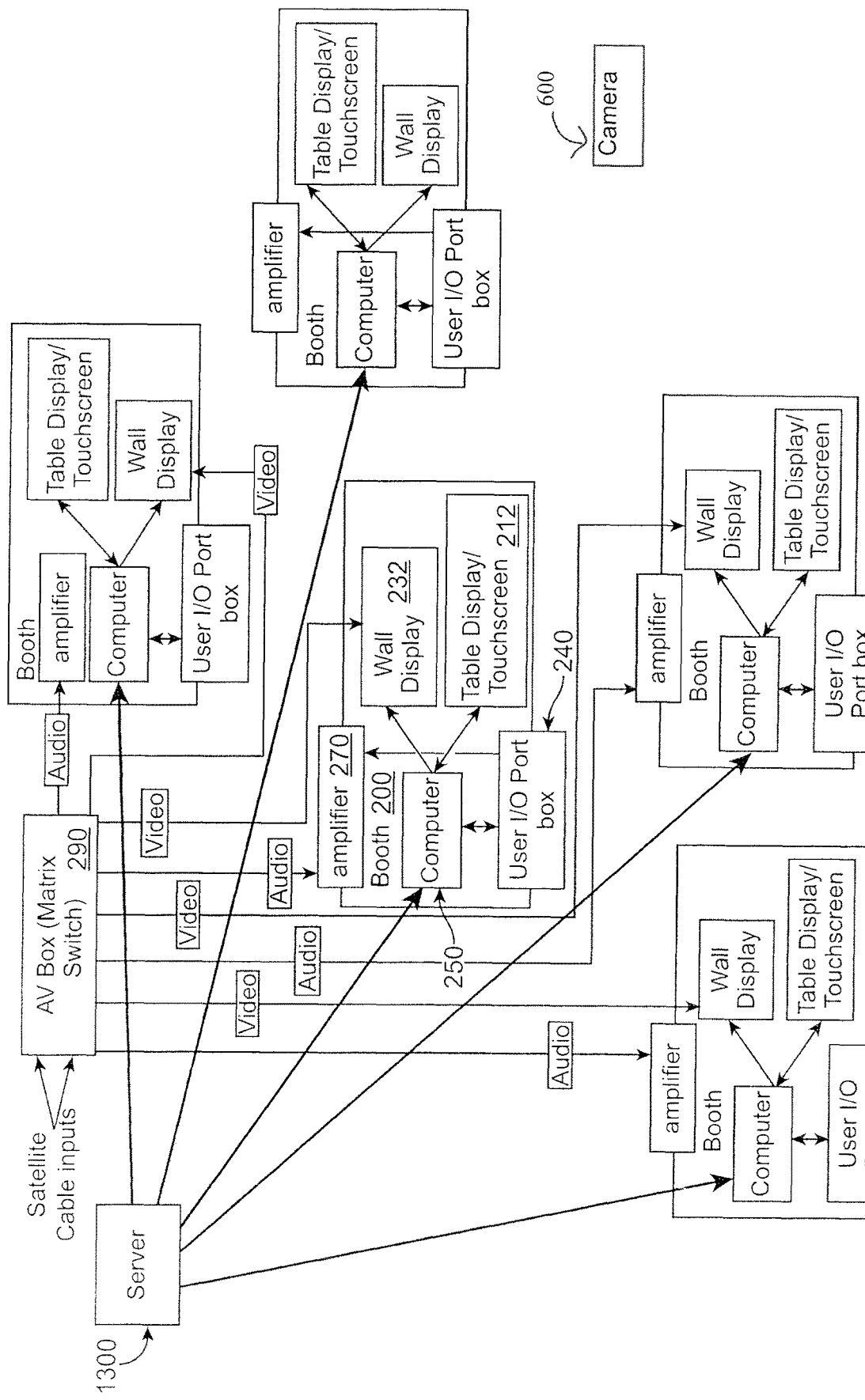
FIG. 13 illustrates a network system in accordance with an embodiment.

As illustrated in FIG. 13, each booth computer 250 may be connected to the A/V switch 290 and a restaurant server 1300, which may be centrally located within the restaurant. All audio signals may be supplied from various sources (e.g., the A/V switch 290, user devices via the I/O port box 240, the booth computer 259, and so forth) to amplifiers 270 in each booth 200 on an individual basis. All video signals may be supplied from the various sources to the wall display 232. The server 1300 may also be connected to wait stations/kitchen to forward information entered from each booth to the wait staff. Further, the restaurant server 1300 may insure a minimum amount of money is spent in each booth for a particular duration of use. For example, the first half an hour may be free. Before the end of this half hour, an initial inquiry as to whether the customers are ready to order or not may be made. If not, then an amount of time remaining may appear and count down on either one or both of the displays. After this initial time period is up and no order or indication of readiness to order has occurred, the electronics for that booth may be shut down. The timer may be invisible to the customers until the issue of payment for use of the booth needs to be raised.

Camera

As also illustrated in FIG. 13, one or more cameras 600 may be used in connection with the touch screen 212. The camera 600 may be a web camera that is physically connected to the table computer 250 associated with the touch screen 212. The touch screen 212 may then be used to take photos with this camera as in a photo booth application.

Alternatively, the camera 600 may have wireless capability. Such a camera may be used to send live pictures to the computer in real time. This may be achieved using a wireless memory card, e.g., an Eye-Fi® wireless memory card. Photos from the wireless camera may be designed to directly download in to the computer 250 in the booth. A specific camera may be tied to a specific location on the computer or on another computer.

For example the wireless capability may include a wireless transmitter card and a wireless receiver card that are frequency matched. The wireless transmitter card may be placed in any camera that accepts the cards format, e.g., an SD card. The wireless receiver card may be a USB card that can be placed in the USB drive of the table computer 250. This wireless receiver card may then be configured so that the images received from the camera 250 may be placed in a particular folder on the table computer.

A software program may then be used to monitor the contents of this folder and display all the pictures in this folder as icons on the touch screen. Selecting an icon for a given picture may then cause the computer to display this photo on the secondary screen.

Alternatively, multiple cameras 600 may be used, with each camera sending pictures to different locations. For example, if there are three connection tables 210 are used, each table may have its own portable camera with a different wireless SD card. Each SD card may have a different receiver card. Each of the three receiver cards may be inserted in to the USB drives of table computers 250 located at each connection table 220. Each table 220 may then be given access to three folders, each folder corresponding to the camera for each table 220. Selecting table 1 from a menu file would allow the users to access the photos from the camera used by table 1 in the manner described above. Similarly, selecting table 2 would allow the users to access the photos used by the users at table 2.

Alternative Booth Configurations

The booths may be configured in numerous layouts in addition to that illustrated FIG. 2. Alternative examples are illustrated in FIGS. 14A to 14C.

Figure 14A:
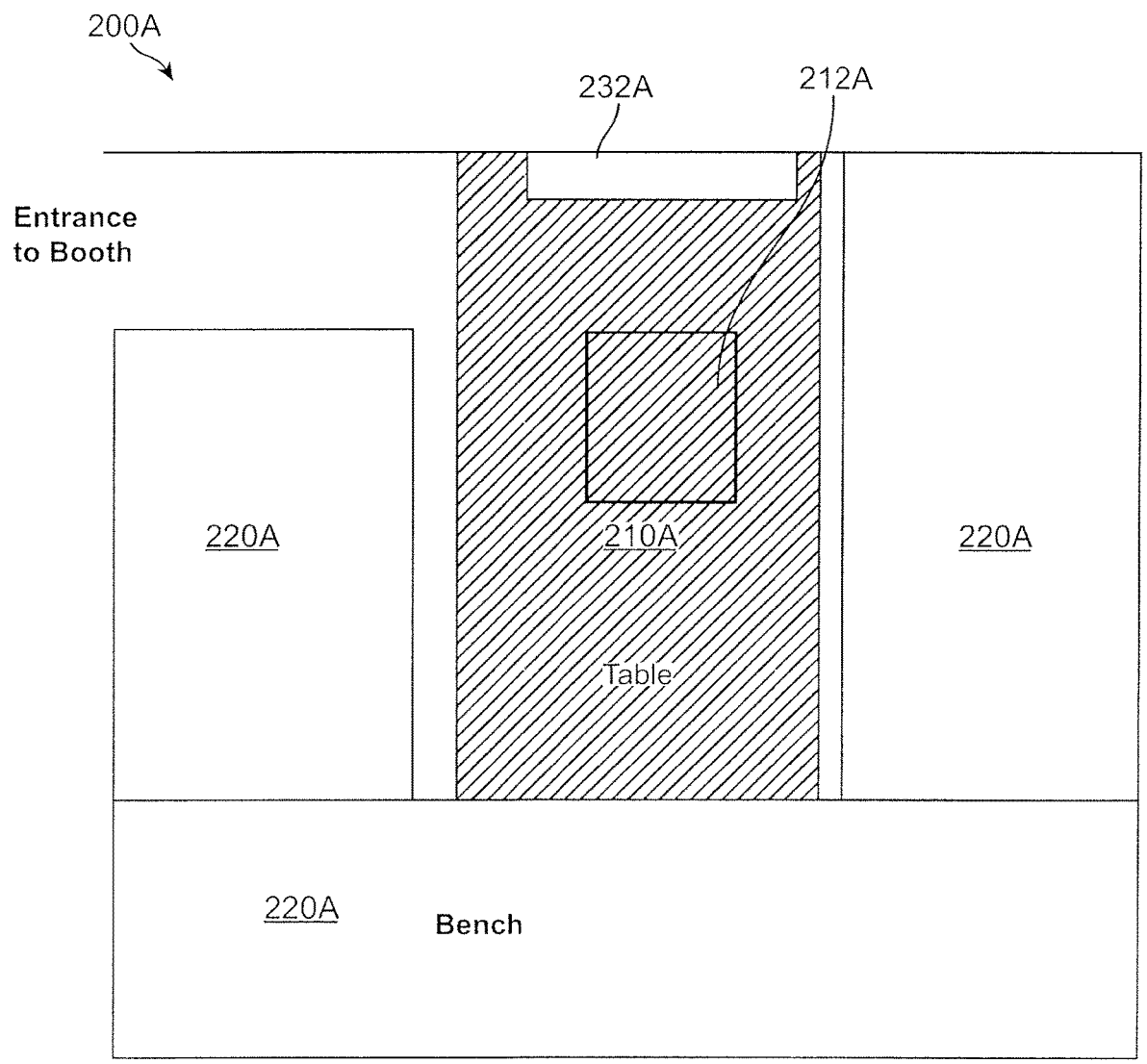

In an embodiment FIG. 14A, the entrance to a booth 200A is on the side of the booth 200A, providing more privacy for the customers in the booth 200A. Further, as illustrated in FIG. 14A, a touch display 212A may be a separate portable unit that is used at a table 210A, and may be used by any of the users at the restaurant booth. Seating 220A may be on three sides of the table 210A.

Figure 14B:
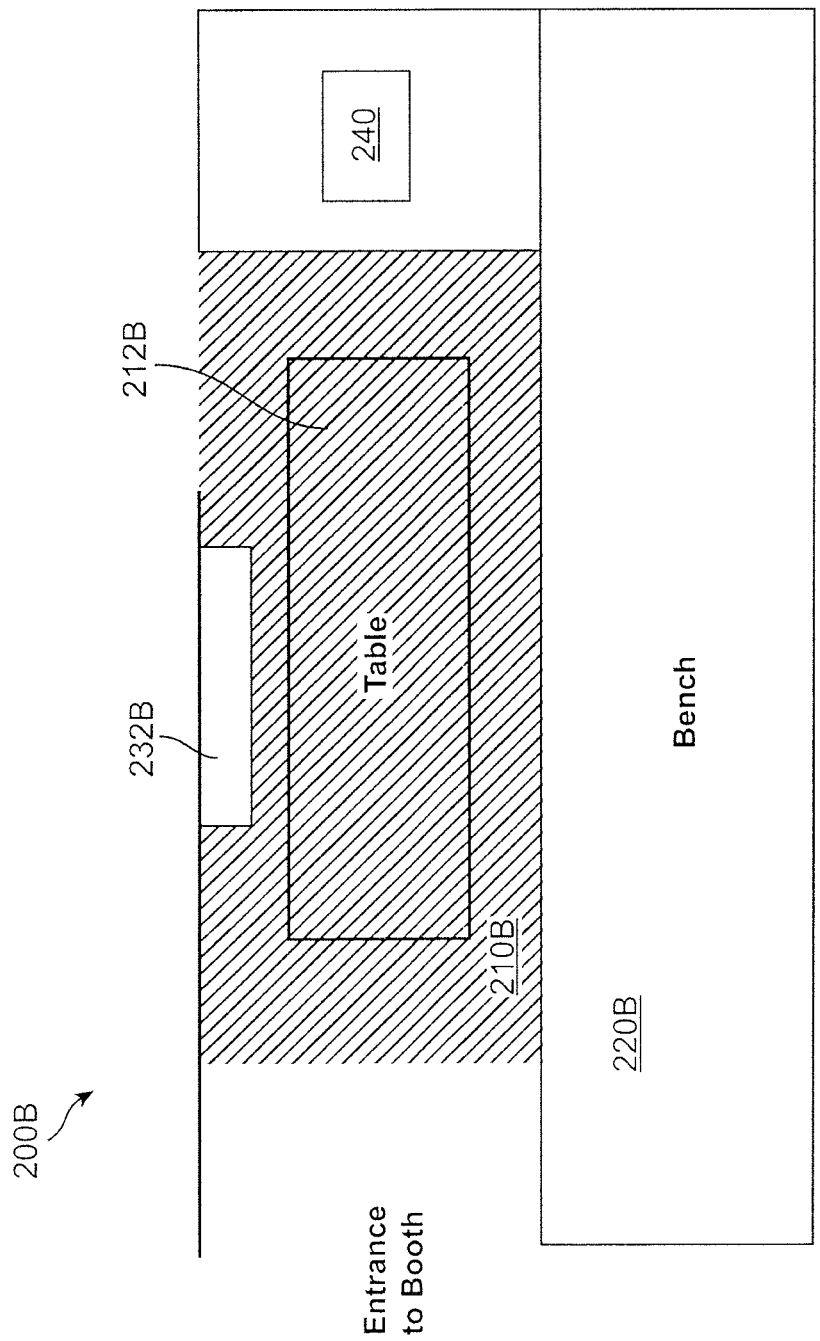

In an embodiment, illustrated in FIG. 14B, a booth 200B may be designed for a smaller number of patrons, e.g., one or two people, and a longer side of a table 210B may be against a wall having the wall display 232B. The seating 220B may be provided on only one side of the table 210B. This configuration may provide all or most of the customers view the wall display 232B directly across from them (without having to turn their head as in FIGS. 2 and 14A).

Alternatively, in any of the embodiments mentioned above, the booth and/or table can be curved to provide better viewing angles. For example, as illustrated in FIG. 14C, a booth 200C may be curved to allow more customers better viewing angles of the wall display 232. In other words, any or all of the booth 200C, seating, 220C, a table 210C and a table display 212C may be curved in such a manner as to allow customers to sit and look at the wall display 232 without having to turn their heads and or bodies as much as in a conventional rectangular shaped restaurant booth.

Single Display Booths

While the above discussion assumes that both the table display 212 and the wall display 232 are present in the booth 200, booths may also be configured having only the table display 212 or the wall display 232.

For example, if only the table display 212 is employed, images that would have been displayed on the wall display may be displayed on at least one sub-screen of the table display. For example, in FIG. 2A, sections of the table display labeled positions 3 to 6 may be used as described above regarding the table display 212. However, positions 1 and 2 may be used to display images (either still or video) similar to that which was displayed on the wall display previously.

For example, a user may attach a memory device, e.g., an usb flash drive or an SD card, to a port attached to the booth 200. The photos in this device may then be copied on to the hard drive in the booth computer 250. These photos may then be viewed in positions 3 to 6 in "flow" mode as described above or other modes that allow viewing of multiple photos within a given section. Each photo may be represented as text or as an image that is smaller than the sub-screen. For example, a first user may be viewing multiple small photos in position 3 and a second user may be viewing photos in position 4. Images on the table display 212 that are dragged in to the sub-screens of the table display corresponding to positions 1 and 2 may be displayed in a large format over the entire section. Alternatively, any image moved to position 1 or position 2 may be display in both of these positions, with two different orientations, corresponding to the viewing positions for these two locations. Tapping on a small icon of an image in positions 3 to 6 may result in displaying the image in positions 1 and 2 with the two different orientations. Images may be dragged into a folder. Dragging this folder to position 1 or position 2, or double tapping on this folder, may cause a slide show to be displayed in position 1 and position 2. Changing the functional mode to a single user may cause the slide show to be displayed over the entire table display 212.

Alternatively, if only the wall display 232 is employed, the electronic menus provided on the table screen 212 may now be provided on the wall screen 232. The wall screen 232 may be controlled by a device, e.g., the remote control 285, illustrated in FIG. 12J, rather than the table display 212. This device may also allow sources of the audio/video information to be controlled.

Room Configurations

Figure 15A:
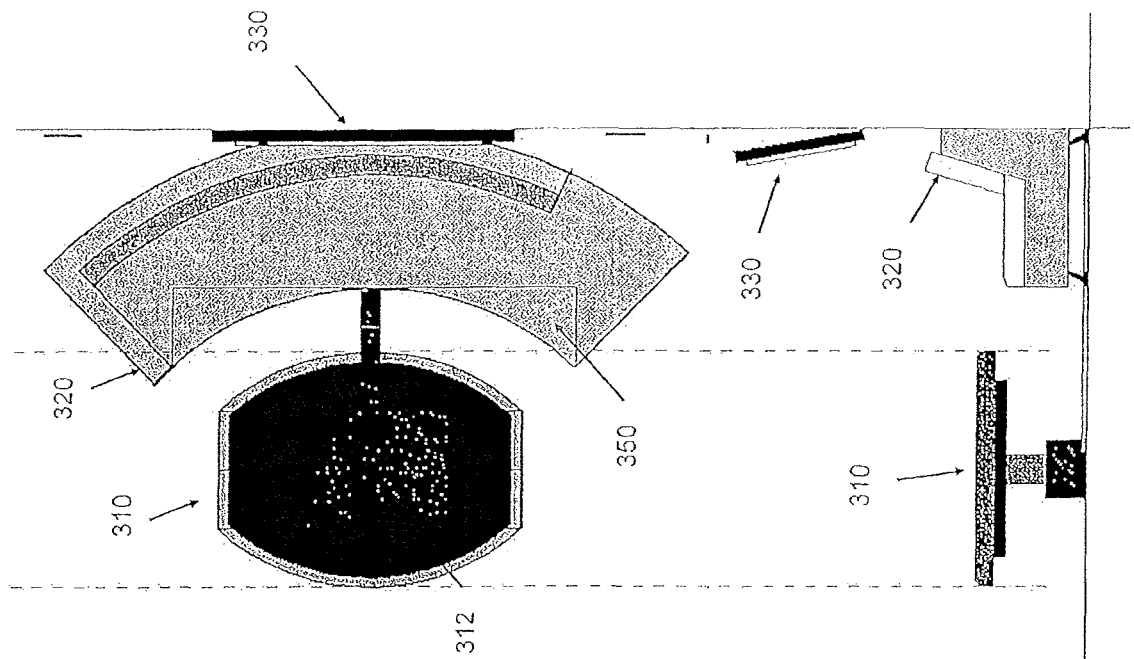
FIG. 15A illustrates a plan view of a room in accordance with an embodiment.

Alternatively or additionally to displays for the booth 220, the connection table 210 may be used to drive displays and/or audio for an entire room, whether an entire venue or a sub-venue, e.g., a private room. FIG. 15A illustrates a plan view and FIG. 15B illustrates a side view of a room 300 having such a configuration according to an embodiment.

Figure 15B:
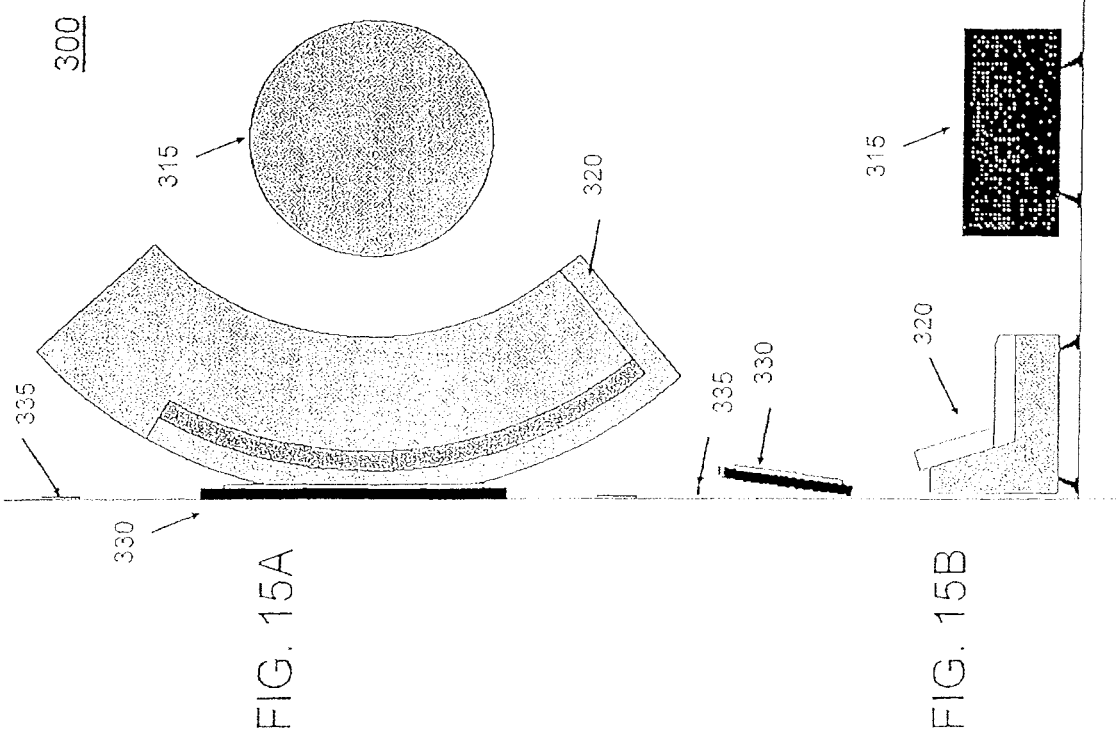
FIG. 15B illustrates a side view of the room of FIG. 15A.

As illustrated in FIGS. 15A and 15B, the room 300 may include a connection table 310 having a touch screen 312, at least two seating areas, here curved couches 320, two wall displays 330, and a connection computer 350 connected to the connection table 310, the wall displays 330, and speakers 335. A conventional table 315 may be provided for seating areas that are not adjacent to the connection table 310. While two curved couches are illustrated, any desired seating configuration may be employed. Further, while the two wall displays 330 and pairs of speakers 335 are illustrated as being an opposite sides of the room 300, more than two wall displays 300 and/or pairs of speakers 335 may be employed and/or in different positions.

Figure 16A:
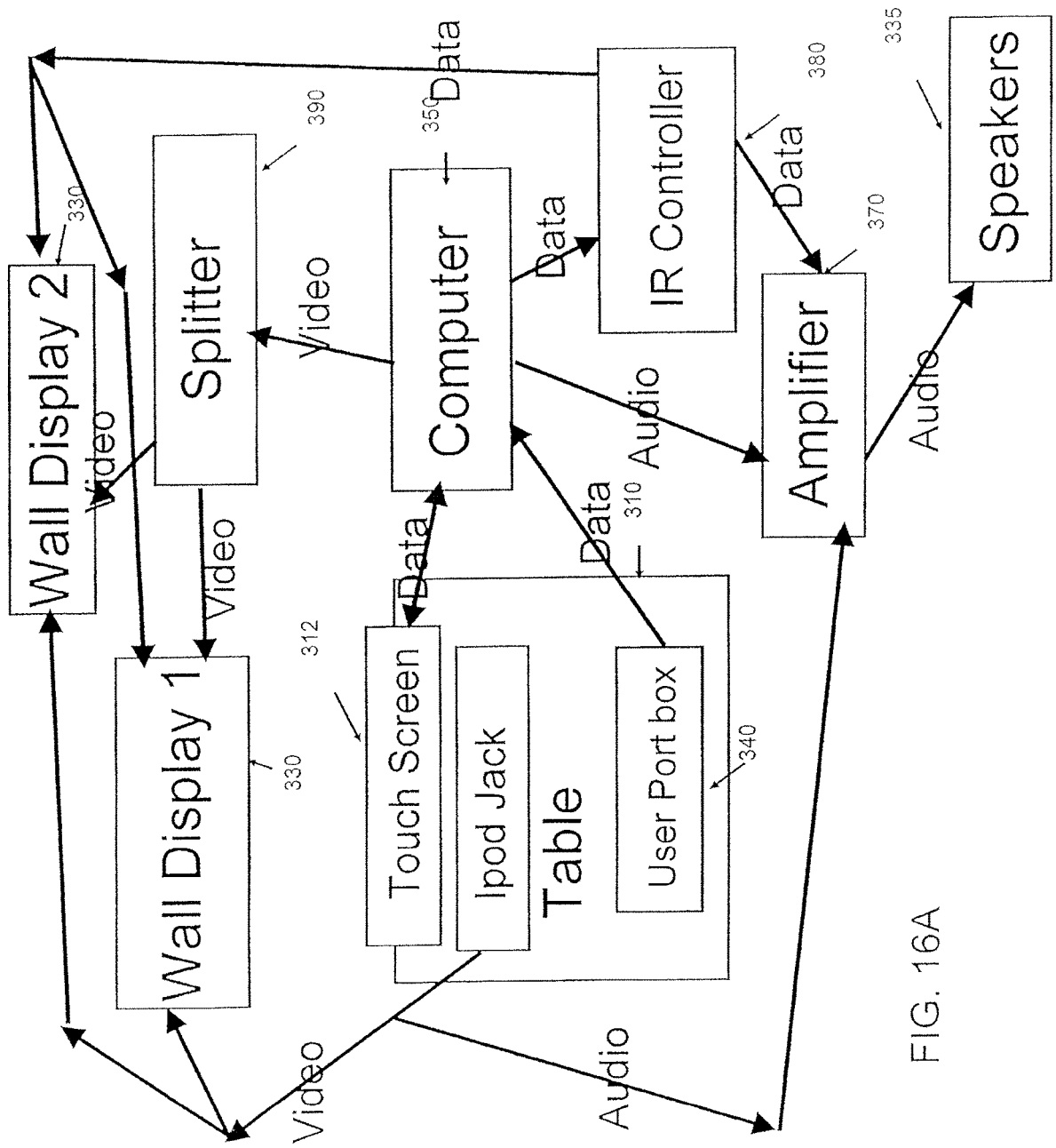
FIGS. 16A and 16B illustrate alternative schematic relational views for the room of FIGS. 15A and 15B.

As illustrated in FIG. 16A, the room 300 may be configured to allow the connection table 310 to control the wall displays 330 and the speakers 335. In particular, the wall displays 330 may receive outputs from the connection computer 350 and an I/O port box 340. The speakers 335 may receive outputs from an amplifier 370. The I/O port box 340 may include, e.g., a VGA cable, an Iphone®/Ipod® cable, an audio cable, and so forth, for connecting the user's devices to the connection table 310. The I/O port box 340 may also include a USB multi-device box that may be connected to the connection computer 350. The table touch screen 312 may be in communication with the connection computer 350. The amplifier 370 may receive outputs from the connection computer 350 and the I/O port box 340, including the audio cable and the audio portion of the an Iphone®/Ipod® cable. Additionally, an A/V switch 390 from an external source, e.g., satellite or cable, may further provide outputs, e.g., a video output to the wall displays 330 and an audio output to the amplifier 370. An IR transmitter 380 may be used by the connection computer 350 to enable a user to send signals to control any inputs for the wall displays 330 or the amplifier 370.

When displaying television channels on the secondary screens, several options are available. One option is to use a dedicated receiver for each electronic table. Alternatively, multiple receivers may be used, where the number of receivers is less than the total number of displays in the venue. These receivers may be satellite or cable or other receivers that obtain signals from an outside source. The receivers may be connected to the AV box (matrix switch) 290 (shown in FIG. 13). An output from the AV box 290 may go to each connection booth 310 in the venue, where the output may be displayed on the secondary screen. Outputs from the AV box 290 may also be connected to other displays in the venue. For example, a venue may have 4-6 electronic tables and 5-10 additional screens located at various places throughout the venue that are visible to a number of tables.

The computer 350 may display a list of the available television channels on the touch screen 312 when a user selects the appropriate button (e.g., one marked television). In some cases it may be desirable to display the name of the television channel on the touch screen or the content being broadcast at the particular time that it is being viewed.

It may be desirable to display a continuous full motion video on the wall displays 330. However, this may be difficult when using the same computer for both the wall displays 330 and the touch screen 312, as a great deal of processing power may be needed to drive the touch screen 312. This difficulty may be increased if the touch screen 312 and/or wall screens 330 have a high resolution and/or if the touch screen 312 is receiving inputs from multiple users.

One solution using the single computer 350 includes using a separate programming thread dedicated to driving the secondary screen. This thread is given a very high priority. Any operation on the touch screen 312 that may take a significant amount of processing time is given lower priority than the one for the wall displays 330. However, detection of a tap on the touch screen 312, which does not take a lot of processor time, may not be given a lower priority, since if taps are not detected within a fraction of a second of when they occur, the touch screen 312 may not function properly. Alternatively, the computer 350 may be a multi-processor computer having one processor dedicated to driving the wall displays 330.

Figure 16B:
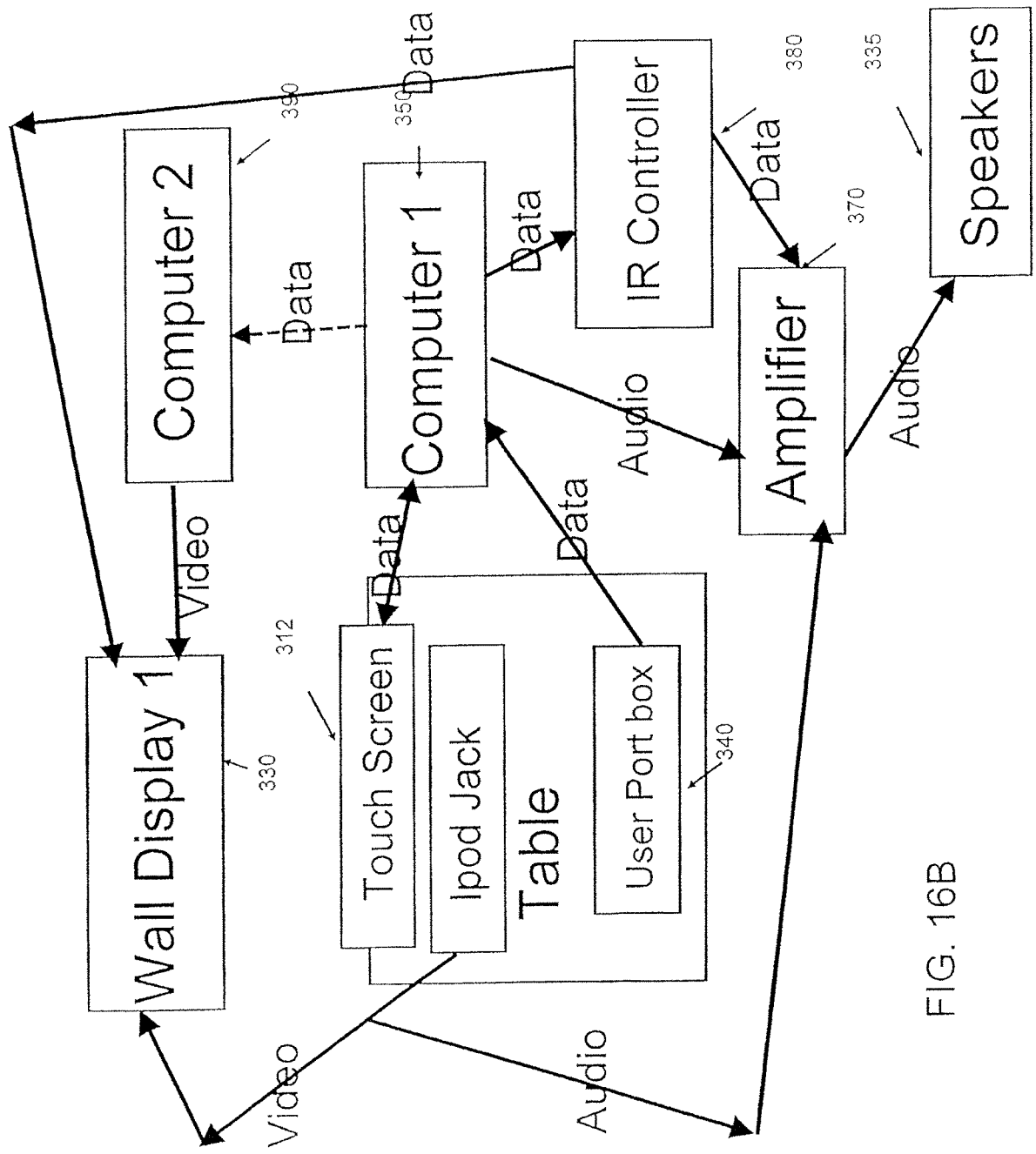

An alternative to having a single connection computer 350 includes providing two computer 352, 354, i.e., a first computer 352 for the touch screen 312 and a second computer 354 for the wall display 330, as illustrated in FIG. 16B. The first computer 352 may be located near the secondary screen or integrated with the touch screen 312. e.g., the first computer 352 may be located inside the table or under a bench or on the underside of the table, etc., and may be directly connected to the touch screen. The second computer 354 may be located near, e.g., behind, the secondary screen 330 and may be directly connected to the secondary screen. The first and second computer 352, 354 may be connected, e.g., through the Ethernet, through a wireless router, or through a dedicated connection, as indicated by the dashed line between the first and second computers. Media files to be played on the secondary screen 330 may be stored on the second computer 354.

For example, consider displaying of music videos. When the music videos are stored on the second computer 354, the second computer 354 may initially send the first computer 352 thumbnails of images and associated text, e.g., names of the songs, albums, bands, composers, and so forth, to the first computer 352, which may store this information. When a user taps music videos on the touch screen 312, a list of music videos, along with some or all of the information stored in the first computer 352 may be displayed on the touch screen 312. When a user taps a thumbnail of a particular song, a signal may be sent from the first computer 352 to the second computer 354 to start playing the music videos from the particular folder and from the particular music video selected.

The central computer 1300 of FIG. 13 may be used to determine channel settings for each receiver. This may be automated or may be performed by a manager of the venue. For example, for a sports bar, the manager may program each receiver to display a different sporting event. The central computer 1300 may be connected to the satellite receivers, e.g., by ethernet or by infrared connections, to change the channel of each receiver to the desired channels. This information may be sent to the computer 250, 350 located at each connection table 210, 310. In this manner, the computer 350 may display the channel on the touch screen 212, 312. In addition, the central computer 1300 (or the computer 250, 350 at each connection table 210, 310) may contact a website that returns the content being played on each channel at a given time and may store this information and/or send it to each connection table 310. In this manner, the computer 250, 350 at each connection table 210, 310 may display the content being broadcast on each channel on the touch screen 212, 312. For example, the touch screen 212, 312 may display a list of the sporting events being shown on each receiver at the current time. Choosing a sporting event would then cause the computer 250, 350 to send a signal to the AV box 290 to send the appropriate input to the secondary screen 232, 330 at the corresponding table.

In this manner, the secondary screens 232, 300 at the connection tables 210, 310 may be controlled by the touch screens 212, 312 at the table and the 5-10 additional screens in the example mentioned above may be controlled by other devices, e.g. the central computer 1300.

The computer 250, 350 may also be connected to the internet and may display a web browser or a portion thereof on the touch screen 212, 312. Information from various websites may also be displayed on the touch screen 212, 312 or on the secondary screen 232, 330. For example, fantasy sports information may be displayed on the touch screen 212, 312 and/or on a secondary screen 232, 330. If a sporting event is selected by a user to be displayed on a secondary screen 232, 330, then information from a sports fantasy website that relates to the sporting event being displayed may be then displayed on the touch screen 212, 312 or on a secondary screen 232, 330.

Additionally, user's devices other than a laptop, e.g., USB fobs, mp3 players, and so forth, may also be directly connected to the connection computer 350. For some devices, e.g., those that may play readily without delay from the device itself, the files may not be copied onto the connection computer 350.

Thus, the single connection table 310 may be used to control the audio and video for the whole room 300. The connection table 310 may also perform all of the other functions discussed above with reference to other tables according to embodiments, e.g., ordering food, drinks, etc. If universal control of audio and video for the entire room 300 is desired and more than one connection table 310 is provided therein, these inputs may be queued.

Queuing

If queuing is employed, a list of popular songs to be played in a particular order may be generated as an ordinary playlist initially. By choosing a playlist selection on a table, the users of the table may view this playlist on either the touch screen 312 or the secondary screen 330. This playlist may be a default playlist to start initially, before anyone has submitted a song to this playlist (or queue). Once someone at a table chooses a media for selection they may have the option to submit the media selection (e.g. song, music video, movie trailer) to the playlist. If no one else in the venue has submitted a selection to the playlist, this selection may move to the top of the list to be the next item played. Subsequent selections made by others in the venue may be submitted to the playlist in a similar manner and the system can act as a jukebox with a display to show the media selections in the queue. Users that made a particular selection may be able to cancel the selection prior to playing (removing from the queue) or during playing of the selection.

A voting mechanism may be applied in addition to the queue described above. This voting mechanism may work similar to the above, except that, in addition to the above procedure, users at tables may vote on media selections in the queue. If multiple votes for a particular media selection in the playlist are received, then this media selection may be moved up in the queue.

A central computer, e.g., server 1300, may be used to track the votes for particular media. The votes for media for multiple sessions in the past may be used to generate the initial playlist. In addition, data used by tracking the history of selections made in booths 200 with private screens and private sound systems within the venue may also be used to determine the initial playlist. The votes for particular media on the playlist can be tracked directly by the central computer. The computers located at each table may be in communication with the central computer 1300 and submit their selections to the central computer. The central computer 1300 may then send the resulting playlist back to each computer 250 at the individual tables. The central computer 1300 may also use the data of the selections made to find similar music to play and automatically add such similar selections to the playlist. For example, if the majority of the media items selected are hip-hop music videos, the central computer may add more hip-hop videos to the playlist.

There is an issue with conventional jukebox systems, that sometimes people select a few very popular songs very often. These songs then get played so often, that they tend to annoy others in the venue. One advantage of the system described herein, is that the central computer may generate a playlist of songs and prevent songs from being played too frequently. In addition, similar songs may be added as described above. Users at the individual tables may be able to view the playlist and vote on selections only in the playlist, rather than all the songs stored on the computer. For example, users may be able to request adding a media selection to the playlist, but may only vote on moving items up on the playlist if they are already on the playlist sent to the connect table 200 as generated by the central computer 1300.

In addition to the above, there may be a room with a booth with a private secondary screen, but not private speakers. That is the speakers may be configured with one set of speakers for the entire room (communal speakers). There may be communal visual displays (televisions or LCD screen) as well. A user at such a booth may be able to make selections containing video only for display on the private display in the manner described previously. They may also be able to submit requests to the playlist or vote on items in the playlist as described previously. They may also be able to make a selection referring to the communal audio and video (e.g., "house music video") and cause the private display to display the video corresponding to the communal speakers.

Detailed Table Screen Shots

FIGS. 17A to 17I illustrate screen shots for different stages in use of the connection table in accordance with embodiments.

Figure 17A:
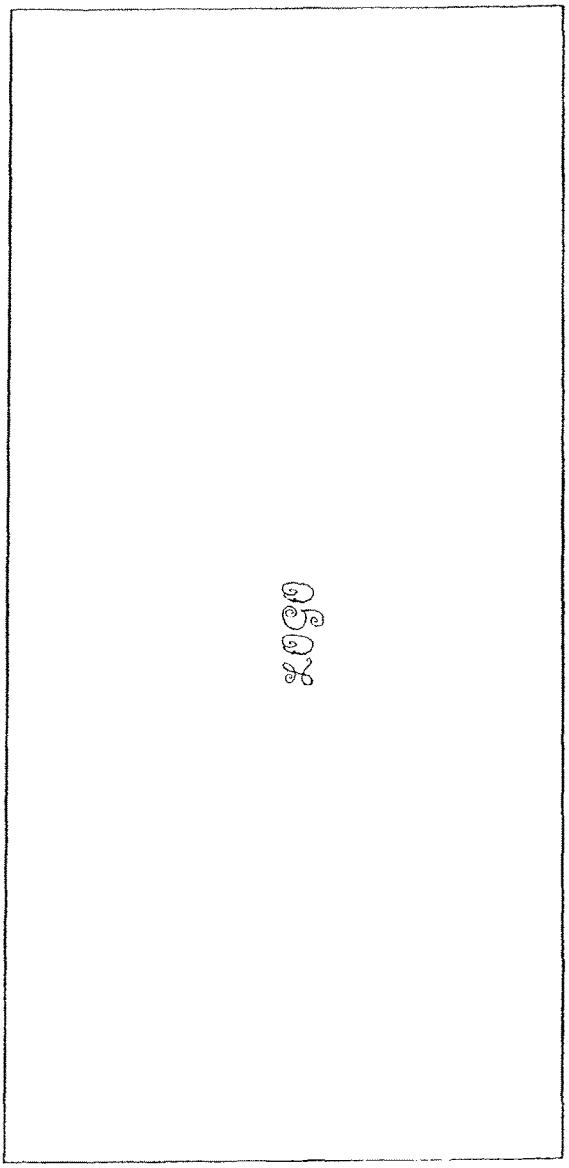

Initially, as illustrated in FIG. 17A, the touch screen 212 may be asleep and locked so that users don't accidentally trigger the screen, e.g., cause food to be ordered, or media accidentally started/stopped when something is placed on the table.

Figure 17B:
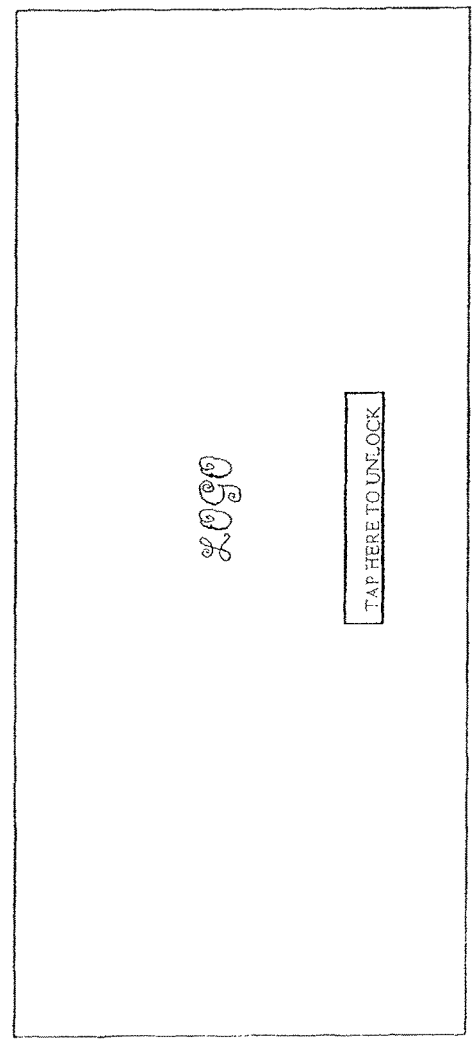
Figures 17C, 17D:
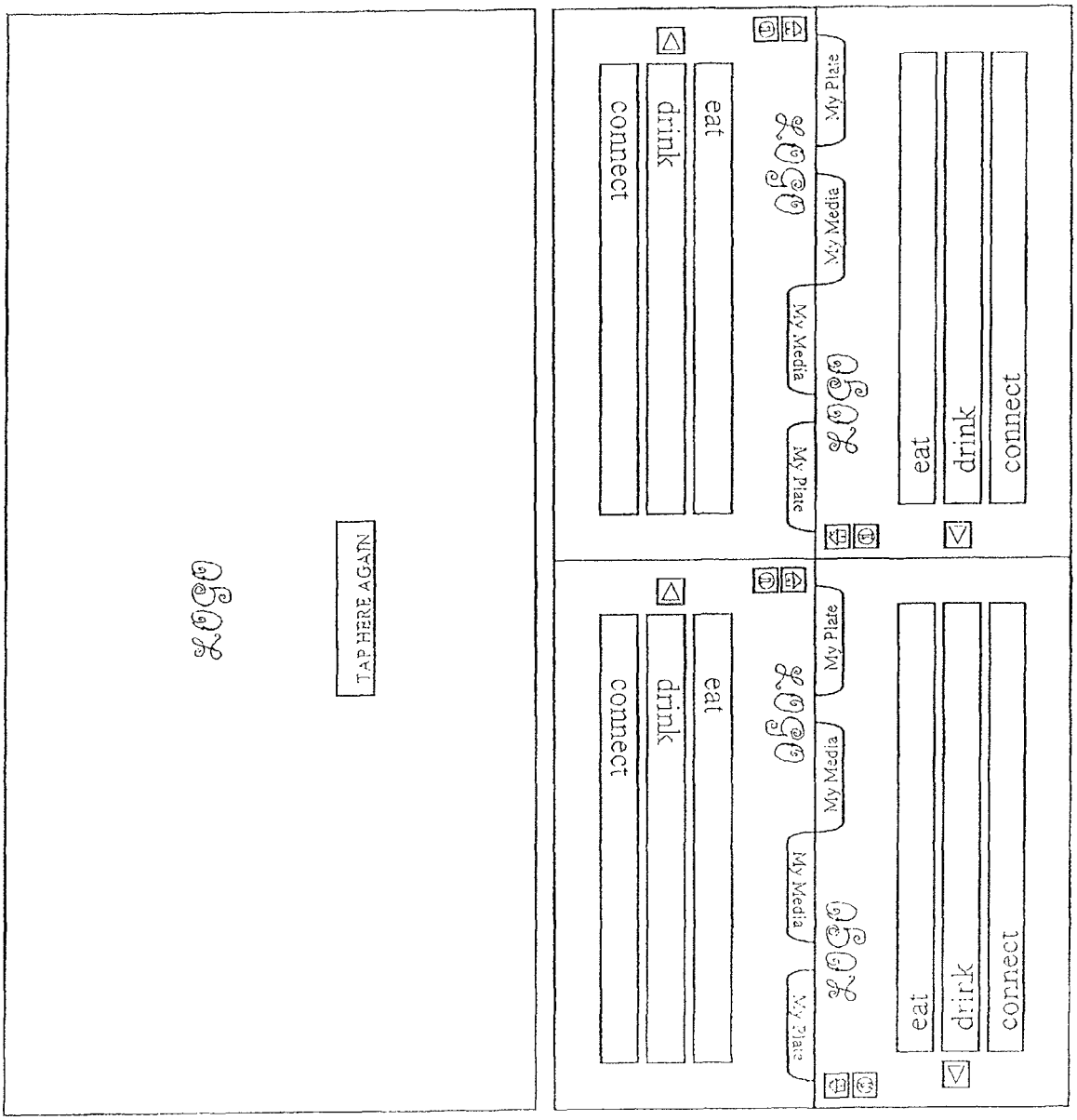

Then, when a user touches the screen, a "tap here to start" box may appear on the screen, as illustrated in FIG. 17B. If the touch was intentional, the user may touch the region in which the "tap here to start" box is present. In response to such a touch, as illustrated in FIG. 17C, a "tap again" box may appear. Once the "tap again" box has been touched, a home screen appear, as illustrated in FIG. 17D. Thus, reaching the full display may require two taps in a defined location within a short period of time in order to view the home screen.

Additionally or alternatively, when the screen is asleep, every time the screen is tapped, a small circle that grows in size where the tap occurred may be displayed to cue users that the screen is active and to provide feedback on the location where the tap was registered.

Figures 17E, 17F:
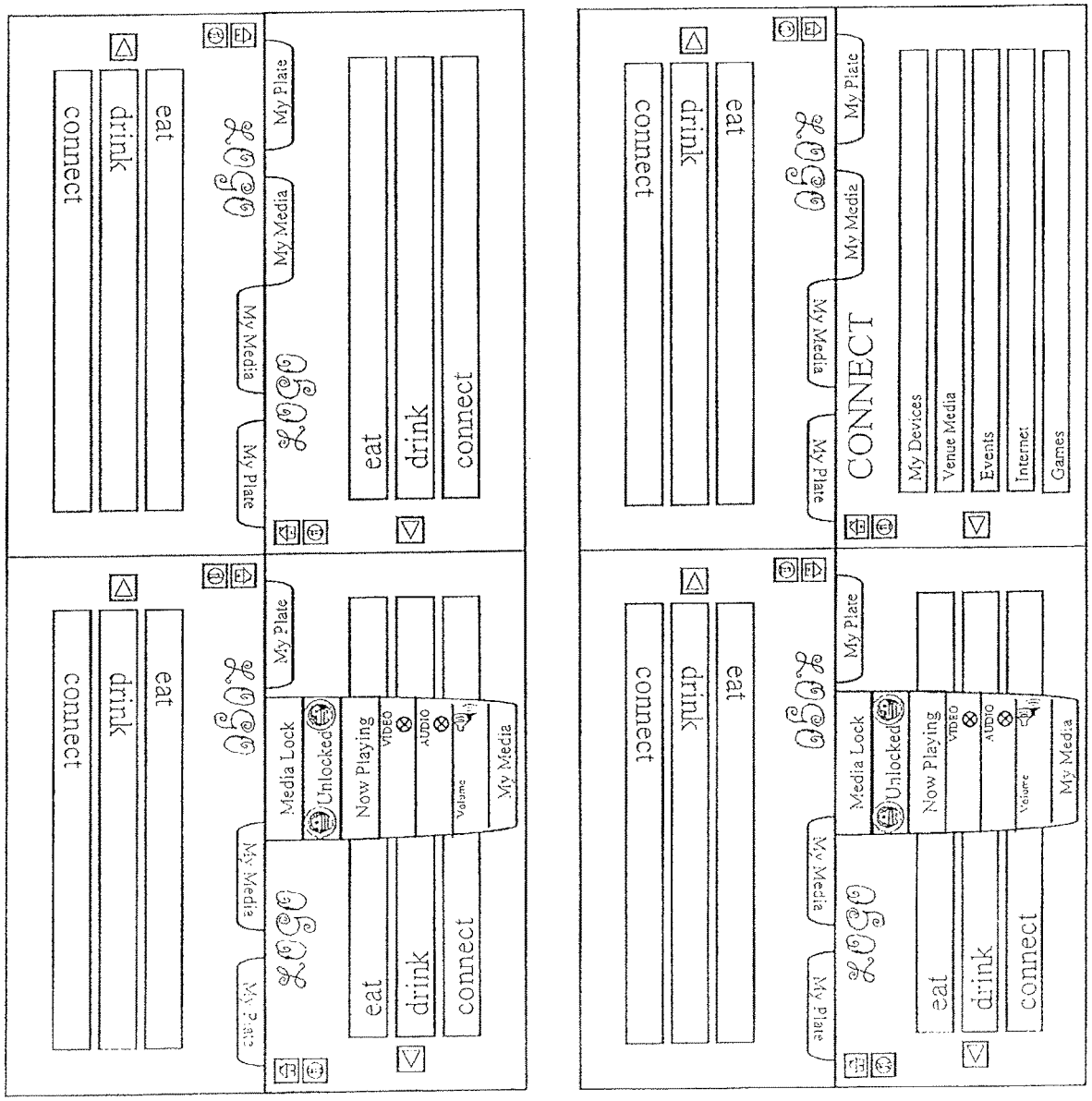
Figures 17G, 17H:
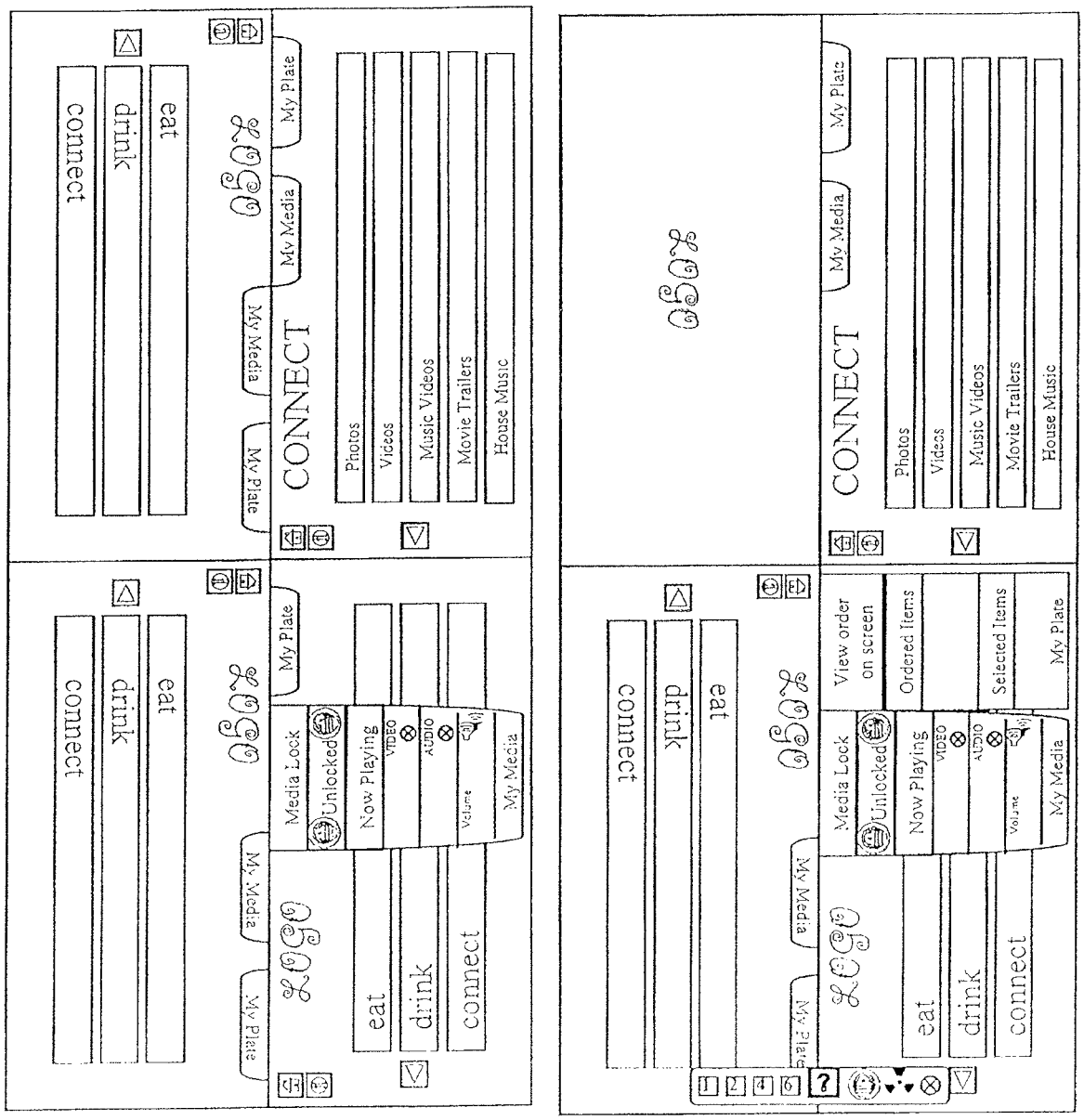
Figure 171:
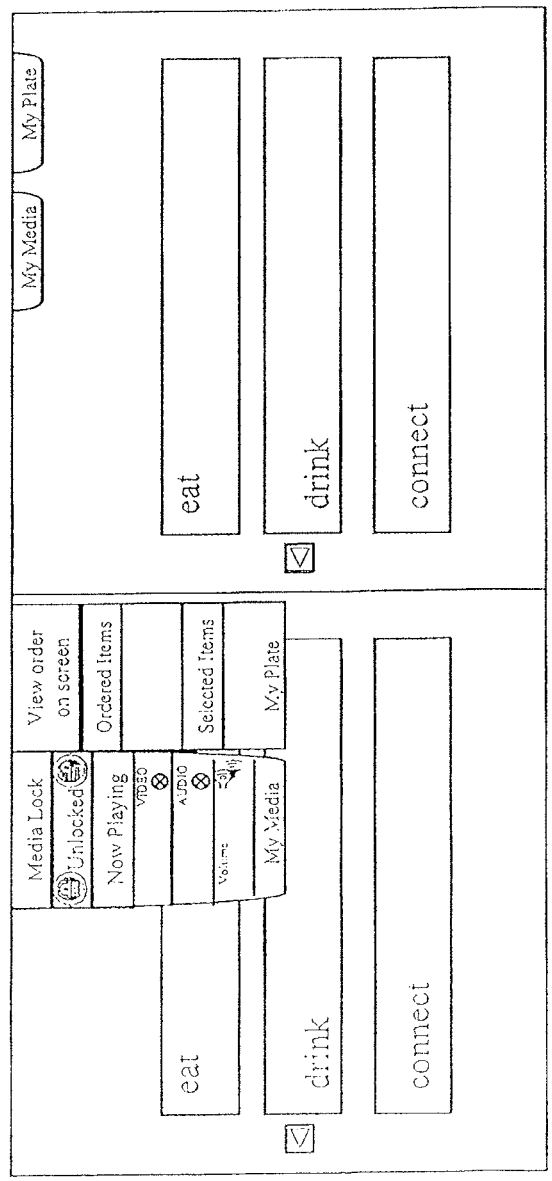

As illustrated in FIG. 17E, "My Media" and "My Plate" pop-down menus may be included. The "My Media" menu allows a user to view the title of the audio and/or video selections that are currently being played. The "My Media" menu may allow overall control of the media on the table and to display information. The "My Media" menu also has a "lock" feature. If a media selection is locked, then that media selection can not be overridden by another media selection until that media selection concludes or is unlocked. When a media selection is unlocked then choosing another media selection in the manner described previously results in the new media selection to be played on the speakers and/or the secondary screens. The "My Media" menu may allow users to adjust volume and stop the audio and/or the video of a selection without taking up an entire quadrant of the screen and, when in the unlocked state, without locking other users from being able to select other content. The 'My Media" menu allows a user to select content displayed in the audio and video sections of my media as illustrated in FIGS. 17F and 17G. If another user hits a different media source, the audio and/or video currently being played is replaced, as well as the identification in the now playing section in my media as long as the media is in the unlocked state. A user may stop playback of now playing content by choosing a different source or hitting the x button in my media by either the audio or video section.

For example, in the entertainment section from the menu of FIG. 11, choices may include television channels, photos, and music videos. If one user chooses a television channel, the audio for that television channel will be sent by the matrix switcher to the amplifier and the video to one of the secondary screens. In the "My Media" menu, the television channel will be displayed in the audio section and in the video section. At this point the "My media" menu will indicate that the selection is unlocked if the computer is set to have unlock as the default selection. In this case if a user makes another selection, for example a music video, for another media file on the computer, then the computer will play the media file and switch the input to the secondary screen to the input that is connected to the computer 350. The computer 350 will also switch the input to the amplifier to the input that the computer is connected to and the media file, in this case the music video selected, will be played throughout the room on the speakers and on the secondary screens. Subsequent selections may also change both the video and audio in the room as long as both the content remains unlocked. If a user hits the x on the audio section, the amplifier input may be switched to an unused input so that no sound is transmitted to the speakers, but the video will still play on the secondary screens. In this case, if an audio only selection is selected (e.g. a music selection from the computer or an mp3 player music selection) then only audio on the speakers will change to the selection but not the video. This may be achieved by the computer sending a signal to the amplifier to change the input to the corresponding selection, but keeping the input on the television to the previous selection.

Once users are satisfied with their selections, the "My Media" drop down menu illustrated in FIG. 17D may be used to lock the selection. Once locked, choosing another selection will not cause any change to the audio or video until the completion of the selection. This is advantageous, as users will often choose a media selection and then stop using the touch screen, but continue to place objects, e.g., dishes, glassware, flatware, etc., on the table. Sometimes, these objects will trigger media selections. Without the ability to lock media, these objects may inadvertently change the media being played. Once a media selection is locked, the pop-down menu may be closed so that at least three taps in three different locations on the screen would be required to change the selection. For example, once the "My Media" menu is closed, media may be changed after 1) one tap to open the "My Media" menu, 2) one tap to unlock the media selection, and 3) one tap to choose a new media selection.

The "My Media" menu shows what is playing in the booth: both the audio and the video. The audio and/or the video may be blocked. The volume may also be controlled. The media may be placed in a lock state or an unlock state. Thus, if both audio and video are locked, new selections will not later what is being played. If either one is locked, then only the unlocked source will be altered. If neither is locked, the new selection will alter both media.

As illustrated in FIG. 17H, a hidden control panel may be included to allow a server to place the screen in 1, 2, 4 or 6 person mode, e.g., to the 2 person mode illustrated in FIG. 17I. The default mode may be 4 person mode. Additionally or alternatively, other buttons may be provided to allow users to toggle between the various modes within a single session.

The computer may also store various media files, e.g., photos (video only), songs (audio only), movies (audio and video) and music videos. In a preferred embodiment, when a particular selection of a category is made on the touch screen, thumbnails or small icons representing the media in that category are displayed on the touch screen.

For example, if music videos are selected, thumbnails representing each of the music videos stored on the computer are displayed on the touch screen. Tapping or selecting a particular thumbnail will cause the computer to play that particular music video on the secondary screen and on the speakers through the amplifier.

Alternatively or additionally, selecting a particular thumbnail in a section may play that music video only in that section. The orientation of the video may have the same orientation as the corresponding section of the screen and be confined to play within the section. Thus, the video is suitable for viewing by the particular user's location and multiple user's may each watch different videos, with each video played within each user's section.

Typically, the resolution of the entire touch screen may be a standard television screen resolution for example 1900× 1280 pixels. Thus, if the touch screen is in a four person mode, then each section will have one quarter of this resolution. If multiple pictures and videos are displayed on the touch screen simultaneously, border regions may be provided between the media displays so that they do not interfere with each other. For this reason, the videos or images displayed within each section may have a size smaller than the entire area of each section and so the resolution of each video displayed within a section will typically be less than ¼ of the resolution of the screen.

For this reason, when a video is displayed on a touch screen, it may be down sampled to lower resolution as it is played. If two computers are used (one for the touch screen and one for the secondary screen) then the videos and images on the computer that drives the touch screen can be down sampled to occupy less storage space on the computer and facilitate faster and more efficient playing of the videos. Either way, for this reason, it is typically easier for the computer to handle playing of a video on the touch screen than on the secondary screen. However, the other techniques described previously (using different programming threads or different processors for each section) may be used to ensure efficient smooth playing of videos on the touch screen.

Within each touch screen, there may be a button to publish the video to a secondary screen. Tapping this button may cause playing the video that is being played within a section of the touch screen to also be played on the secondary screen.

In this manner, the touch screen may be used to display and list information for the user to explore, but once selected or published, media may be actually played on a different screen. This allows the user to browse through items on the touch screen, but once a selection is made the screen is freed up for other uses, e.g. placing plates, cups and silverware on the screen.

This function may be further enhanced by locking the media to be played and putting the screen to sleep. This may be realized by using the "My Media" drop down menu, to lock the media. Then, the "My Media" drop down menu may be closed. At this point, no tapping on the screen can change the media being played until the music video selected is complete or unless a "My Media" drop down menu is opened and the media file is unlocked. In addition, the touch screen 212 may be put to sleep using the back arrows to back out of the menu to the home screen. From there, another back button tap puts the screen in to sleep mode for additional security.

Thus, in contrast to conventional "windows" on a computer display, in which there is typically one window in the foreground that is "active" and the rest are in the background, sections in accordance with embodiments may be simultaneously active. In other words, tapping a section on the touch screen does not bring that section to the foreground and put others in the background, because our system is designed for multiusers and to have multiple sections active simultaneously. For example, a first user may choose "eat" from the high level menu in a first section and be viewing the menu and tapping the screen within this section to view information on food and to order items. At the same time that the first user is performing this task, a second user may be using the interface in a second section. The second user may, for example, be playing a game or drawing a picture. In this case, when the first user taps buttons and navigates through the menu, changes to the touchscreen occur within the first section. For example, different menus are displayed within this first section. Similarly, the second user can tap and navigate through menu items and play games. The menu items and video that affects the touch screen is confined for the most part within this second section. The second user can be performing these actions at the same time the first user is performing actions in the first section. A touch is not required to bring one to the foreground.

Having simultaneously active windows helps greatly in implementing a multiuser system. For example, if 2 taps occur within one section in quick succession, it is assumed that the 2 tapas came from the same user. If they occur in quick succession, the computer may be designed to reject the second tap, because it may be assumed that this was an accident. Alternatively, the second tap could cancel the action of the first tap and initiate the action of the second tap. For example, if a list of navigational items (e.g. eat, drink, connect) is displayed in a first section and a user taps a first item (e.g. "eat") that action may cause the corresponding menu to be displayed in that section (the "eat" menu). If a second item (e.g. "connect") is tapped quickly, during the transition from one display within that section to another (before the section has completed a changed in its display), the second tap may cancel the display of the information of the first item and instead display the information of the second tap. On the other hand, if these 2 actions occur in different sections, then the information for each item may be displayed in each section. For example, if the first user taps "eat" within a first section and a second user taps "connect" within a second section, the computer will interpret this as actions from 2 different users. Therefore the eat menu can be displayed in the first section and the connect menu can be displayed in the second section, even if the tap in the second section occurs before the first section's display has changed. This is achieved by setting pre-defined boundaries between the sections that are communicated to the computer and stored in memory prior to the occurrence of the taps.

Detailed POS Screen Shots

FIGS. 18A to 18E illustrate screen shots for different stages in use of the POS computer in accordance with embodiments. This separate POS computer, e.g., the server 1300 of FIG. 13, may monitor a status of all the tables.

Figure 18A:
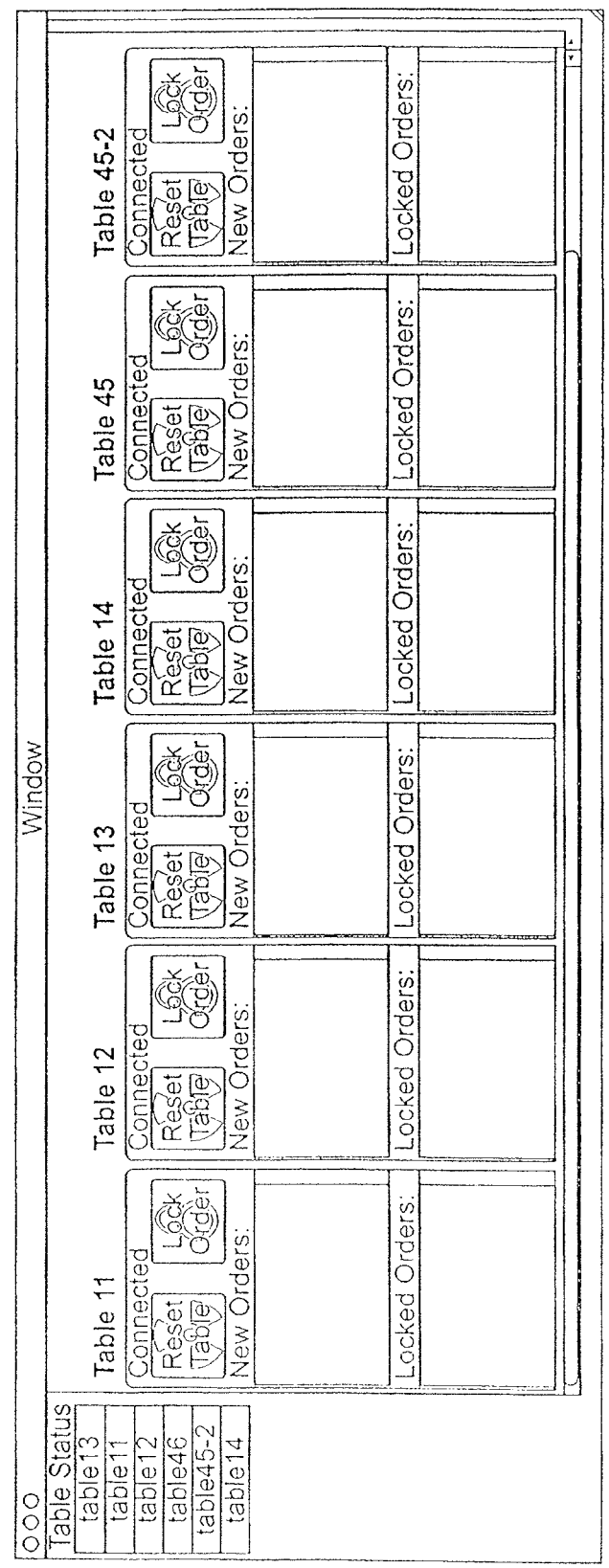
FIGS. 18A to 18E illustrate screen shots for different stages of use of the point of service display in accordance with embodiments.
Figure 18B:
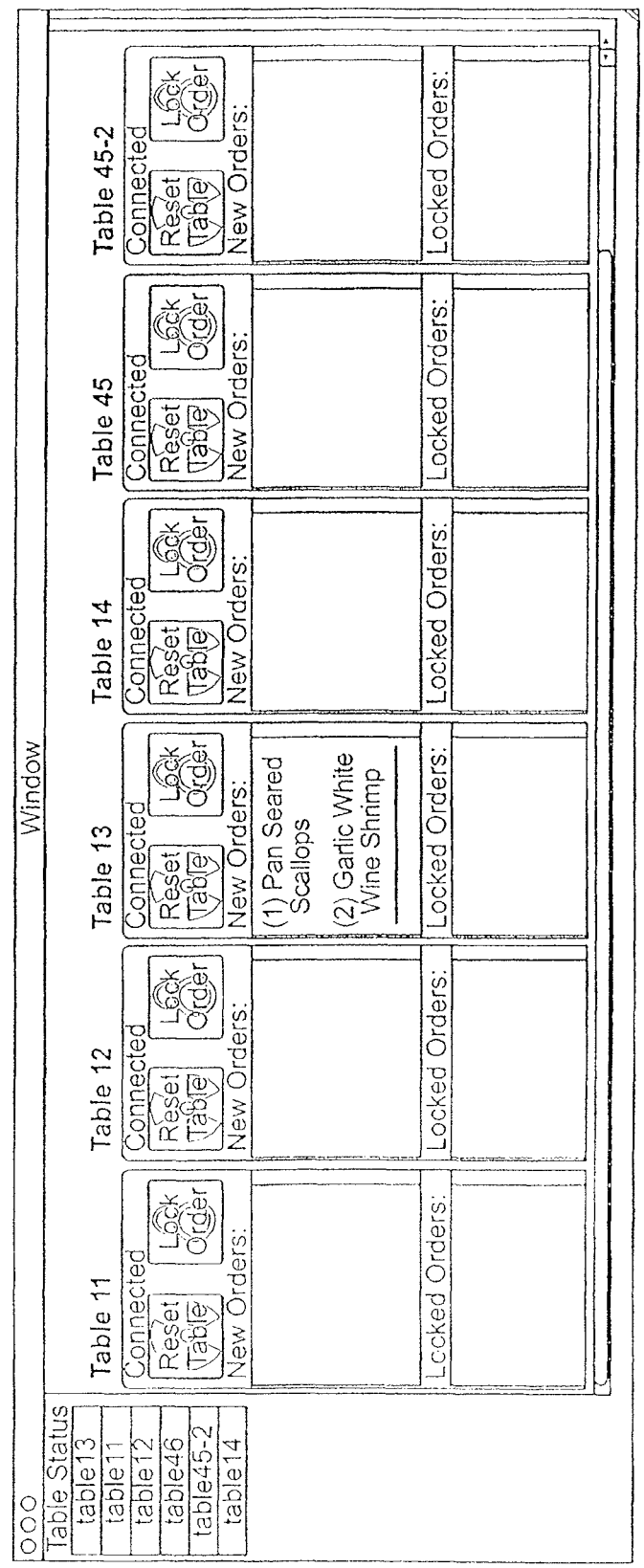
Figure 18C:
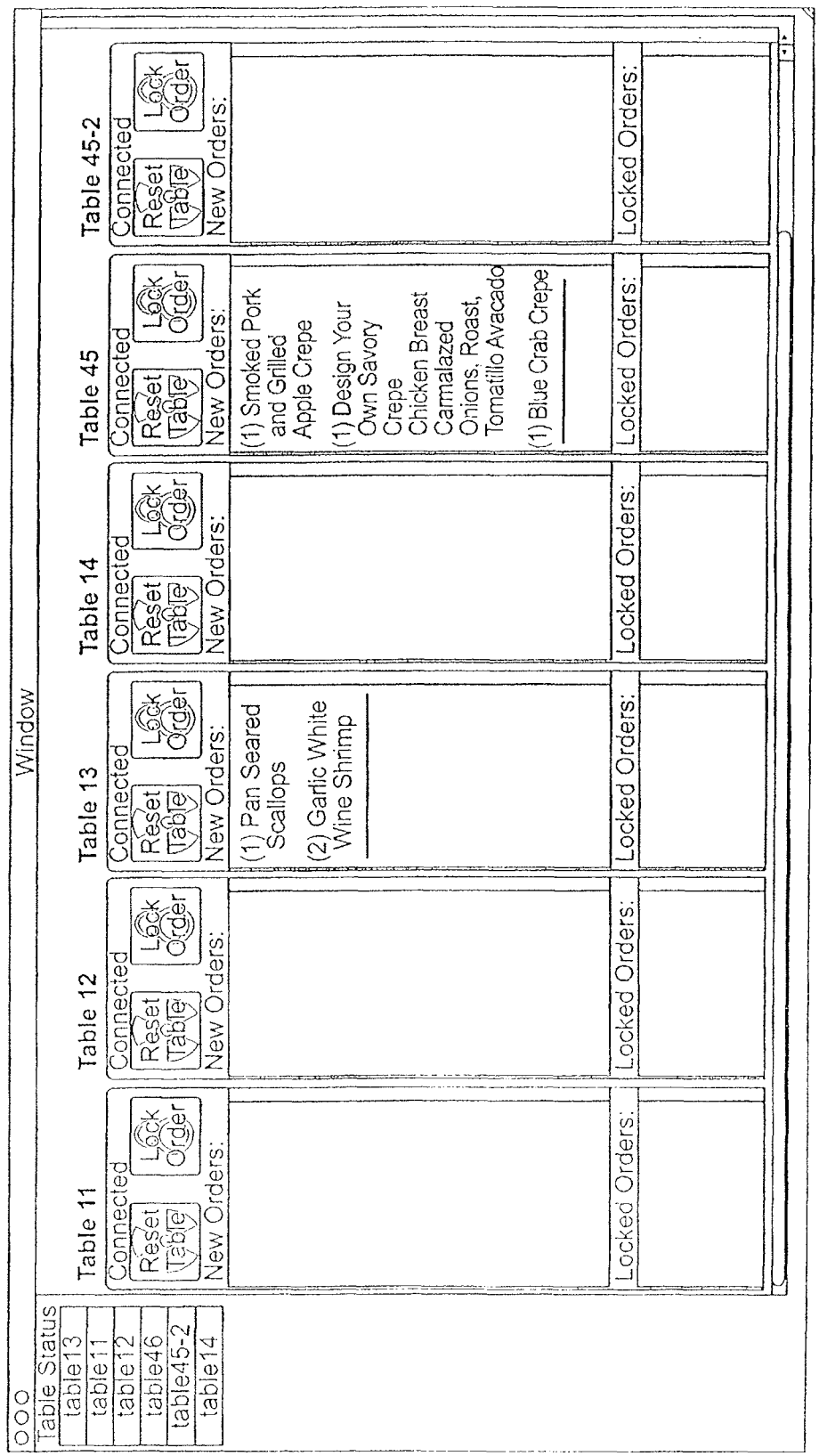
Figure 18D:
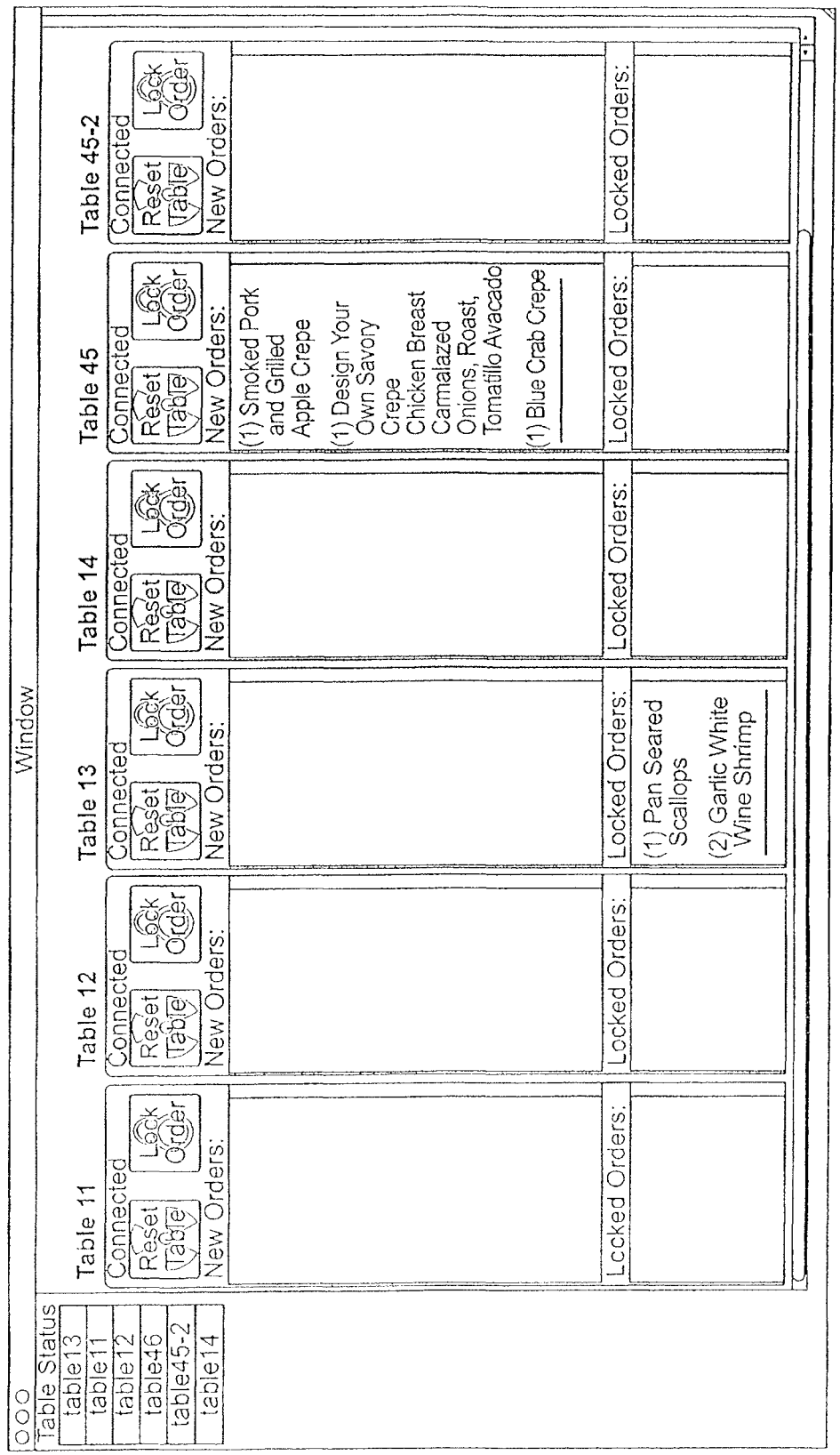
Figure 18E:
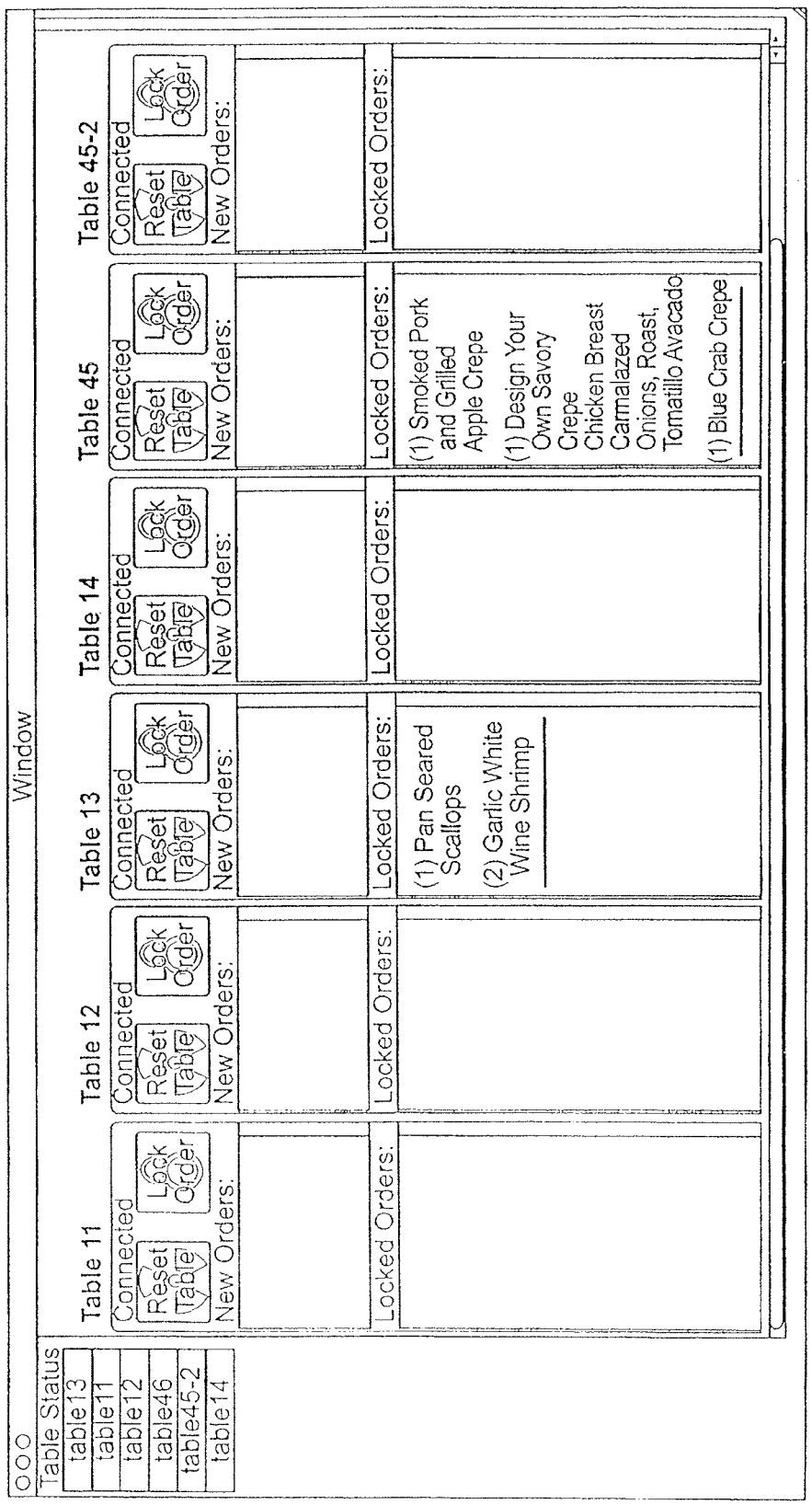

For example, as illustrated in FIG. 18A, two rectangles may be associated with each table, e.g., an upper rectangle contains items that have been ordered by the table but not yet entered in to the POS (submitted but not locked), and a bottom rectangle contains items that have been submitted and locked. When new items are input to the separate computer, the upper rectangle may be highlighted, e.g., in yellow, as illustrated in FIG. 18B. Thus, a glance at the screen alerts the servers that there is something that they need to do. After a period of time, e.g., two minutes, if the items have not been locked, the items are highlighted in red, as illustrated in FIG. 18C. When the server hits the lock button, the items may be sent by the table computer to the POS computer electronically. The servers may send only a portion of the order to the POS. As most venues will not have all electronic tables, e.g., only 10%-20% of the tables may be electronic, the remaining tables may need a conventional POS.

As a further alternative, each server waiting on electronic tables may carry a portable device, e.g., a pager, an Iphone®, or an Ipod® Touch. The information may then be sent directly to the server's portable device, and the server may use this portable device to send the items to the POS or directly to the kitchen. This portable device may display the same images as the POS computer, but may show only the tables that server is responsible for or may display only tables with items to be acted upon. This may reduce a number of conventional POS computers needed, may allow servers to interact more with customers, may reduce bottlenecks at the POS computers, etc.

Real-Time User-Designed Content

Figure 19A:
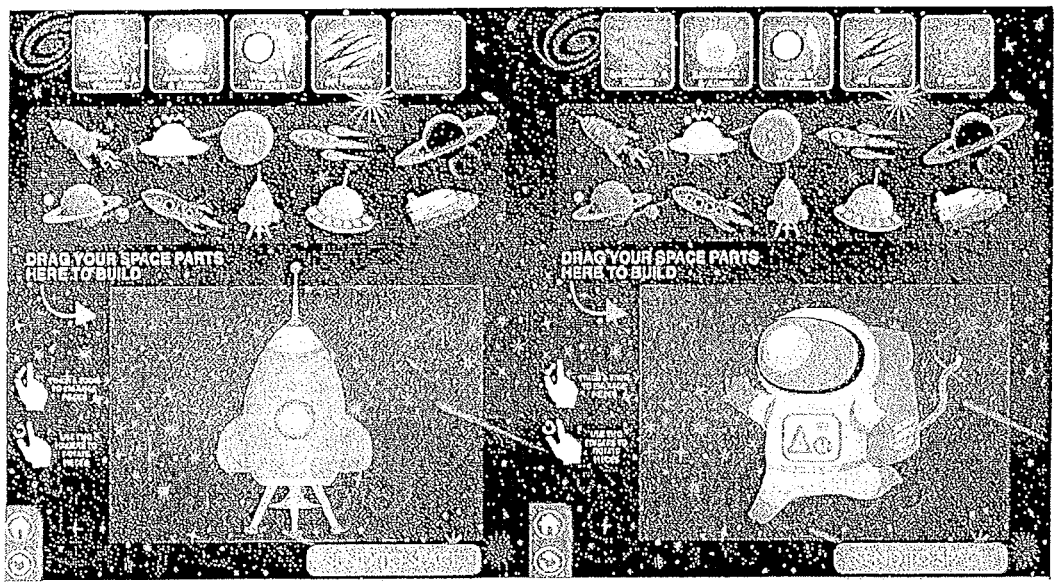
FIGS. 19A and 19B illustrate screen sheets for creation of real-time user-designed content and a community screen for displaying content.
Figure 19B:
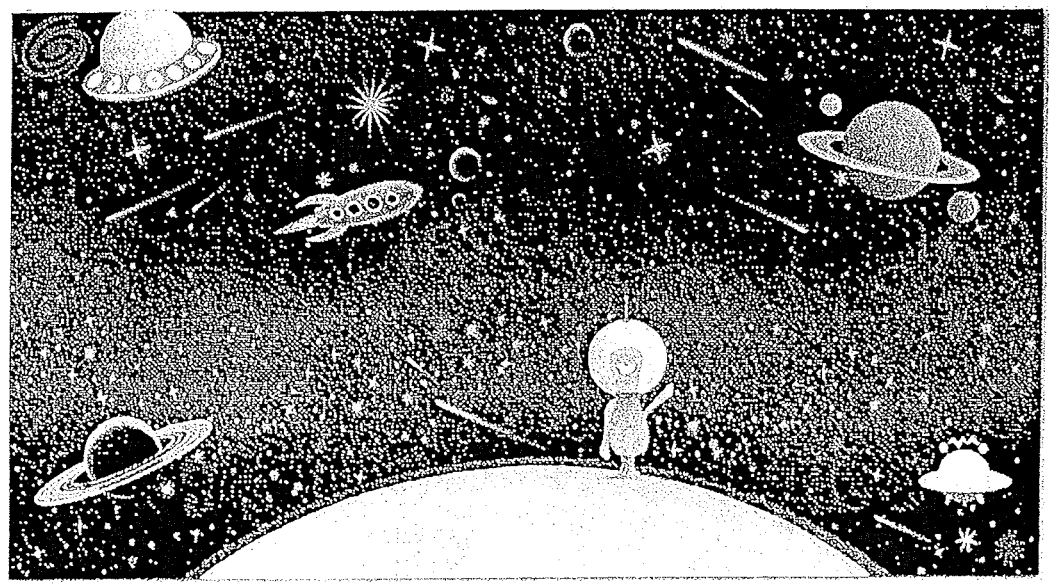

FIG. 19A illustrate a two person mode in which a user can design their own content, here a figure to be displayed in a space themed background on one or more secondary or community display screens, a single such screen being illustrated in FIG. 19B. When more than one secondary or community screens are to be employed, these screens may be continuations of each other's background and the figures may move between these screens, either as controlled by a program and/or as directed by the user. Each user may also tag their figure, e.g., with a name for the figure, the user's name, age, hometown, and so forth. When community or secondary screens receive figures from displays that are not co-located therewith, the figures may be automatically tagged with the location of the user that created that figure. Users could also modify their figure created in this manner in to a greeting card, which could then be sent out electronically, or mailed out (physical mail) or printed out.

The figure may be static on the individual display screen on which it was created and only become animated once sent to the secondary or community screen. Other inputs to the system may result in a change in the figures on the secondary or community screen. For example, figures in a first secondary screen may correspond to a party on a waitlist. When that party has been seated or called, the figure corresponding to that party may move to a second secondary screen. When that party has paid, the figure may be removed from the secondary screen. The computer can be designed to provide various animations for the above cases. Users could choose from the above animations or provide their own when sending their figures out either as electronic greeting cards or saving them to a remote storage drive or otherwise emailing them or transferring them electronically.

Waitlist Applications

Applications may provide interaction of waitlist, e.g., displayed on a community screen, and a mobile device. For example to enter a person on a waitlist, typically a venue employee enters the user's information in to an application running on a computer, which may be a standard computer or a tablet computer. In this case, the image associated with a person or party may be generated automatically by one of the networked computers or may be provided by the user or by their mobile device or by a networked camera. The computer associated with the waitlist server app would be networked to the computer driving the community screen displaying waitlist images. The community screen may display a combination of: a waitlist, user created content from primary stations, user created content from apps from mobile devices, and so forth. Alternatively or in addition, a user may enter themselves directly on to a waitlist from their own personal mobile device, e.g., a mobile phone or table computer.

An application for a mobile device (Mobile App) may be written for a particular venue. e.g., a particular restaurant. This Mobile App may include the ability to allow the user to enter their name on a waitlist, as well as to play games, build an object (e.g. a custom space ship or other images, either static or animated), order food or drinks, communicate information, and so forth. Functions incorporated in to the Mobile App may include any of the functions incorporated in to the booths described above. The Mobile App may be customized for the particular venue, for example branded with the name of the restaurant or other venue. In this manner, information on the community screens may come from a combination of inputs received from Mobile devices, inputs received from the primary stations and inputs received from local computers such as a waitlist server. For example, if the community screen displayed a virtual fish tank (or the space background illustrated in FIG. 19B), the animated fish displayed in the fish tank (or the animated spaceships) could be created by both users at the primary stations and users using the Mobile App.

After a user installs such a Mobile App on their mobile device, prior to coming to the restaurant, they could launch this Mobile App. At this point, the Mobile App may give them information about the wait time at the venue. If desired they could enter their name on to the waitlist. The Mobile App working together with the employee at the venue may utilize location services (for example GPS information or if the user is on the venue's wi-fi network) to determine if the user is within a specific range. When using a waitlist or a reservation system, it is desirable to minimize the number of no-shows and ensure that parties arrive close to their scheduled times in order to increase venue throughput, e.g., the number of seatings per table. The range can be specified in terms of a physical distance or the Mobile App and server could determine the driving time. The minimum range and driving time could be determined as a fixed predetermined value or could be adjusted based on the actual conditions at the venue. For example, if the wait time is 30 minutes at the venue, then the minimum distance to allow users to enter on to the waitlist could be where the driving time is 30 minutes or less. Once entered on to the waitlist, the Mobile App and server can be designed to continually or periodically check the distance or driving time to ensure that the person arrives at the scheduled time. If the time or distance is exceeded, the person could be removed from the waitlist, or moved down the waitlist. If the person is more than a given distance away the Mobile App and server may determine that the person no longer wants to come to the venue. In this case the Mobile App may remove the person from the waitlist and may send a confirmation to warn the user prior to doing so. Also with the Mobile App, the user may play a game, e.g., a party could play a game to change position on waitlist, the venue could offer patrons a bonus to be bumped down the waitlist or to play a game where the position may be moved down.

Figure 20A:
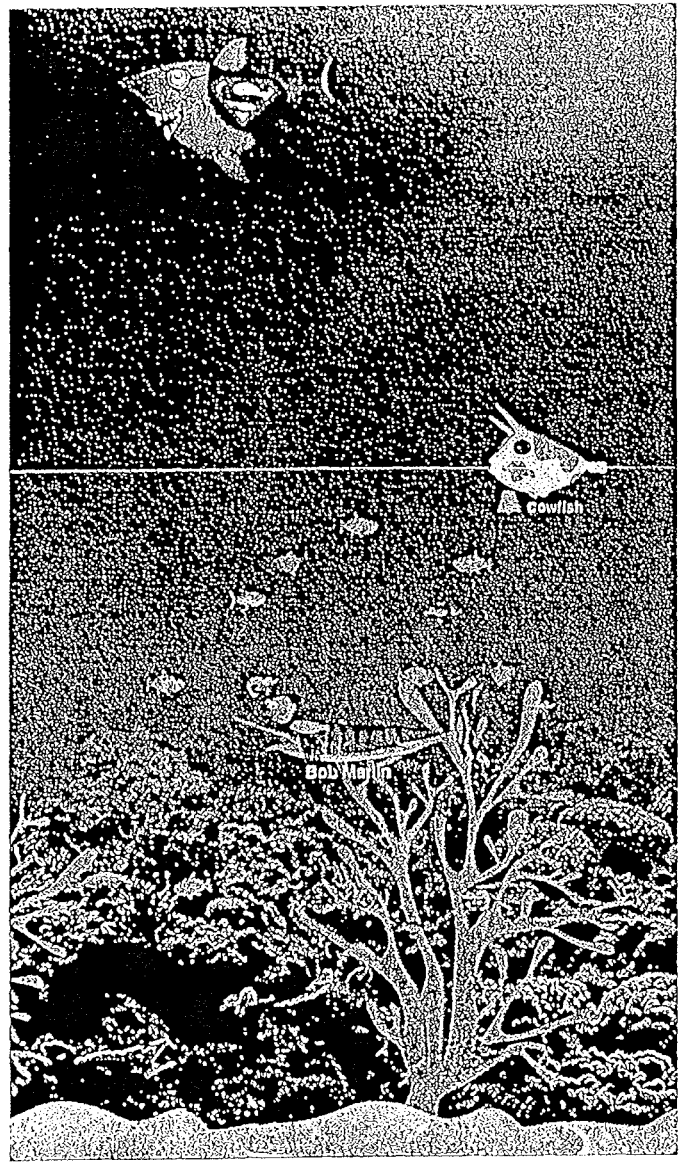
FIGS. 20A to 20D illustrate screen shots for a waitlist application.
Figure 20B:
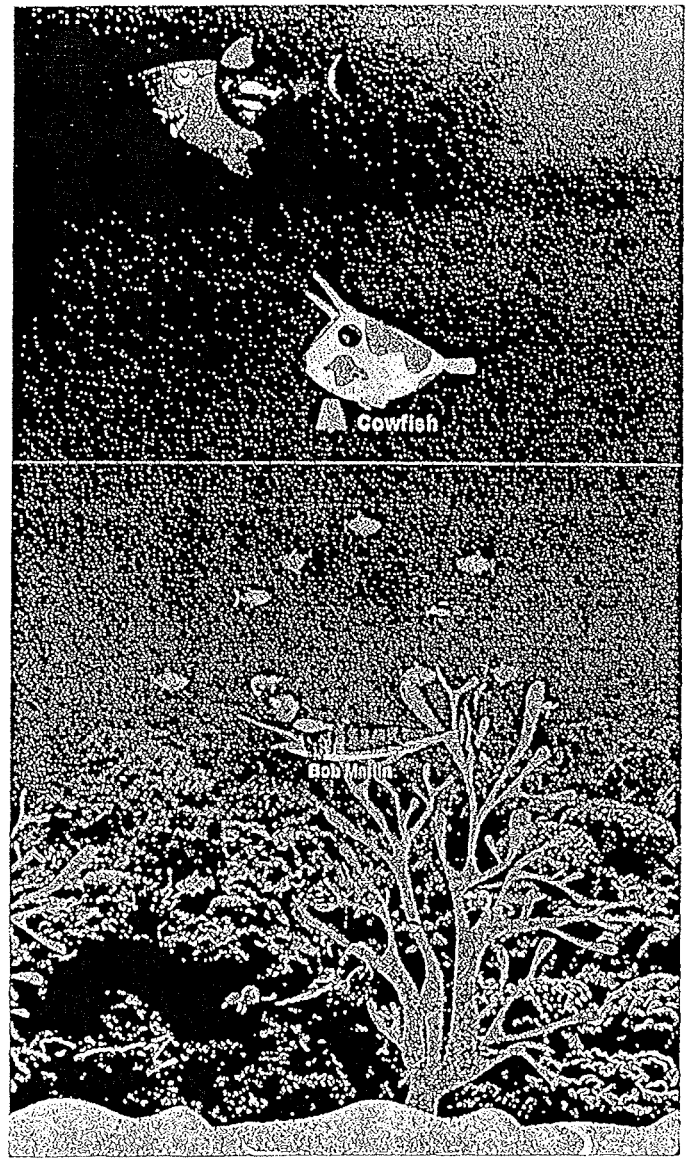
Figure 20C:
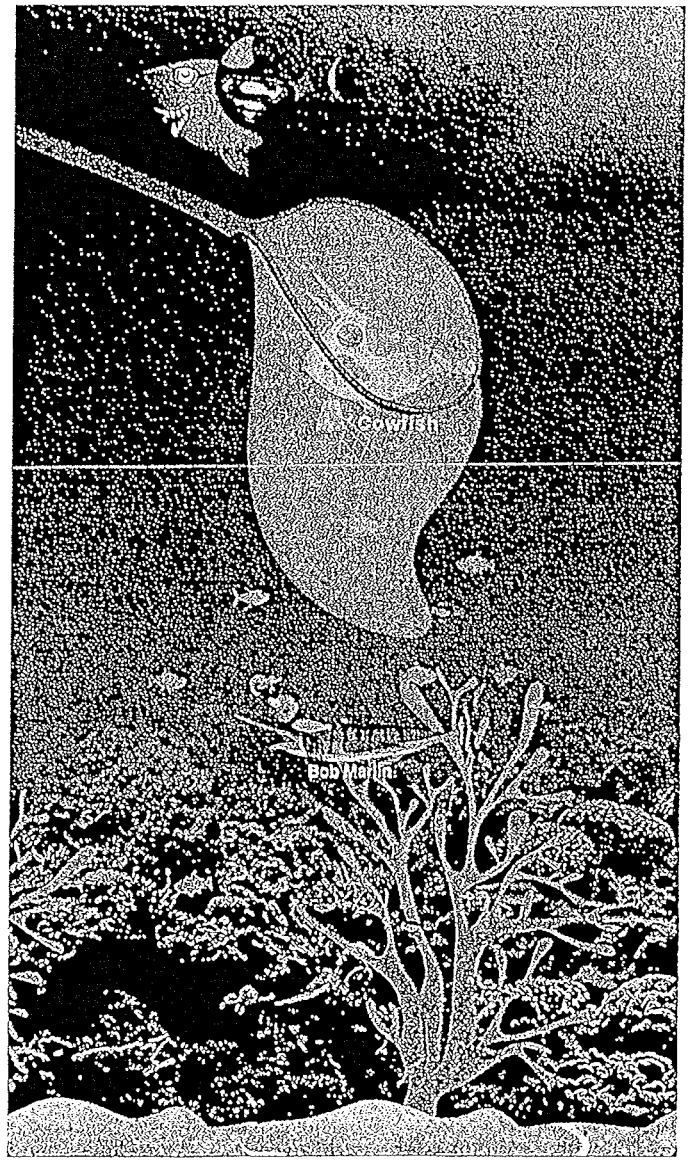
Figure 20D:
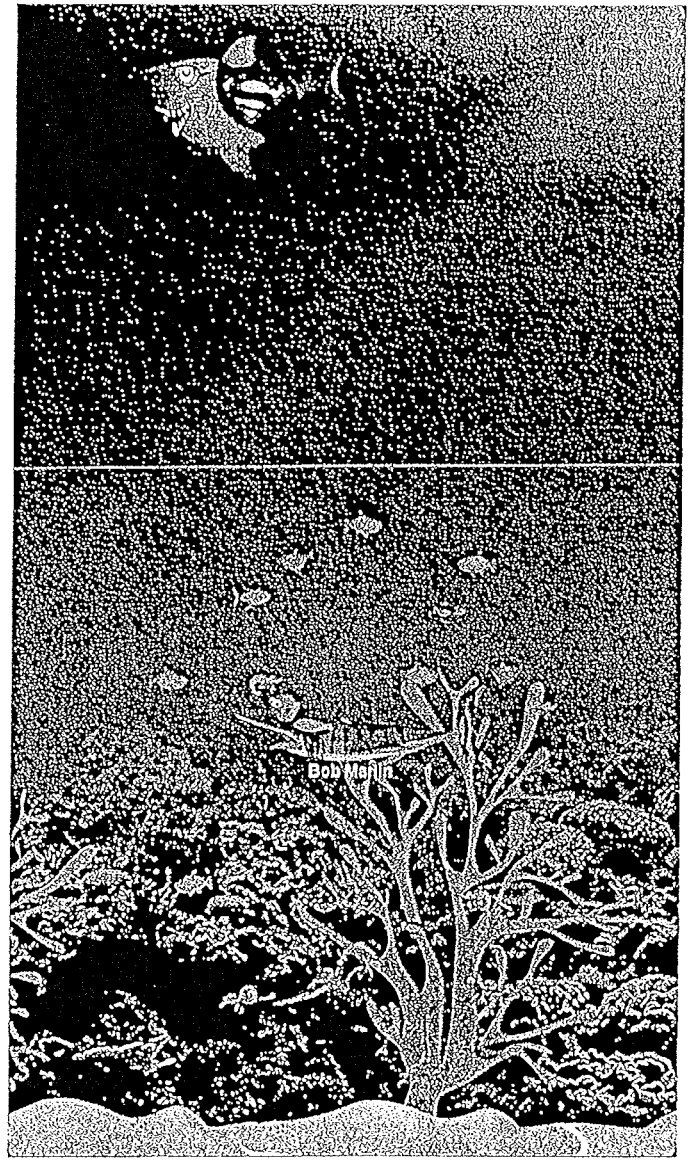

Once entered on to the waitlist, the user may be assigned an image associated with their name or party, e.g. a space ship or a fish, displayed on a community screen, as shown in FIG. 20A, in which three particular images corresponding to different parties. The user may then modify their space ship or fish as described above. As the party moves up the waitlist, a feature of the particular image may change, e.g., a position, size, color, and so forth, may be altered, as shown in FIG. 20B, in which Cowfish is larger. The party would not be allowed to alter the feature indicative of waitlist position. Once it is that party's turn to be attended to, another interaction may occur to the particular image, e.g., scooping out the fish in FIG. 20C, relocating the particular image to another screen, e.g., community screen, and so forth. Finally, once attended to, the particular image may be removed from the community screen, as shown in FIG. 20D.

Single Touchscreen with Multiple Displays

Define each primary station as an area or section including an individual independent fully functional interface including a display (for example an LCD display) and a touch surface. For each primary station, the display and touch surface may be a portion of the display or touch surface. User's mobile devices are typically designed for individual use, so each mobile device will typically correspond one to one with primary stations (one primary station for each mobile device). However, for touch screens embedded in tables, there may be more than one primary station associated with each display and touch surface.

Figure 21:
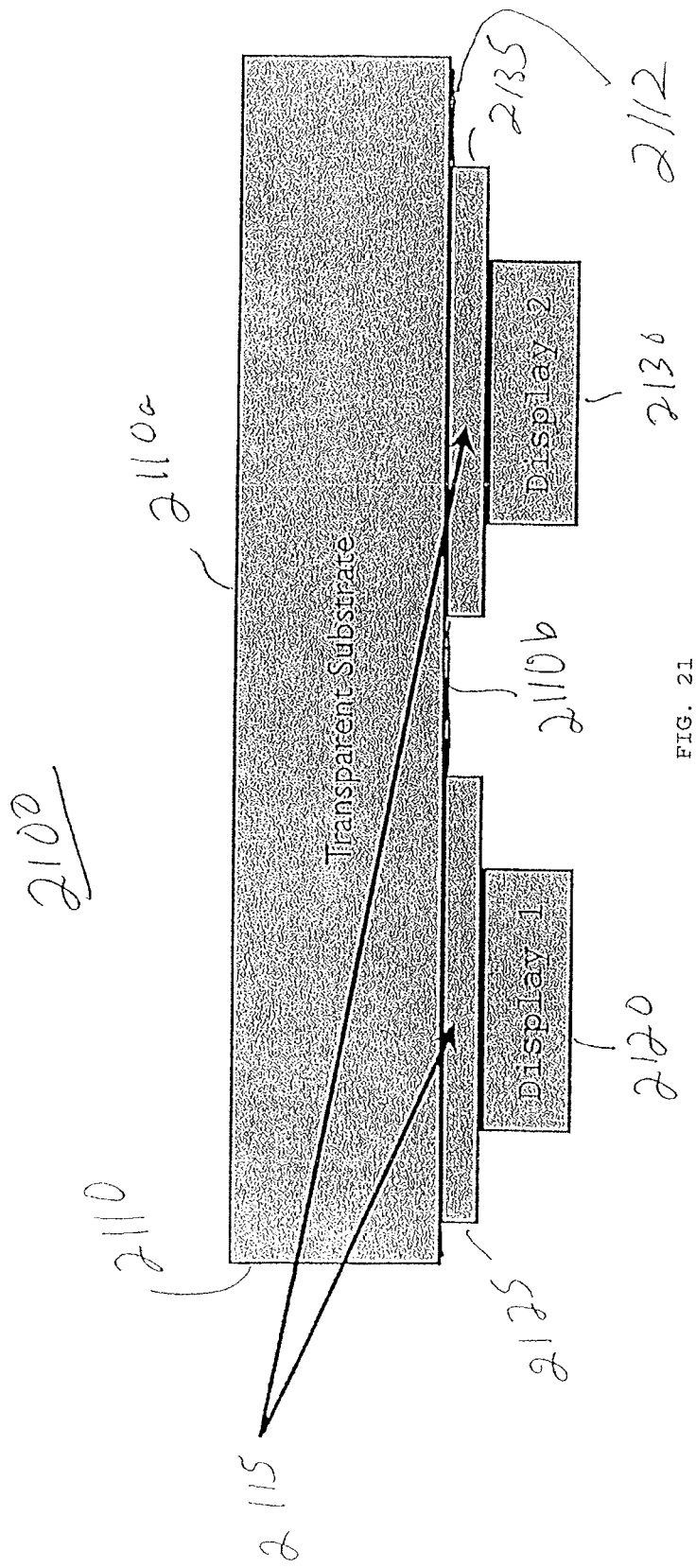
FIG. 21 illustrates a side view of a display according to an embodiments.

While the above discussion described the use of multiple primary stations per display, there may also be multiple displays per touch detection surface as illustrated in FIG. 21. In particular, as the size of the touch detection surface on a table top increases, it is typically desirable to keep a continuous smooth surface as the top surface of the table. However, there are advantages in both cost and resolution to use multiple displays, rather than have one continuous display.

In order to provide both a large surface and high definition, a multiuser, multi-interface computing system 2100 may include multiple displays 2120, 2130 attached to a single substrate 2110, and a touch sensor 2115 between a top surface 2110a of the substrate 2110 and the displays 2120, 2130, as illustrated in FIG. 21. The use of multiple displays can provide higher display resolution across the touch detection surface and/or lower cost than the use of a single display. The number of displays in FIG. 21 may correspond to the number of users, or the displays in FIG. 21 may be further divided into sections as described previously.

The touch sensor 2115 may overlap an entirety of the top surface 2110a or may be limited to touch detection regions 2125, 2135 that overlap the displays 2120, 2130, as illustrated in FIG. 21. When the touch detection regions are limited, electrodes may be provided only in those regions to save cost and improve touch resolution. For example, the touch detection regions may be realized by using a thin touch film with the conductive wires included in the film such as those sold by Visual Planet, 3M®, or Zytronic. Therefore, instead of patterning conductors across the entire surface of the substrate 2100, the touch detection regions 2125, 2135 may be used to create separate touch detection regions. For example, each touch detection region 2125, 2135 may be 32 inch diagonal in size and may be placed on a bottom surface 2110b of the transparent substrate (touch detection surface) in FIG. 21 directly over top of an active area of each display. These touch detection regions 2125, 2135 may be separated by clearly marked pre-determined boundaries and the surface 2110a may further includes at least one region 2140 (see FIGS. 22A-22D) between the at least two touch sensitive regions which is not sensitive to touch or gestures.

In order to have a view from the top of the table of a transparent substrate 2110 under which is a solid uniform color that is interrupted only by the displays 2120, 2130, the bottom surface 2110b of the transparent substrate 2110 may be painted or otherwise provided with opaque material at locations 2112 that do not overlap the displays 2120, 2130, so only those portions corresponding to the displays 2120, 2130 remain transparent. This paint will then hide other components, e.g., the display bezels, the flex lead connectors, and flex leads.

Even when not overlapping the entire front surface 2110a of the substrate 2110, the touch film or touch regions 2125, 2135 may be larger than the display regions, e.g., can be used to detect touches outside of the display areas. These can be used, for example to start or end gestures outside of the area of the displays.

As another example, since there may be patterned paint 2112 on the bottom surface 2110b of the substrate 2110 in FIG. 21, there can also be fixed buttons or icons on the bottom surface 2110b of the transparent substrate: for example the icons shown above such as the number of users per display, reset button, expand buttons, etc. These buttons become fixed once painted on to the transparent substrate, but will be touchable, i.e. touching them will be detected by the touch sensitive sensor and can be sent to the computer to change the display.

In this case there may be one computer 2220, 2230 for each display 2120, 2130, and each computer would operate similarly to as described above. For example, if one computer is used with one touch sensor and one controller and two displays, then the output of the touch sensor could be split and the information sent to both computers. The computer 2220 on the left would use only information regarding inputs on the left side of the touch sensor to effect changes on the left display 2120 with respect to inputs on the left display 2120.

Alternatively one computer 2200 (indicated with dashed lines) may be used to drive multiple displays, in order to save cost. In either the case of one computer per display or one computer for multiple displays, the touch sensor may have one controller for multiple displays or one controller per display.

If, for example, there is one computer, two displays, and one touch sensor, when the computer receives a touch input, the computer can tell which display has been touched by the co-ordinates transmitted. The computer can be operated in extended desktop mode so that the two displays are viewed by the computer as one large desktop. The software can then be designed to divide the extended desktop in to 2 sections and treat each as an independent section as is the case for a single display described previously.

If, for example there is one computer, two displays and two touch sensors, then each controller can be designed to also send information to the computer that includes an id identifying the particular controlled (e.g. a serial number or a position number) along with each touch information packet transmitted. The computer can then use this information to determine from which controller it received the information and, from this, which display was touched. Alternatively, each touch controller can be plugged in to a different port on the computer and the computer can use the port location information to distinguish between the multiple controllers.

Figure 22A:
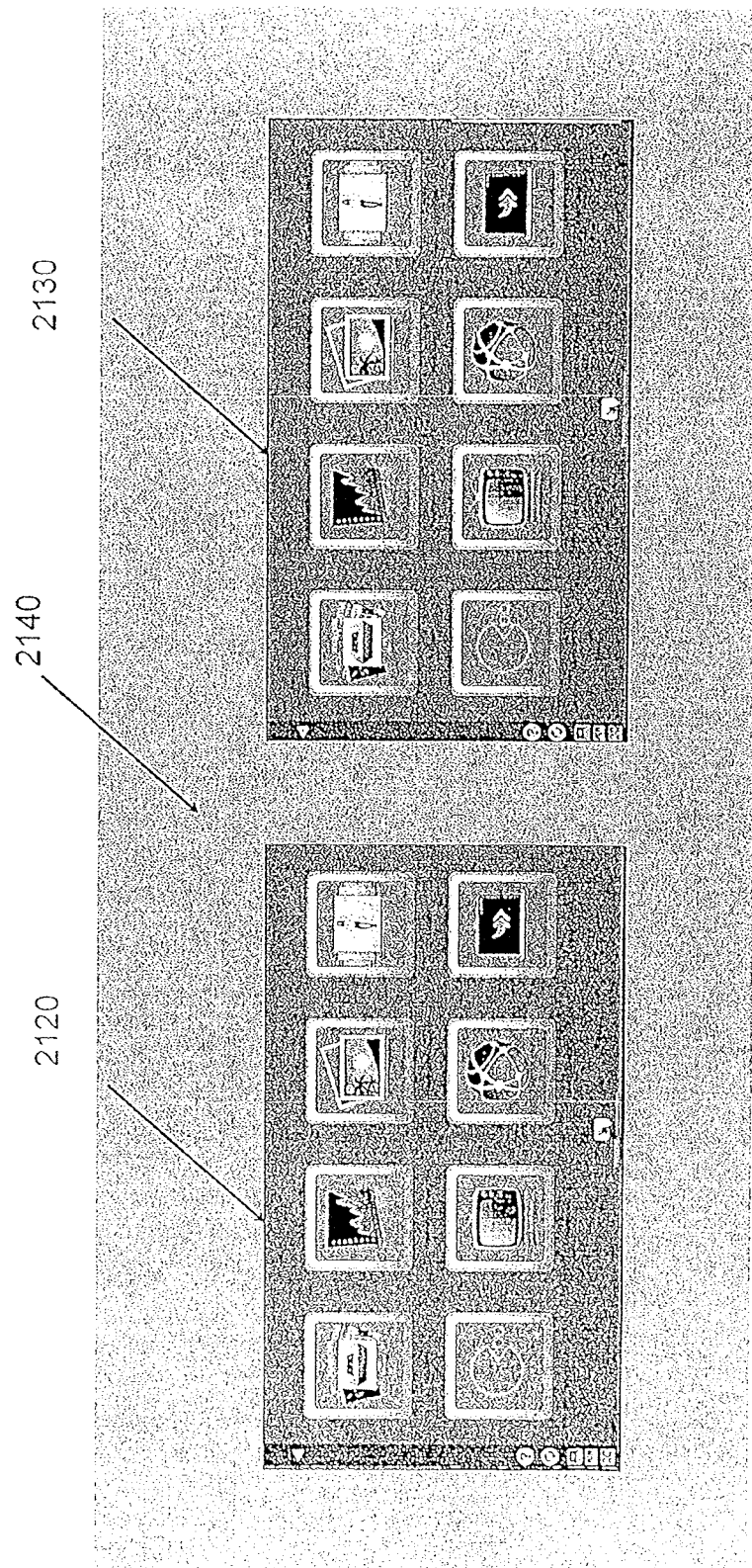
FIGS. 22A to 22D illustrate plan view of different operational states of the display of FIG. 21.
Figure 22B:
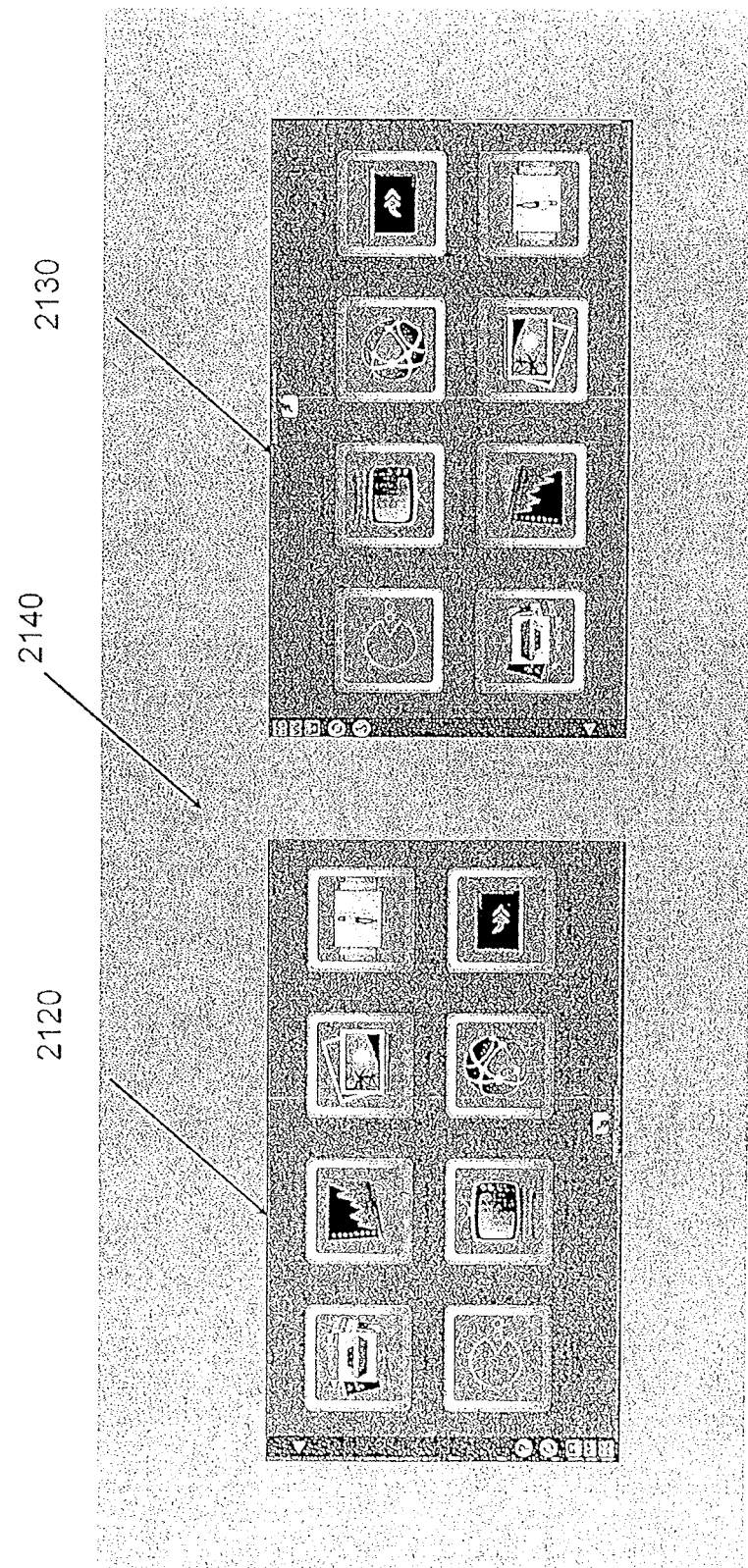
Figure 22C:
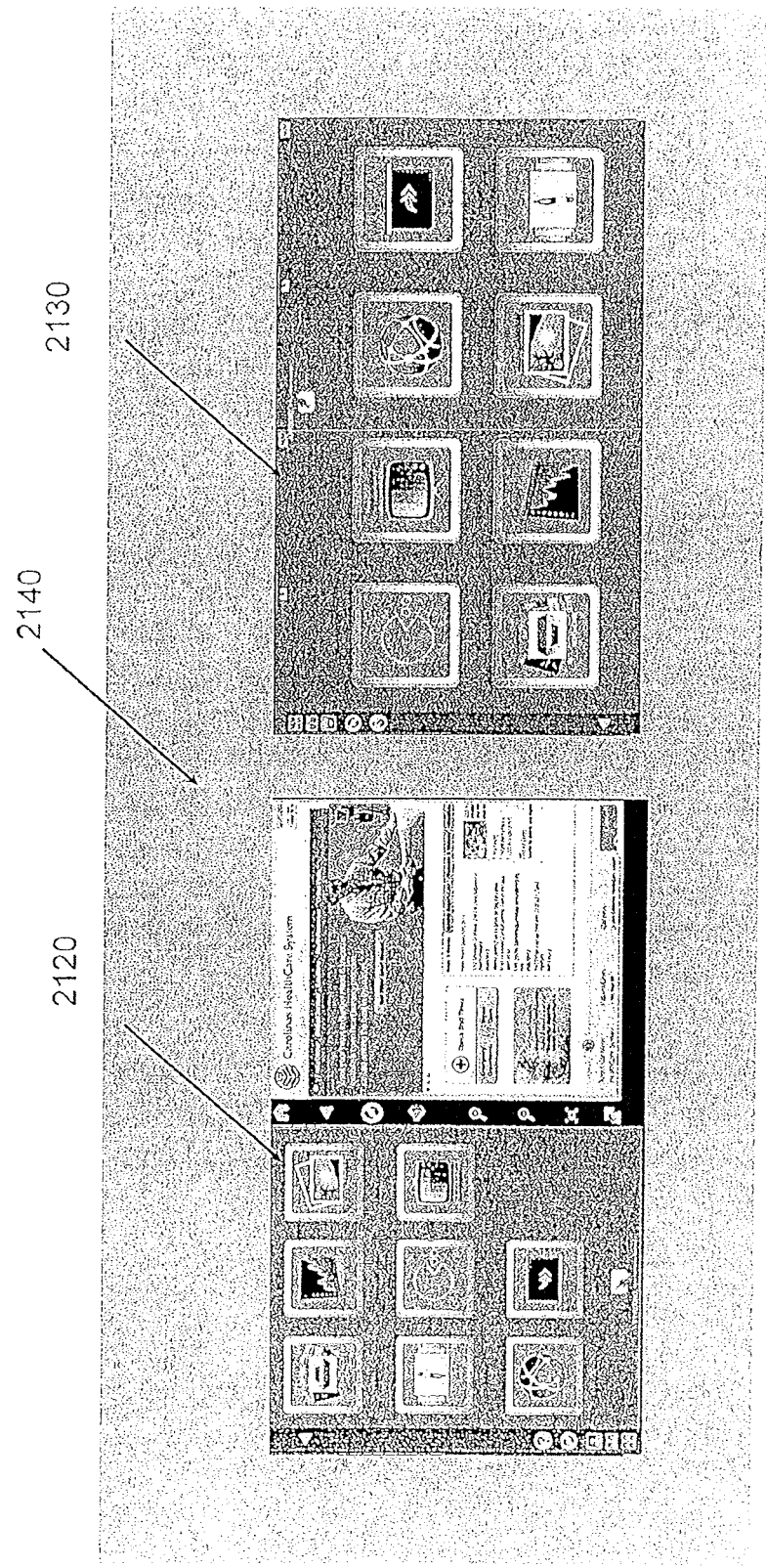
Figure 22D:
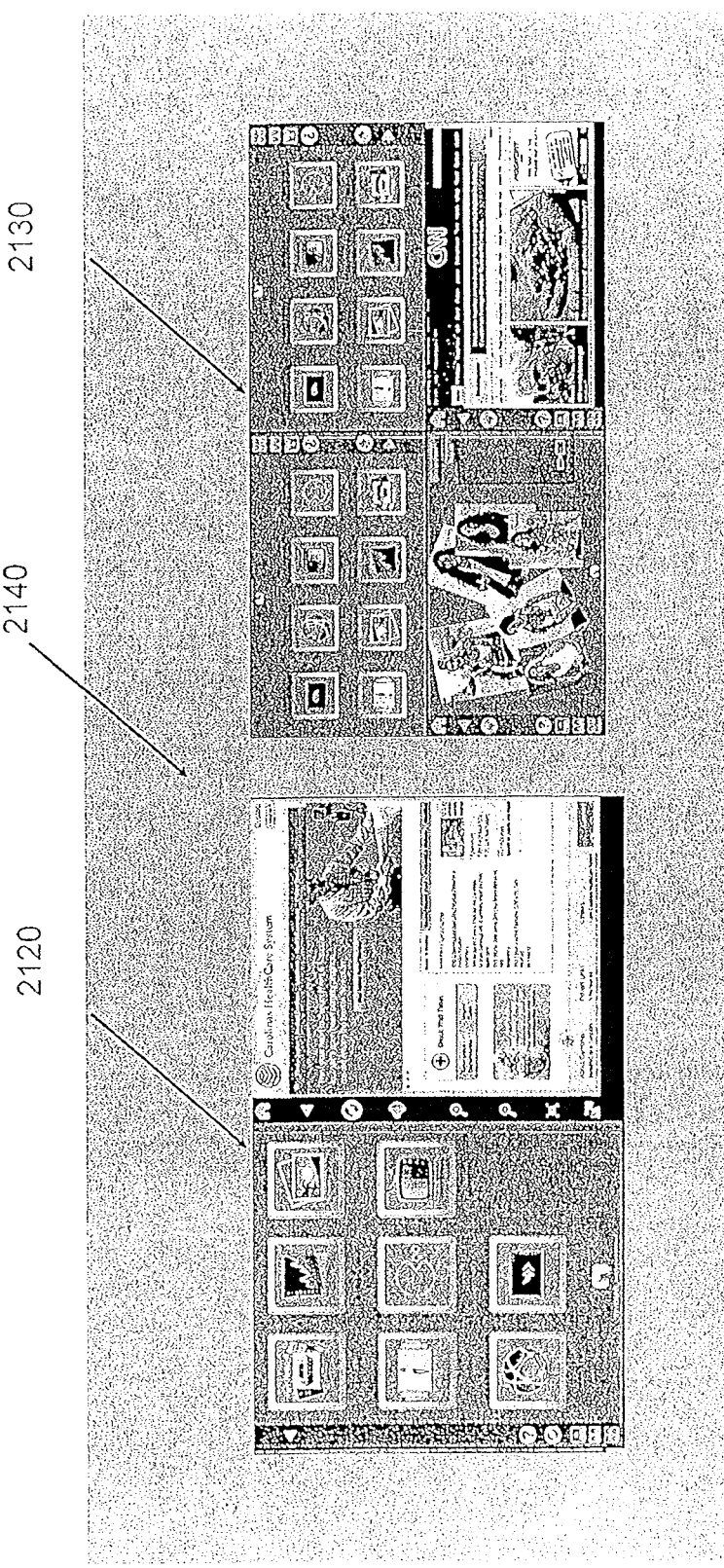

FIGS. 22A to 22D illustrate plan views of the multiuser, multi-interface computing system 2100 of FIG. 21. In FIG. 22A, both displays 2120, 2130 are in single user mode and are oriented in the same direction. In FIG. 22B, both displays 2120, 2130 are still in single user mode, but are oriented in opposite directions. In FIG. 22C, display 2120 is in two user mode, while display 2130 is still in single user mode. In FIG. 22D, display 2120 in still in two user mode, while display 2130 is in four user mode.

In use, each region, e.g., either each display 2120, 2130 or each sub-screen of the displays 2120, 2130 when in other than a single user mode, may go to sleep, e.g., display a series of photos or videos, a touch here indicator, or otherwise indicate that the region is for interaction. Touching anywhere on the region may bring up a navigational menu, e.g., the IMM. Then, choosing an option starts an application only in the corresponding region.

Other Venues

While the above discussion has been focused on a restaurant, e.g., bars, night clubs, school cafeterias, any food and/or drink setting, as the venue in which the booths/connection tables have been deployed, these booths/connection tables may also be deployed in other venues. For example, the booths/connection tables may be used in health care venues, such as hospitals, health clinics, etc., schools, e.g., classrooms, other public venues, e.g., community centers, government buildings, retail, etc., or even private venues, e.g., members only clubs, homes, etc. Of course, the options being controlled may vary accordingly.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A system, comprising:
a computer;
a touch screen including a touch detection surface and a primary display, the touch detection surface serving as a primary input to the computer, the touch screen being divided into at least two simultaneously active sections, touches in the at least two simultaneously active sections having independent effects within the at least two simultaneously active sections, each simultaneously active section having an independent interface configured to select distinct applications in each simultaneously active section, each distinct application running separately in each active section;
a first secondary display, separate from the primary display; and
a second secondary display, separate from the primary display and the first secondary display, wherein the computer is configured to:
perform a first action in response to a first touch in a first section of the at least two simultaneously active sections of the touch screen, the first action to display content on the first secondary display;
perform a second action in response to a second touch in the first section without affecting the first action, even when the first and second touches are simultaneous, the second action to display content on the second secondary display.

2. The system as claimed in claim 1, wherein the two simultaneously active sections are at predetermined locations on the touch screen.

3. The system as claimed in claim 2, wherein the predetermined locations include two sections.

4. The system as claimed in claim 3, wherein the two sections have a same orientation.

5. The system as claimed in claim 2, wherein the predetermined locations include four sections.

6. The system as claimed in claim 5, wherein the four sections include two sections at a first orientation and two sections at a second orientation, different from the first orientation.

7. The system as claimed in claim 1, wherein the content displayed on the first secondary semen display is larger than on the first section.

8. The system as claimed in claim 1, wherein the content on the first section is a thumbnail.

* * * * *